(12) United States Patent  (10) Patent No.: US 8,768,766 B2
Ellis et al.  (45) Date of Patent: Jul. 1, 2014

(54) ENHANCED ONLINE ADVERTISING SYSTEM

(75) Inventors: John R. Ellis, Woodside, CA (US); Satish Katiyar, Fremont, CA (US); Philip Michael Smolin, Los Altos, CA (US)

(73) Assignee: Turn Inc., San Mateo, CA (US)

( * ) Notice: Subject to any disclaimer, the term of this patent is extended or adjusted under 35 U.S.C. 154(b) by 1295 days.

(21) Appl. No.: 11/368,011

(22) Filed: Mar. 3, 2006

(65) Prior Publication Data

US 2006/0212350 A1  Sep. 21, 2006

Related U.S. Application Data

(60) Provisional application No. 60/659,638, filed on Mar. 7, 2005.

(51) Int. Cl.
*G06Q 30/00* (2012.01)

(52) U.S. Cl.
USPC .................. 705/14.43; 705/14.54; 705/14.46

(58) Field of Classification Search
USPC .......................................................... 705/14
See application file for complete search history.

(56) References Cited

U.S. PATENT DOCUMENTS

| | | | | |
|---|---|---|---|---|
| 5,848,397 A * | 12/1998 | Marsh et al. | ............... | 705/14.61 |
| 6,269,361 B1 | 7/2001 | Davis et al. | | |
| 6,324,519 B1 * | 11/2001 | Eldering | ......................... | 705/14 |
| 6,460,036 B1 * | 10/2002 | Herz | ............................ | 707/748 |
| 6,487,538 B1 | 11/2002 | Gupta et al. | | |
| 6,801,945 B2 | 10/2004 | Lin et al. | | |
| 6,978,263 B2 | 12/2005 | Soulanille | | |
| 6,983,272 B2 | 1/2006 | Davis et al. | | |
| 7,567,958 B1 * | 7/2009 | Alspector et al. | ..................... | 1/1 |
| 7,697,791 B1 * | 4/2010 | Chan et al. | .................... | 382/305 |

(Continued)

FOREIGN PATENT DOCUMENTS

EP  1 282 051 A1  2/2003
EP  1 282 059 A1  2/2003

(Continued)

OTHER PUBLICATIONS

Keywords, Queries, and Leads. A Guide to Search Advertising Terminology. http://www.google.com.

(Continued)

*Primary Examiner* — Michael Bekerman
*Assistant Examiner* — Michael W Schmucker
(74) *Attorney, Agent, or Firm* — Michael A. Glenn; Perkins Coie LLP

(57) ABSTRACT

The system provides an automatically targeted network for text and graphical advertising based on cost-per-action bidded pricing, wherein actions comprise any of acquisitions, purchases, downloads, registrations, donations, clicks, and impressions. Contextual, search and behavioral relevance features are integrated to optimize ad selection for advertisers, who enter action objectives, associated bids, and creatives or catalog assets. The assets are automatically analyzed and stored, and ads are automatically constructed for catalog assets. When an ad request is received from a user terminal in regard to a publisher asset, e.g. a web page, the ad request is matched to a stored contextual analysis of at least a portion the publisher asset if available, and preferably to a profile associated with the user of the user terminal. The best advertisements are determined, based upon a predicted response, and are then served, i.e. displayed, at the user terminal, based upon available ad space.

57 Claims, 32 Drawing Sheets

(56) References Cited

U.S. PATENT DOCUMENTS

| | | |
|---|---|---|
| 2001/0042064 A1 | 11/2001 | Davis et al. |
| 2001/0047354 A1 | 11/2001 | Davis et al. |
| 2001/0051940 A1 | 12/2001 | Soulanille |
| 2002/0095331 A1 | 7/2002 | Osman et al. |
| 2002/0147634 A1 | 10/2002 | Jacoby et al. |
| 2002/0194215 A1 | 12/2002 | Cantrell et al. |
| 2003/0033292 A1 | 2/2003 | Meisel et al. |
| 2003/0046159 A1 | 3/2003 | Ebrahimi et al. |
| 2003/0208474 A1 | 11/2003 | Soulanille et al. |
| 2003/0212648 A1 | 11/2003 | Cunningham et al. |
| 2003/0216930 A1 | 11/2003 | Dunham et al. |
| 2004/0024752 A1 | 2/2004 | Manber et al. |
| 2004/0044571 A1* | 3/2004 | Bronnimann et al. ........ 705/14 |
| 2004/0059708 A1 | 3/2004 | Dean et al. |
| 2004/0107137 A1* | 6/2004 | Skinner ........................ 705/14 |
| 2004/0128224 A1 | 7/2004 | Dabney et al. |
| 2004/0148222 A1 | 7/2004 | Sabella et al. |
| 2004/0225562 A1* | 11/2004 | Turner ........................ 705/14 |
| 2004/0249713 A1 | 12/2004 | Gross |
| 2004/0267612 A1 | 12/2004 | Veach |
| 2005/0021397 A1 | 1/2005 | Cui et al. |
| 2005/0021403 A1 | 1/2005 | Ozer et al. |
| 2005/0033641 A1 | 2/2005 | Jha et al. |
| 2005/0050215 A1 | 3/2005 | Lin et al. |
| 2005/0065806 A1 | 3/2005 | Harik |
| 2005/0071325 A1 | 3/2005 | Bem |
| 2005/0091111 A1 | 4/2005 | Green et al. |
| 2005/0097204 A1 | 5/2005 | Horowitz et al. |
| 2005/0131762 A1 | 6/2005 | Bharati et al. |
| 2005/0144065 A1* | 6/2005 | Calabria et al. ............. 705/14 |
| 2005/0149390 A1* | 7/2005 | Scholl et al. ................ 705/14 |
| 2005/0171863 A1 | 8/2005 | Hagen |
| 2005/0182676 A1 | 8/2005 | Chan |
| 2005/0187818 A1 | 8/2005 | Zito et al. |
| 2005/0203800 A1 | 9/2005 | Sweeney et al. |
| 2005/0209920 A1 | 9/2005 | Stubbs et al. |
| 2005/0216335 A1 | 9/2005 | Fikes et al. |
| 2005/0222906 A1 | 10/2005 | Chen |
| 2005/0223000 A1 | 10/2005 | Davis et al. |
| 2005/0262428 A1 | 11/2005 | Little et al. |
| 2005/0289120 A9 | 12/2005 | Soulanille et al. |

FOREIGN PATENT DOCUMENTS

| | | |
|---|---|---|
| EP | 1 298 568 A2 | 4/2003 |
| EP | 1 363 209 A1 | 11/2003 |
| WO | WO 98/54672 | 12/1998 |
| WO | WO 00/30002 | 5/2000 |
| WO | WO 00/30008 | 5/2000 |
| WO | WO 00/42593 | 7/2000 |
| WO | WO 00/73960 A1 | 12/2000 |
| WO | WO 01/29727 A2 | 4/2001 |
| WO | WO 02/077757 A2 | 10/2002 |
| WO | WO 03/010689 A1 | 2/2003 |
| WO | WO 2004/029759 A2 | 4/2004 |
| WO | WO 2004/029827 A1 | 4/2004 |
| WO | WO 2004/111771 A2 | 12/2004 |
| WO | WO 2005/006141 A2 | 1/2005 |
| WO | WO 2005/031589 A1 | 4/2005 |
| WO | WO 2005/081900 A2 | 9/2005 |
| WO | WO 2005/111894 A2 | 11/2005 |

OTHER PUBLICATIONS

Dulluri, et al. Allocation of Advertising Space by a Web Service Provider Using Combinatorial Auctions. Sadhana vol. 30. Indian Acad. Sci. Apr.-Jun. 2005. India.

Jach, K. Different Ways of Understanding the Basic Effectiveness Measures of Online Advertising. ISAT 2004. Proc. of the 25th Intl. Sci. School Info. Models, Concepts, Tools and App. 2004. Wroclaw, Poland.
Kingsley, L. Charging Per Inquiry: A New Metric for Online Advertising. Seybold Report on Internet Publishing. vol. 2. No. 9. May 1998.
Chatterjee, et al. Modeling the Clickstream: Implications for Web-Based Advertising Efforts. Dept. of Marketing. Rutgers University. Newark, NJ. May 1998.
Mandelli, A. Banners, E-Mail, Advertisement and Sponsored Search: Proposing a Value Perspective for Online Advertising. Intl. Journal of Internet Marketing and Advertising. vol. 2. No. 1-2. Inderscience Enterprises. 2005. Switzerland.
Symons, T. Low Down Dirty Clicks[Online Marketing Fraud]. Computers and Law. vol. 16. No. 2. Soc. Comput. & Law. Jun.-Jul. 2005. UK.
Arnold, S. Relevance and the End of Objective Hits. Online. vol. 29. No. 5. Online, Inc. Sep.-Oct. 2005.
Web Ads Upend Industry Practices [Online Advertising]. InformationWEEK. No. 1043. CMP Media, Inc. Jun. 13, 2005.
Maddox, K. Bigger, Richer Online Ad Units[Online Advertising] BtoB. vol. 90. No. 5. Crain Communications 2005.
Maddox, K. Online Ad Sales Expected to Kepp Growing in '05. BtoB. vol. 89. No. 11. Crain Communications. May 3, 2004.
Maddox, K. Search Advertising Leads to Online Growth. BtoB. vol. 89. No. 5. Crain Communications. May 3, 2004.
Kazienko, et al. Personalized Web Advertising Method. Adaptive Hypermedia and Adaptive WEb-Based Systems. 3rd Intl Conf AH 2004. Berlin, Germany. 2004.
Hicks, M. Google Raises Search Stakes. IT Week. vol. 7. No. 20. VNU Business Publications. May 24, 2004.
Blundo, et al. A Software Infrastructure for Authenticated Web Metering. Computer. vol. 37. No. 4. IEEE Comput. Soc. Apr. 2004.
Ngai, E. Selection of Web Sites for Online Advertising Using the AHP. Information and Management. vol. 40. No. 4. Mar. 2003. Netherlands.
Joint, A. Selling Cyberspace: New Legal ISsues Emerge as the Online Advertising Industry Continues to Grow. Computer Law and Secuirty Report. vol. 19. No. 1. Elsevier, UK. Jan. 2003.
Bilchev, et al. Personalised Advertising—Exploting the Distributed User Profile. BT Technology Journal vol. 21. No. 1. British Telecommunications. Jan. 2003.
Goldsmith, et al. Consumer REsponse to WEb Sites and Their Influence on Advertising Effectiveness. Electronic Networking Applications and Policy vol. 12. No. 4. 2002.
Jarvis, S. From FREE to FEE[Online Advertising Market]. Marketing News. vol. 36. No. 16. American Marketing Assoc. Aug. 5, 2002. USA.
Bannan, K. Measuring Online Ads with Fewer Players, More Data. BtoB. vol. 87. No. 7. Crain Communications Jul. 15, 2002.
Maddox, K. Buying into Online Advertising. BtoB. vol. 87. No. 7. Crain Communications. Jul. 15, 2002.
Bhatnagar, et al. Identifying Locations for Targeted Advertising on the Internet. Intl. Journal of Electronic Commerce. vol. 5. No. 3. Spring 2001.
Rice, C. Hit or Miss[Online Advertising]. Accountacy Supply Issue. Inst. Chartered Accountants in England and Wales. Apr. 2001.
Tomlin, J. An Entrophy Approach to Unintrusive Targeted Advertising on the Web. Computer Networks. vol. 33. Jun. 2000. Netherlands.
Vernon, M. Online Advertising: Making Every Hit Count. Internet Business. Internet Business Magazine, Ltd. Dec. 1999. UK.
English, et al. Advertising on the Web. Ivey Business Journal. vol. 63. No. 5. Jul.-Aug. 1999. Canada.
Gallagher, et al. A Framework for Targeting Banner Advertising on the Internet. Proc. of the 30th Hawaii Intl. Conf. on System System Sciences. vol. 4. IEEE Comput Soc. Press. Los Alamitos, CA. 1997.

* cited by examiner

ENHANCED ONLINE ADVERTISING SYSTEM

CROSS-REFERENCE TO RELATED APPLICATIONS

This application claims priority from U.S. Provisional Patent Application Ser. No. 60/659,638, entitled Method and Apparatus for Online Advertising, filed 7 Mar. 2005, which is incorporated herein in its entirety by this reference thereto.

FIELD OF THE INVENTION

The invention relates to the networked advertising systems. More particularly, the invention relates to improved integration and display of information from publishers and advertisers, based on automated relevance analysis.

BACKGROUND OF THE INVENTION

While various forms of online advertising have been used for several years, most types of conventional online advertising offer only limited relevance to consumers. The relevance technology behind traditional graphical ads, e.g. such as for banner ads, has changed little in the last decade.

Search-engine ads, such as those supplied by current search engine entities, e.g. Google and Overture, are typically more relevant than graphical ads, but are often less relevant than the search results provided by the associated search engines themselves.

Current online technology suffers from several significant limitations, including:
  the use of cost-per-impression and cost-per-click pricing of the ads;
  the complexity of keyword bidding;
  the use of click rate for judging ad relevance; and
  the number and type of features employed for judging relevance.

The model of how ads are priced affects not only the economics of associated advertisers and publishers, but also the relevance of the ads to consumers.

Cost-per-impression (CPM) pricing is the oldest pricing model, and is still widely used for graphic ads. An advertiser pays a set rate each time an ad is shown to a consumer. CPM prices are typically negotiated for individual ads or ad campaigns with each publisher, by the publisher's sales force.

CPM-priced ads are rarely priced accurately to reflect their true value to advertisers, publishers, and consumers. For example, publishers' sales teams are motivated primarily by commissions that arise from closing deals and reducing sales costs, and thus ad inventory gets sold in large bundles that don't distinguish the relevance and value of individual ads. As well, advertisers are required to monitor the effectiveness of CPM ads, such as by tracking rates of clicks and conversions of clicks to purchases and/or actions, and most advertisers find it difficult to monitor performance effectively.

Cost-per-click (CPC) pricing currently accounts for more than half of all online ad revenue. In a Cost-per-click (CPC) system, advertisers pay a set rate each time the consumer clicks on the ad. Cost-per-click (CPC) systems are often associated with bidding markets, in which the advertiser bids against other advertisers for how much they're willing to pay per click. Most CPC ad revenue today comes from keyword bidding, in which advertisers bid for clicks from ads attached to particular keywords.

Compared to CPM pricing, CPC pricing more closely aligns the interests of the advertiser, the publisher, and the consumer, since the ads that are more relevant to consumers get higher click rates and thus higher CPC prices, and thus advertisers pay prices that more closely match the actual value delivered by the ads.

In principle, an advertiser who fully tracks ad clicks and conversions from clicks to purchases may not care whether they paid per impression or per click, since they would know precisely the value of each. But in practice, most advertisers still don't do such full tracking, and thus they rely on click rates as approximations for the relevance of an ad.

CPC pricing still suffers a serious problem; clicks originating from different Web sites in an ad network have different values to a publisher, but the publisher must pay a single, uniform CPC price, regardless of where the ad is displayed.

For example, an advertiser of genealogical services has found that users who click on an ad placed at AOL.com are much more likely to subscribe to the services than users who click on the same ad at Google.com, because the demographics of the users at the two sites are so different. However, the advertiser must pay the same price for those clicks, and thus may be underpaying for the clicks at AOL.com and/or overpaying for the clicks at Google.com.

Such systems are therefore economically inefficient, and greatly affect the relevance of the ads actually shown to consumers. Conventional ad networks typically use a bidded CPC as a primary determiner of which ads get shown; the higher the CPC, the more likely an ad will be shown. Thus, in the example above, the genealogy ads on AOL.com are not shown as much as they should be, because the advertiser is paying less per click than their true value to the advertiser. Similarly, the ads on Google.com are shown more than they should because the advertiser is paying more per click than their true value to the advertiser.

To address this problem, a conventional ad network could, in principle, allow advertisers to pay different CPC's for each of the thousands of publishers' sites in its network. However, such an approach makes the bidding even more complicated than it already is, and depresses bid prices, by subdividing the bidding market, allowing advertisers to pick and choose which sites run their ads, with far fewer advertisers bidding for a given keyword in any one submarket.

Similarly, uniform CPC pricing is not a good fit with behavioral targeting of ads. In behavioral targeting, ads are targeted to individual users based on their demographics and past behavior, such as which pages they've recently visited and what they've purchased. Typically, users may be segmented into dozens or hundreds of segments, while ads are differentially targeted to the segments. Since some segments are more likely to purchase after clicking on an ad than other segments, advertisers want to pay a different CPC for each segment. But, as discussed above, that greatly complicates an already complicated bidding process, and depresses bid prices.

As well, CPC pricing is very susceptible to "click fraud". Using simple off the shelf software, an unscrupulous business can easily generate large volumes of fake clicks on its competitor's ads, forcing the competitor to pay for clicks that aren't generating any real business. More seriously, an unscrupulous publisher can run CPC ads from an ad network and create fake clicks in an attempt to get more revenue from the ad network (which shares its revenue with its publishers). Click fraud is widely recognized as a serious problem, and ad networks like Google and Yahoo invest large amounts to attempt to detect and prevent such fraud.

Complexity of Keyword Bidding.

Ad networks such as Google and Overture require advertisers to pick keyword phrases that control when the ad is shown and a maximum per-click price for each keyword phrase. Both tasks are quite difficult for the average advertiser.

The keyword phrases associated with an ad trigger when the ad is displayed to a user. On a search engine, the phrases are matched against the users' queries, and on Web pages, they are matched against the content of the pages. Picking good keywords is essential for making the ads relevant to the end users.

A single ad for one product might require dozens of triggering keyword phrases. A typical small advertiser might have dozens of ads and hundreds of keyword phrases, and medium and large-sized advertisers could have tens or hundreds of thousands of phrases. It's quite difficult for the typical advertiser to think of all the different phrases that should trigger the display of an ad. For example, a single ad for "Apple ipod" might require the following keyword phrases: "Apple ipod", "iPod", "mp3 player", "Apple", "Apple mp3 player", "music player", "Apple music player", "portable music player", "music appliance", and similar keyword phrases for all of the iPod's competitors.

The advertiser then needs to pick the maximum cost-per-click she's willing to pay for each different keyword phrase. Typically, a sophisticated advertiser will measure the rate at which people who click on an ad triggered by a given keyword phrase go on to make a purchase—the so-called "conversion rate". Knowing the conversion rate for a keyword phrase and the maximum amount the advertiser is willing to pay for a purchase of the advertised product or service, the advertiser can then choose the maximum CPC that is profitable for clicks on that keyword phrase. For example, suppose an advertiser is willing to pay $10 to acquire a purchase of one of its products, and suppose that 10% of users who click on an ad triggered by a given keyword phrase actually go on to make a purchase. In this case, the advertiser would be willing to pay up to $1 for each click.

In practice, most advertisers find it very difficult to pick thousands of keyword phrases, track conversion rates on them, and adjust the maximum CPCs accordingly. The advertisers' ads, products, prices, and Web site—all of which affect conversion rates—are constantly changing, and a sophisticated advertiser will constantly monitor and adjust keyword phrases and CPCs. However, as reported by JupiterResearch, at Search Engine Strategies Conference, 13-16 Dec. 2004, Chicago, Ill., "Only one of four search marketers bids and measures intelligently", i.e. 3 of 4 of search marketers currently use unsophisticated search engine marketing (SEM) tactics.

The Use of Click Rate for Judging Ad Relevance.

A number of ad networks, including Google, use the rate of clicks on an ad as a partial measure of the ad's relevance to users. While this has worked well when the ads were shown mostly on a few search engines, it doesn't work nearly as well when the ads are shown on thousands of Web sites, and it doesn't work well with behavioral targeting.

Some conventional ad networks choose which ads to show on a page, by first finding ads whose keywords match the text on the page. Then the network ranks those matching ads, by estimating the effective revenue per impression it would get from each ad if it were to be shown on that page, and then picks the ads with the highest revenue per impression, referred to as either "effective CPM" or ECPM.

Google estimates the effective revenue per impression using the click rate of the ad and the bid price of the ad's keywords:

$$ECPM = \text{click rate of the ad} * \text{bid price per click for the ad keywords}$$

"Click rate" is defined as clicks per impression, and "bid price per click" is defined as dollars per click, so effective revenue per impression is thus:

$$ECPM = \text{dollars/impression} = \text{clicks/impression} * \text{dollars/click}$$

To measure click rate, such an ad network may run thousands of initial test impressions of an ad to get an accurate measure of a click rates (which are typically on the order of 0.1 to 1% for non-search ads). While the use of test impressions may work adequately on a single search engine, such systems quickly become cumbersome when applied to a network of thousands of publishers, or when applied to behavioral targeting.

The click rate for ads often varies considerably from one publisher's site to the next, from one section of a site to the next, and from one page to another. Similarly, click rates can vary significantly among the hundreds of user segments inferred by behavioral targeting.

It would therefore be advantageous to provide an ad network that could measure an ad's click rate separately for each of the thousands of likely combinations of publishers, sections within sites, pages within sections, and user segments, wherein such an ad network could optimize the ranking of ads for each different combination of ad, page, and user segment.

However, in practice, getting a separate measurement of click rate for each combination isn't practical. Any given page may be read by hundreds of segments of users and there may be hundreds to tens of thousands of reasonably likely ads for that page, so millions of test impressions of that page would be required just to measure click rate. Not only would it take too long to run those test impressions, e.g. perhaps weeks, but it would also cost too much, since such a system would be sacrificing significant revenue by running too many ads that generate too few clicks. And on smaller Web sites with fewer visitors, there simply aren't enough impressions available.

Thus, when estimating ECPM to select ads, conventional ad networks are limited to using the average click rate of ads over the entire network or large subsets of the network, rather than for each combination of page and user segment. Since actual click rates can vary greatly across combinations, the use of average click rate yields an inferior selection of ads for any given page and user.

As a consequence of their reliance on average click rates, conventional ad networks will find it difficult to introduce behavioral targeting. Such conventional ad networks also find it difficult to accommodate advertisers with very large numbers of ads, since each ad consumes test impressions in order to measure their click rates.

Features for Judging Relevance.

Current advertising technologies are quite limited in how they match ads with Web pages and users. There are four main approaches:

Matching the Demographics of the Buyers with that of the Audience.

For example, an advertiser of video games may preferably run its ads on sites whose audiences have a disproportionate number of 18-25 year-old males. Sometimes this matching employs quantitative data obtained from providers like comScore, but often it is intuitive. For example, movie advertisers typically run their ads in the entertainment section of a Web site.

Matching the Text of the Ad's Keywords with the Text of the User's Search Query or the Web Page.

For example, an advertiser of Apple iPods will likely have purchased the keyword "iPod", and its ad will run on pages that contain the keyword "iPod" and on search results for user queries containing "iPod".

Observed Click Rates.

As discussed above, conventional ad networks typically observe the actual click rate on an ad to judge its relevance.

Observed Past Behavior of Users.

With behavioral targeting, the past behavior of an individual user is used to predict to which ads a user is likely to respond. For example, a user who has visited auto-buying sites frequently in the past month may be more likely to respond to ads for auto loans.

Any one ad network typically uses just one or two of these approaches. Large CPM brand advertisers still rely primarily on matching demographics. For example, Advertising.com relies primarily on observed click rates. Tacoda, Revenue Science, and Claria rely on past behavior. Google relies on text matching with keywords purchased by the advertiser and on click rate.

In contrast to such conventional ad networks, current state-of-the-art consumer search engines typically use dozens of features to judge the relevance of indexed pages to a user's query. For example, search engines such as Yahoo and Google use many different measures of text match between the query and the different parts of the entire indexed pages and the text of links that point at the pages. Such search engines use numerous measures of the number and quality of incoming Web links, and may even use click rates to help identify more popular documents.

A modern search engine may have 50 or more such variables for judging relevance, as compared to the handful of variables used by ad technology. As a result, the results yielded by such search engines are often significantly more relevant than that of the accompanying text ads.

While the disclosed prior art systems and methodologies provide placement of ads within web sites based on a variety of pricing methods, the ads often have limited relevance to customers, and require significant effort and expertise from advertisers, thereby minimizing the value of the ads to advertisers, publishers, customers and the ad network.

It would be advantageous to provide a network ad network that combines state-of-the-art search technology with a radically different pricing model, wherein ads are much more relevant to consumers, much simpler and more effective for advertisers, and thus more profitable for publishers. The development of such a system would constitute a major technological advance.

In addition, it would be advantageous to provide an advertising system across a network, that analyzes both publisher content and advertiser content, past user behavior, profile information of users, past rates of performance of ads, time of day and day of week, and/or many other factors to determine relevance of ads to be displayed with publisher content, wherein the relevance is based on a prediction of response by the user. Furthermore, it would be advantageous to select one or more of the ads for display with the publisher content based on such a prediction. The development of such a system would constitute a further technological advance.

SUMMARY OF THE INVENTION

The enhanced online advertising system provides an automatically targeted network for text and graphical advertising that is based on cost-per-action (CPA) bidded pricing, wherein the action comprises any action of the user desired by the advertiser, such as but not limited to acquisition, purchase, download, registration, donation, click, and branding impression. A search component integrates contextual, search and behavioral relevance features to optimize ad selection for advertisers. An advertiser campaign associated with an advertiser entity typically comprises one or more advertisements, such as desired to be placed at one or more other locations across a network of publishers, and an advertiser's web site associated with a click of one of the placed advertisements by the customer user. Through the advertiser interface, an advertiser enters objectives, i.e. desired actions, e.g. a customer purchase or signup, that results from customer selection of a placed ad, customer navigation to the web site through the landing page, and a resultant action desired by the advertiser. The advertiser also enters a desired bid value, e.g. price or commission percentage for each of the entered objectives, and one or more advertisements, i.e. ad creatives. The system automatically analyzes, i.e. configures, the assets associated with the entered advertiser campaign, including the web site and the advertisements.

A publisher entity comprises a publisher web site having one or more publisher web pages, which also comprises one or more ad spaces. When the enhanced online advertising system receives an ad request from a publisher associated with placement on a publisher web page, the system retrieves a stored analysis of the context of the associated publisher web page. The analysis may preferably integrate other relevant information associated with the publisher, such as further analysis of the publisher web site, or other factors, such as but not limited to target audience, geographic location, link count, past aggregate click and action rates on ads, time of day and day of week, etc.

When a user views a web page, an ad request is generated, which is matched to results of the analysis associated with the page. The user is preferably matched to a profile that represents the user's past behavior, and one or more advertisements are selected, based upon a predicted response of the user. The selected ads are also preferably ranked, such as by ECPM, where:

$$ECPM = ((\text{Average Cost per Action CPA}) \times (\text{Number of Actions}) \times 1000) / (\text{Number of Impressions Served})$$

The top ranked ads are then returned to the user, i.e. displayed, based upon the available ad space. The enhanced online advertising system provides search technology-based relevance, and integrates search, contextual and behavioral attributes. As well, no manual targeting is required. While keyword and/or category "hints" may be utilized if available, they are not required. An ad having a higher rank gets more play, so an advertiser may increase the rank of a desired advertisement, by increasing the bid price and/or improving the quality of the ad.

DETAILED DESCRIPTION OF PREFERRED EMBODIMENTS

Figure 1:
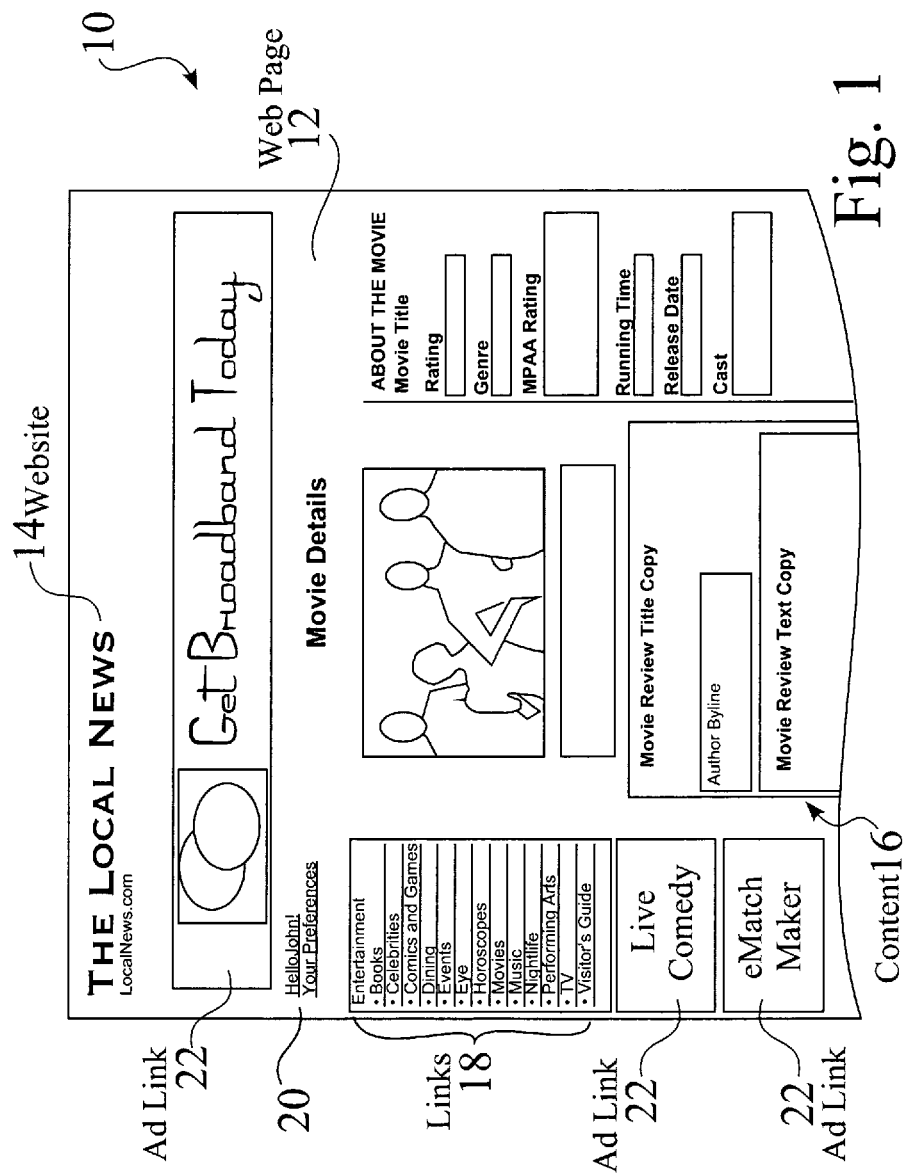
FIG. 1 is a schematic view of graphic display ads on a web page.

FIG. 1 is a schematic view 10 of graphic display ads 22 on a web page 12. A website 14 typically comprises one or more web pages 12 associated with content 16, often includes one or more links 18, such as hypertext links to other pages 12 and/or content 16 within a website 14. As seen in FIG. 1, a web site 12 may also include information 20 based on knowledge from a visitor user USR, such as based on knowledge from previous visits or actions, knowledge of the terminal 78 (FIG. 4), e.g. 78a-78n (FIG. 6), from which the user USR (FIG. 6) visits, or based on information entered by the user USR, e.g. such as but not limited to user identification and/or user preferences.

Figure 6:
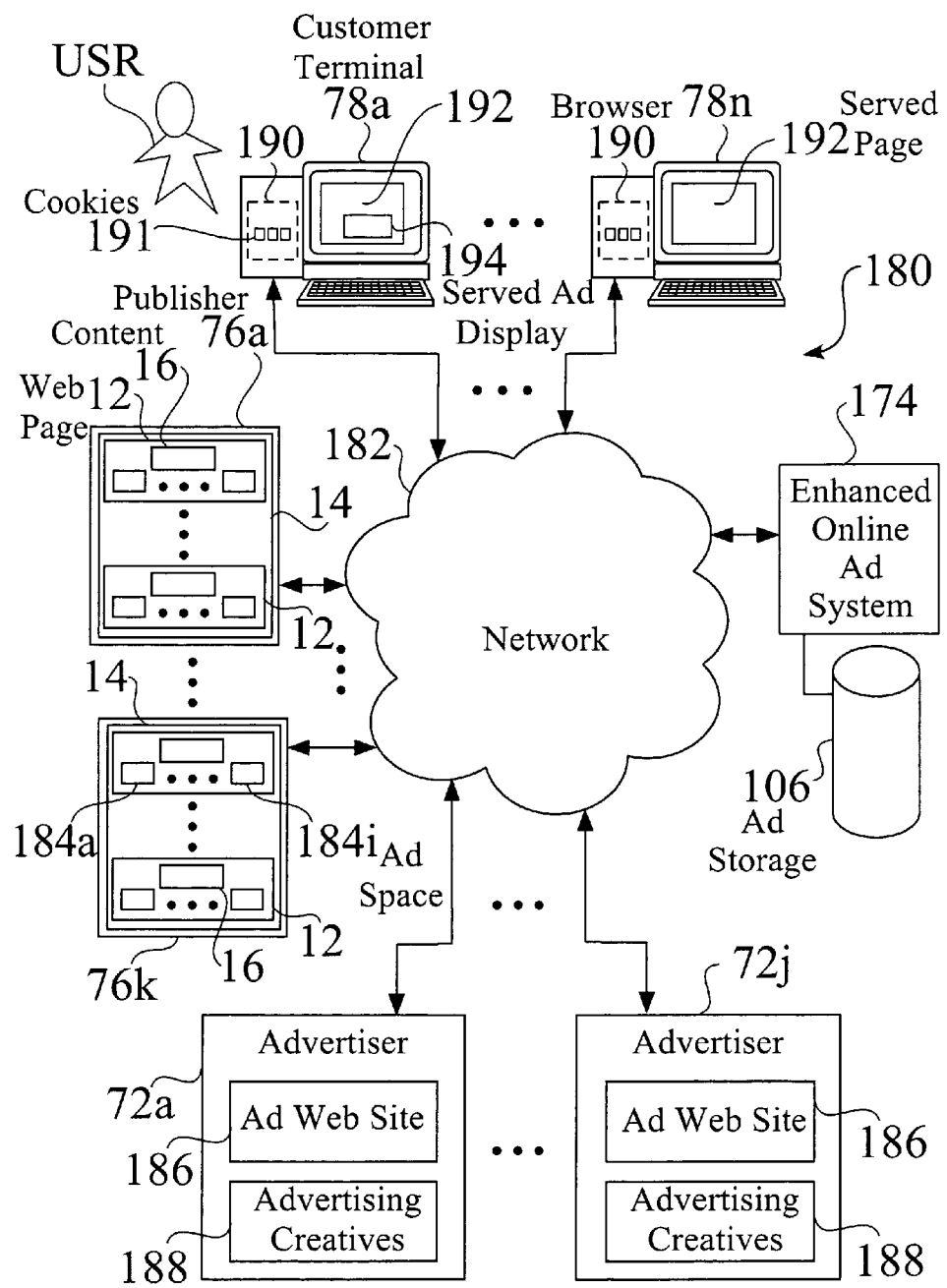
FIG. 6 is a schematic view of an enhanced online advertising system that operates across a network environment.

The exemplary web page 12 seen in FIG. 1 also includes one or more graphical display ads 22, which often act as links 586 (FIG. 25) to an advertising site 186 (FIG. 6). While the exemplary graphic display ads 22 seen in FIG. 1 comprise a banner ad 22 and one or more other ads 22, a wide variety of ads 22 may be displayed on the web page 12.

Figure 2:
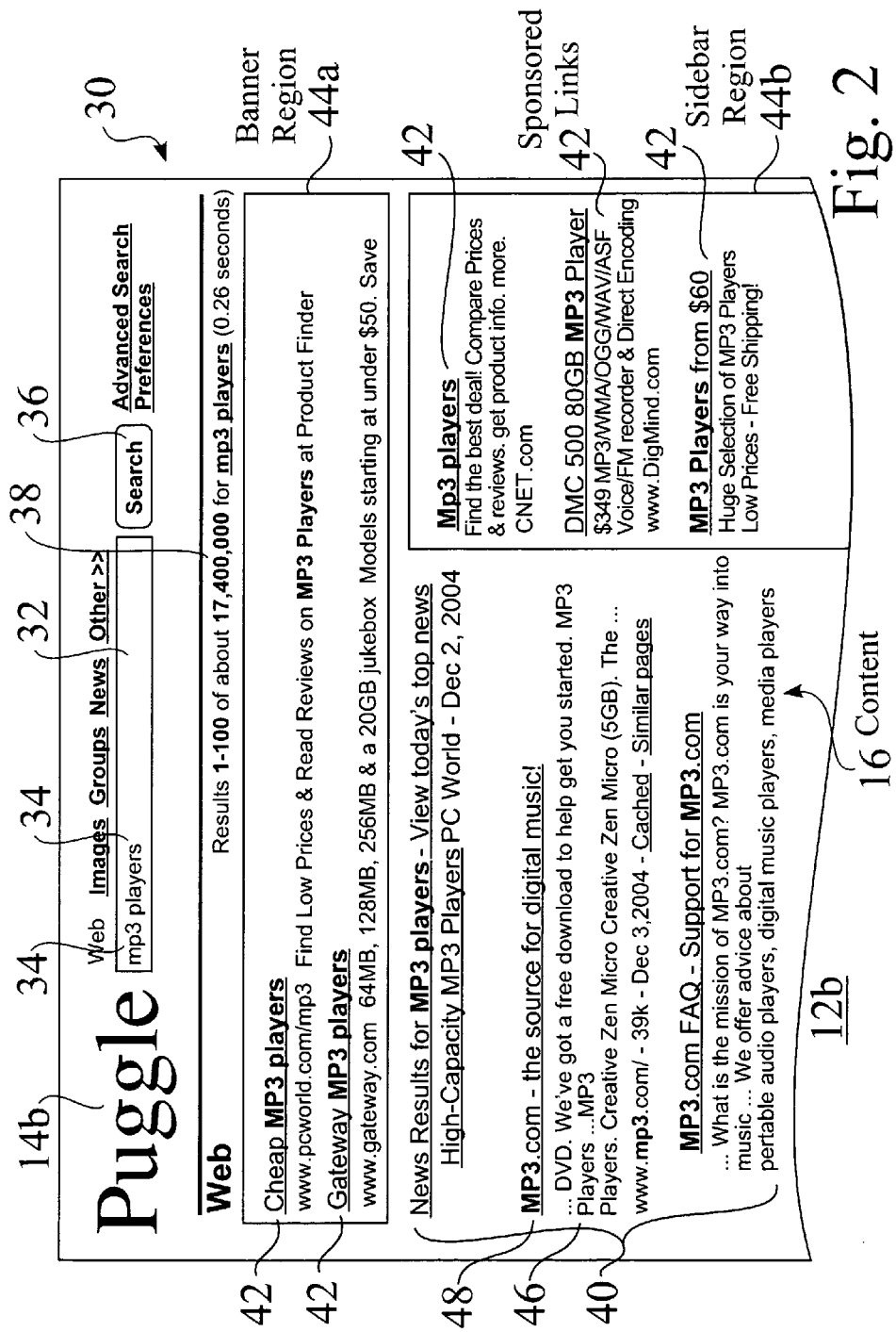
FIG. 2 is a schematic view of search-engine ads on a search engine web page.

FIG. 2 is a schematic view 30 of sponsored link ads on a search engine web page 12b. The exemplary search engine web page 12b, such as associated with a search engine web site 14b, typically comprises a data entry screen 32, whereby one or more key words and/or phrases 34 can be entered by a user USR. Upon initiation of a search, such as by a selectable control 36, a search is performed, yielding results 38, of which some or all are indicated on the web page 14b. The resultant content 16 is typically presented as a ranked summary list 40 of search result elements 46 having associated links 48, whereby the user USR can click, i.e. controllably navigate, to a website 12 associated with the search result elements 46.

In addition to a ranked summary list 40 of search result elements 46, a search engine web page 12b also commonly includes one or more sponsored links 42, such as arranged in one or more highly visible regions 44, e.g. such as in a banner region 44a and/or a side bar region 44b, of the web page 12b.

Figure 3:
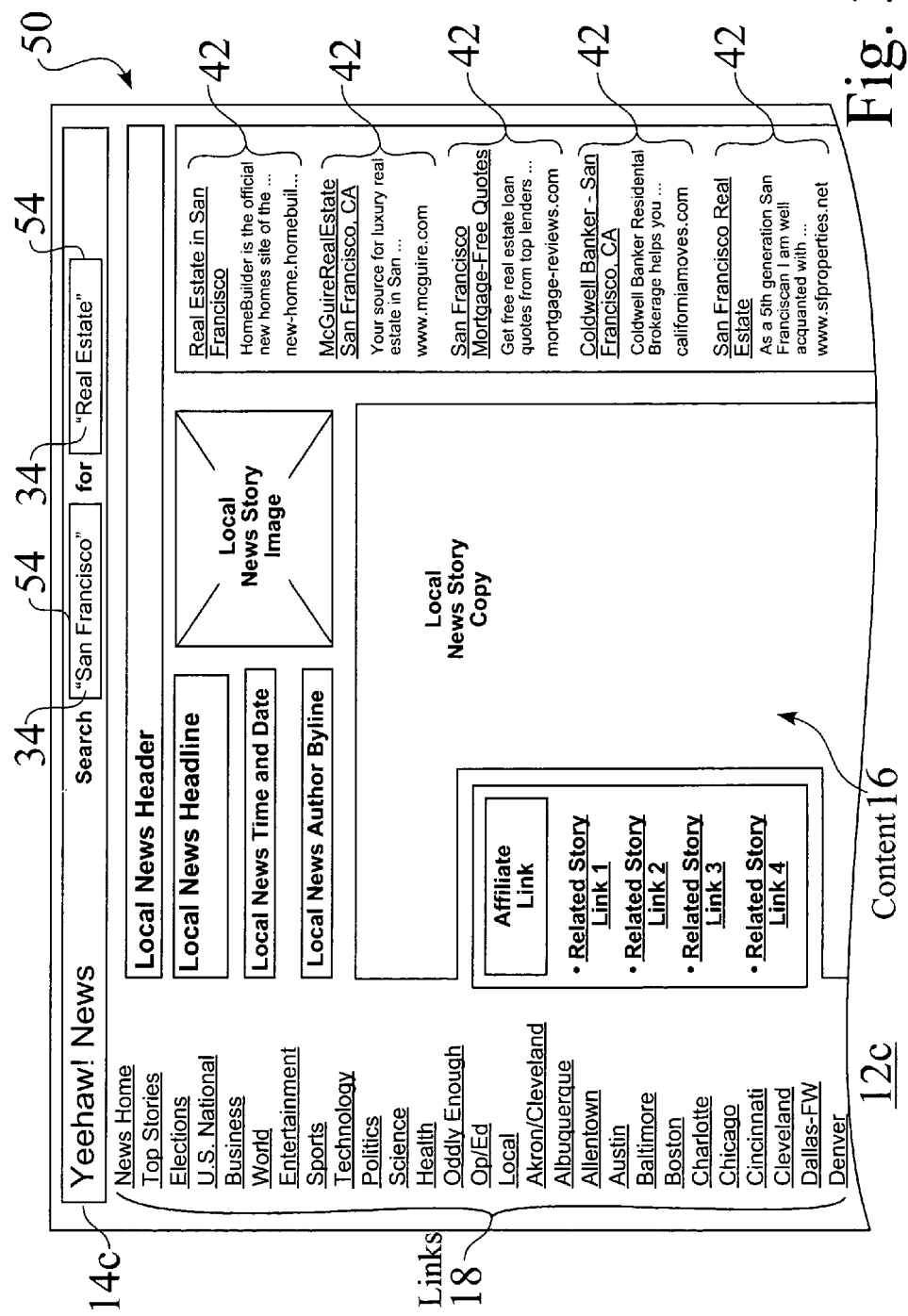
FIG. 3 is a schematic view of contextual text ads on a web page.

FIG. 3 is a schematic view 50 of contextual text ads 42 on a web page 12c associated with a news website 14c. As seen in FIG. 3, the web page 12 may selectably present one or more sponsored links 42, such as arranged in one or more highly visible regions 44. Conventional selection for such sponsored links 42 is typically based on a keyword match to the content 12 of the page 12c, and/or to one or more keywords and/or phrases 34, e.g. "San Francisco" and "Real Estate" entered in a content search input screen 54, such as from which the user USR navigated to the page 12c.

Figure 4:
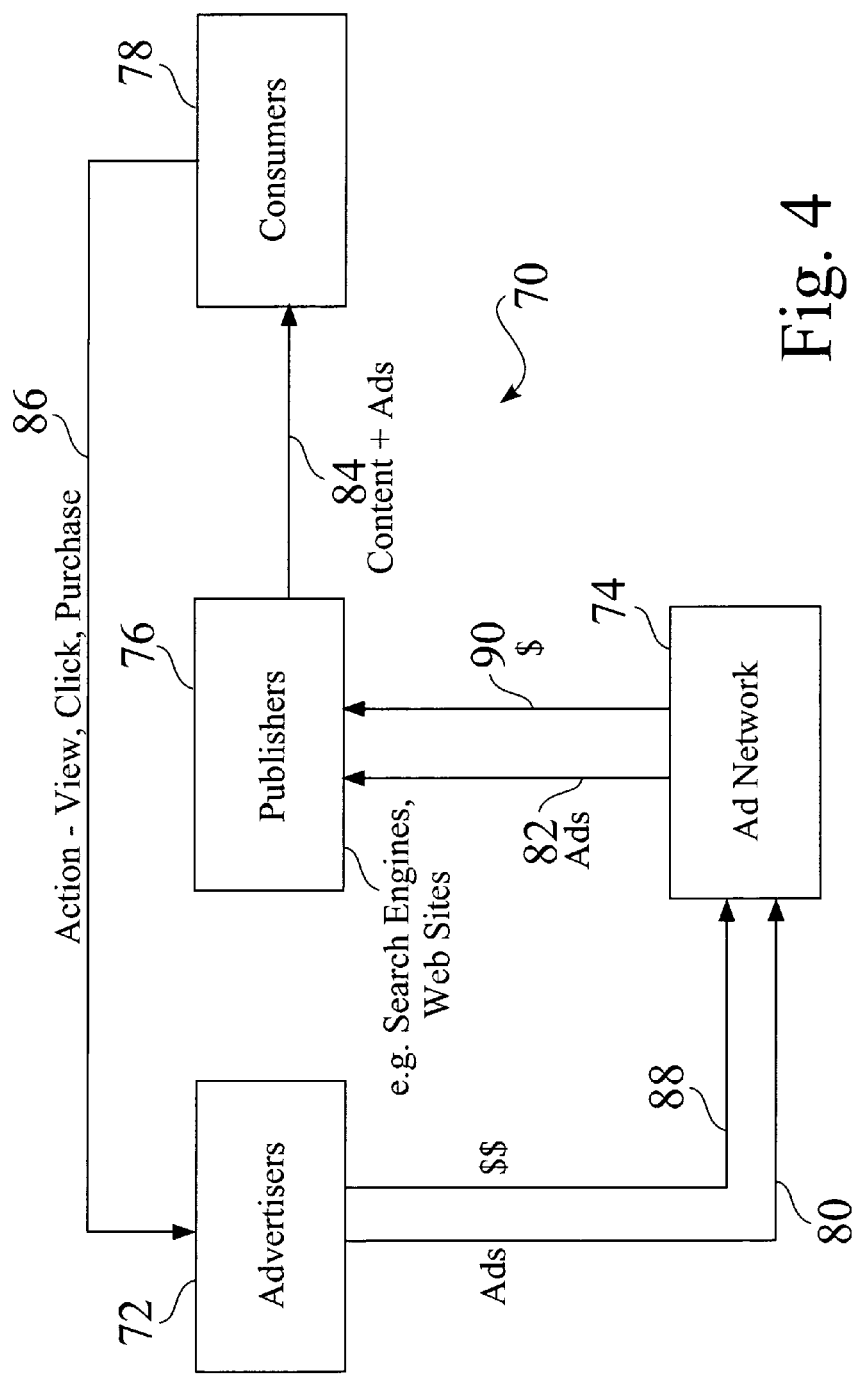
FIG. 4 is a top-level schematic view of a conventional advertising network.

FIG. 4 is a top-level schematic view of a conventional advertising network 70. Advertisers 72 associated with ads 22,42 typically interact with an ad network 74, such as by a submission 80 of one or more ads to be placed on web sites 12 associated with one or more publishers 76.

Advertisers 72 typically are required to enter a large number of keywords 34 and/or phrases 34 to be associated with each ad to be placed, and also typically enter a value, e.g. set or bid price.

The ad network 74 places or sends 82 selected ones of the submitted ads 188 to one or more publishers 76, who in turn present 84 content and one or more ads 188 to consumer terminals 78. Based on selected actions 86 by a user USR, such as a view, click, or purchase, an advertiser 72 is made aware or updated of the action, i.e. results. Based on agreement with the advertiser network 74, payment 88 is typically made or credited to the ad network 74, responsive to the tracked actions 86. As well, the ad network 74 typically compensates the publishers 76 for providing ad space 184, e.g. 184a-184i (FIG. 6) that results in actions 84,86.

Figure 5:
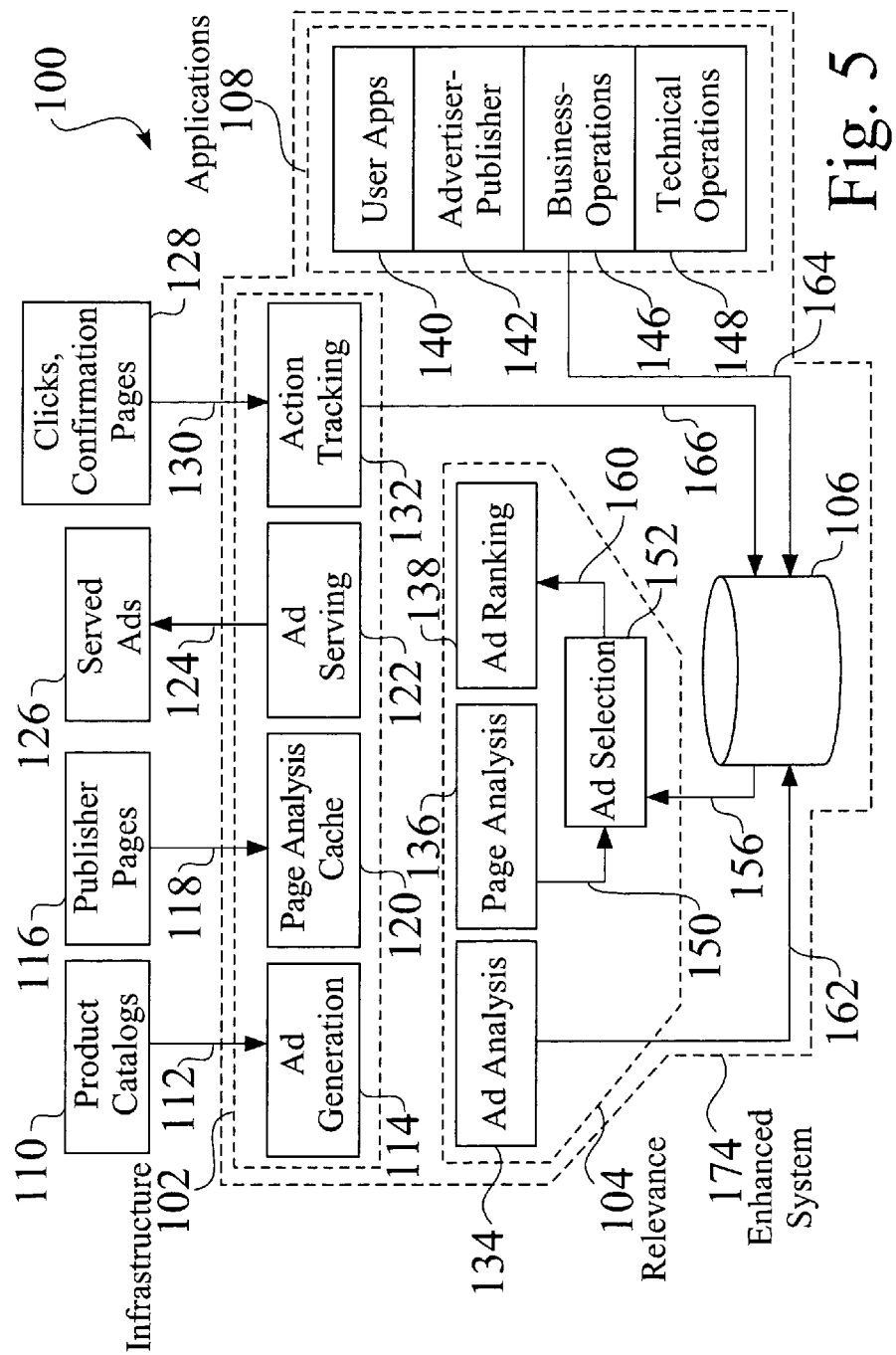
FIG. 5 is a basic schematic view of an enhanced online advertising system associated with advertisers, publishers, network sites, and performance tracking.

FIG. 5 is a basic schematic view 100 of an enhanced online advertising system 174 associated with advertisers 72, publishers 76, network sites 12, e.g. such as publisher sites 14 and advertiser sites 186 (FIG. 6), and performance tracking of actions 86 by a consumer, i.e. user USR. FIG. 6 is a schematic view of an enhanced online advertising system 174 that operates across a network environment 182, such as associated with one or more advertisers 72, e.g. 72*a*-72*j*, one or more publishers 76, e.g. 76*a*-76*k*, and one or more users USR at user terminals 78, e.g. 78*a*-78*n*, each typically running a browser application 190. The user terminals 78 typically comprise network enabled devices 78, such as but not limited to any of a desktop computer, a portable computer, a mobile phone, a personal digital assistant, a television, a game box and a media player.

As seen in FIG. 5, the enhanced online advertising system 174 typically comprises system infrastructural components 102, a relevance module 104, system storage 106, and associated system applications 108. The exemplary system infrastructural components 102 shown in FIG. 5 comprise an ad generation module 114, a page analysis cache 120, an ad serving module 122, and an action tracking module 132. The exemplary relevance module 104 comprises an ad analysis module 134, a page analysis module 136, an ad selection module 152, and an ad ranking module 138. As also seen in FIG. 5, system applications typically comprise user applications 140, advertiser-publisher applications 142, business-operations applications 146, and technical operations 148.

In the enhanced online advertising system 174 shown in FIG. 5, publisher pages and/or sites 116 that are submitted, sent, or otherwise accessed 118 by the system 174 are received by the page analysis cache 120. In some system embodiments 174, the system 174 provides ad generation 114 based on all or part of a catalog 110 that is submitted 112 or otherwise authorized by a publisher 76. The system 174 may also receive previously prepared ads 188 from an advertiser 72.

The ad analysis module 134 analyzes received or generated ads 188, and stores 162 the analyzed ads 188 for further use, as shown generally as system storage 106.

The page analysis module 136 analyzes submitted publisher pages and/or sites 116, and also typically stores 412 (FIG. 16) the results in system storage 106, such as in a publisher analysis database 429. Analyzed publisher pages 12 are provided to the ad selection module 152, which selects 508 (FIG. 19) one or more ads 188, based at least in part on information accessed 156 from storage 106, to the analyzed pages 116. An ad ranking module 138 receives 160 the selected ads 188, and ranks 510 (FIG. 19) the selected ads, wherein the ranking is preferably based on ECPM, as described below. Based on available ad space 184, e.g. 184*a*-184*i* (FIG. 6), and on the associated analyzed publisher page 12, one of more of the ads 188 having the highest ranking 510 are provided 124 by the ad serving module 124, whereby the served ads 126 are presented 194 (FIG. 6) in conjunction with the analyzed publisher page 12 to a user USR.

User actions 128, such as but not limited to clicks, sales, sign-ups, and/or confirmations are received 130 by a action tracking module 132, which also preferably provides feedback 166 for the system 174.

A enhanced online advertising system 174 and associated processes, e.g. 200 (FIG. 7), 400 (FIG. 12), 500 (FIG. 19), provide an automatically targeted network for text and graphical advertising that is preferably based on cost-per-action (CPA) bidded pricing, wherein the action comprises any of acquisition, purchase, download, registration, donation, click (CPC), and branding impression (CPM). A search, i.e. relevance, component 104 integrates contextual, search and/or behavioral relevance features to optimize ad selection for advertisers 72.

Figure 26:
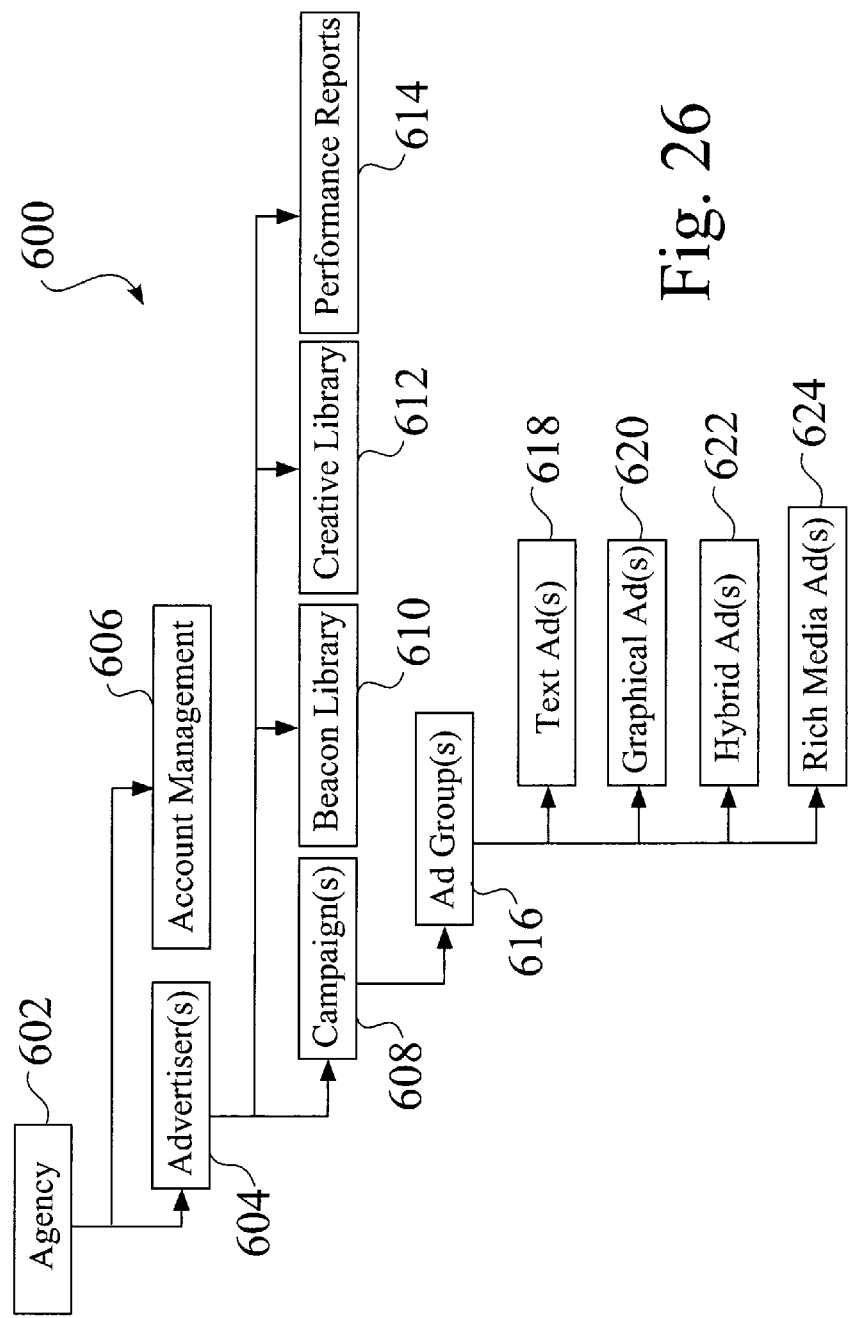
FIG. 26 is a functional hierarchy of an exemplary advertising entity.

Preferred embodiments of the enhanced inline advertising system 174 comprise a unique combination of key elements, including: a pricing model based on bidded cost-per-action (CPA) 252, in which advertisers 72 bid and pay only for true results 86; a state-of-the-art search technology that predicts ad relevance using dozens of pieces of evidence, and increased ad coverage via automatic generation of ads 188 and the uniform handling of all formats of ads 188, including but not limited to text ads 618, graphical ads 620, hybrid ads 622 and rich media ads 624, as seen in FIG. 26.

Advertiser Interaction with Enhanced Online Advertising System.

Figure 7:
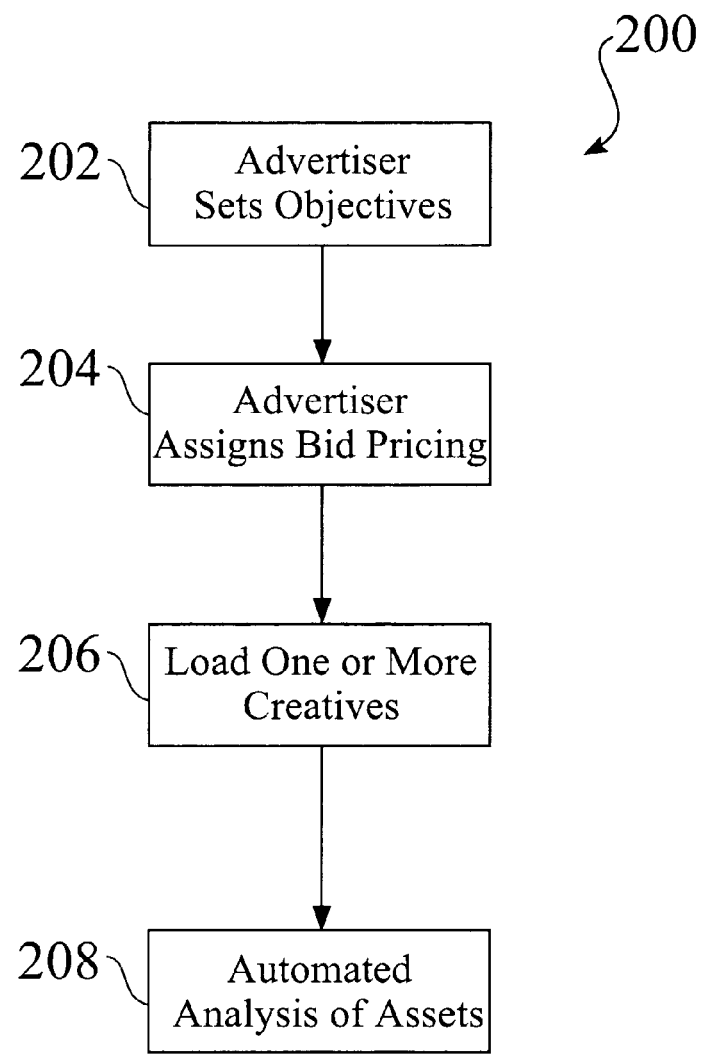
FIG. 7 is a process flow diagram for advertiser entity input in an enhanced online advertising system.

FIG. 7 is a process flow diagram for advertiser entity input 200 in an enhanced online advertising system 174. An advertiser 72 sets 202 objectives 86 associated with an ad campaign 222, wherein the objectives 86 comprise desired results, i.e. actions 86. The advertiser 72 then assigns 204 bid pricing 252 associated with the entered 202 objectives 86, and also loads 206 one or more creatives 188. The enhanced online advertising system 174 analyzes 208 the creatives 188 and the objectives 186, and may preferably analyze other information, e.g. such as but not limited to ad site analysis, such as provided by the advertiser 72.

Figure 8:
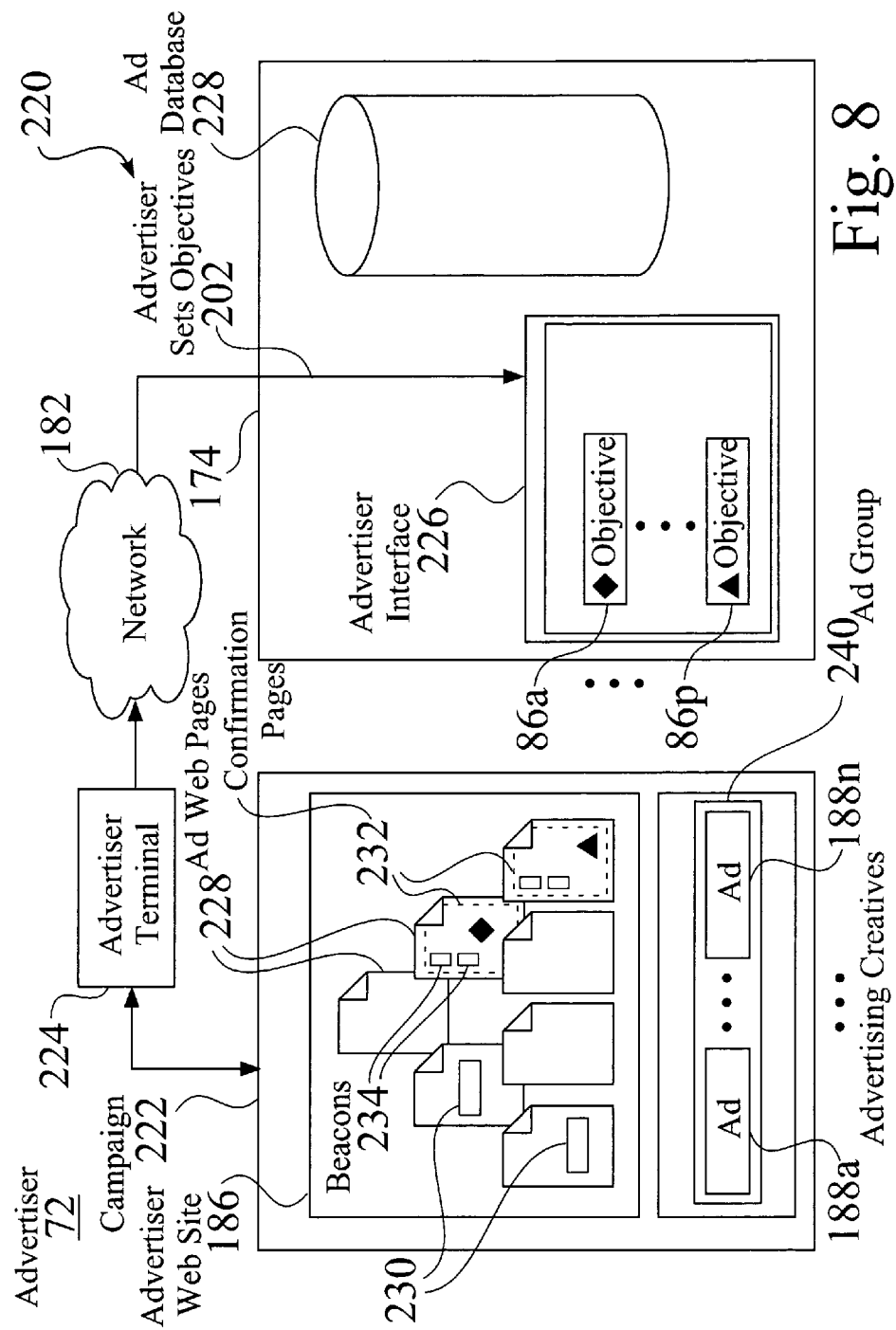
FIG. 8 is a schematic diagram of an input of advertiser objectives in an enhanced online advertising system.

FIG. 8 is a schematic diagram of an input 202 of advertiser objectives 86 in an enhanced online advertising system 174. An advertiser campaign 222 associated with an advertiser entity 72 typically comprises a group 240 of one or more advertisements 188, e.g. 188*a*-188*n* (FIG. 8), such as desired to be placed, i.e. served 194, at one or more other locations across a network 182. An advertiser campaign 222 also typically comprises an advertiser web site 186, which comprises one or more ad web pages 228, wherein at least one of the web pages 228 comprises a landing page 230 associated with selection by a user USR of one of the placed advertisements 188, e.g. upon selection of clicking upon a placed ad 188, the browser 190 (FIG. 6) associated with a user USR navigates to the associated landing page 230 at the ad site 186.

Through the advertiser interface 226, an advertiser 72, such as through an advertiser terminal 224, enters, e.g. step 202 (FIG. 7) objectives 86, i.e. desired actions 86, e.g. a product purchase or email signup, that results from customer clicking 584 (FIG. 25), i.e. selection 584 of a placed ad 188, customer navigation 586 (FIG. 25) to the advertiser web site 186 through the landing page 230, and a resultant desired action 86 as specified by the advertiser 72.

Figure 9:
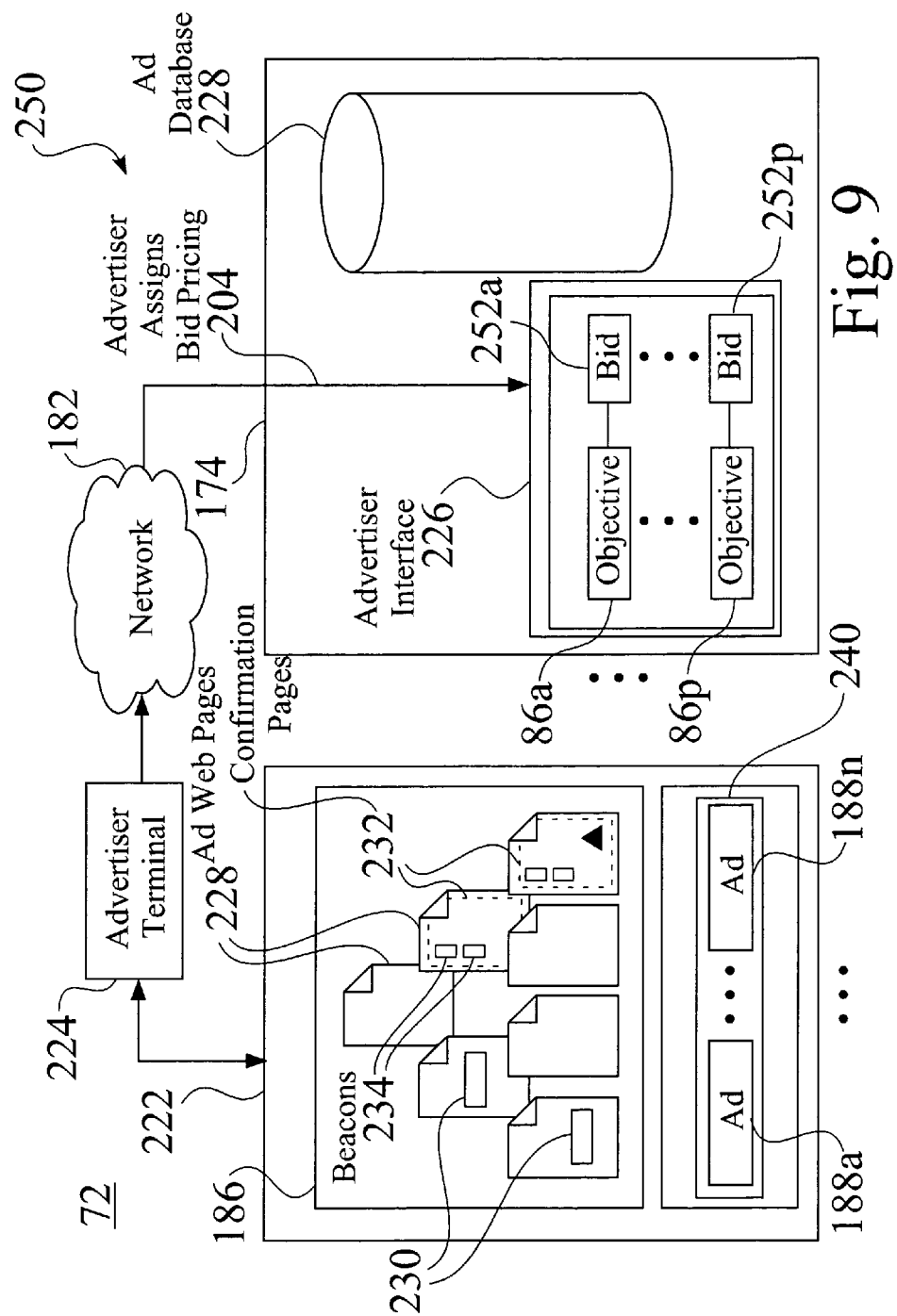
FIG. 9 is a schematic diagram of an assignment of bid pricing in an enhanced online advertising system.

FIG. 9 is a schematic diagram of an assignment 204 of bid pricing in an enhanced online advertising system 174. Through the advertiser interface 226, the advertiser enters desired bid values 252, e.g. 252*a*-252*p*, such as but not limited to a price or a commission percentage for each of the entered objectives 86, and one or more advertisements 188, i.e. ad creatives 188.

Bid Pricing in the Enhanced Online Advertisement System.

In preferred embodiments of the enhanced online advertising system 174, advertisers bid 204 for the cost per action (CPA) prices 252 that they are willing to pay for their respective actions 86. The more the advertiser 72 bids, the more likely ads 188 are shown 194 (FIG. 6), and the more actions 86 generated. This bidded market is more efficient at getting advertisers 72 to disclose the true value of the ads 188, and thus the enhanced online advertising system 174 is better able to select ads 188 that are truly relevant to users USR and profitable to publishers 76.

In some preferred embodiments of the enhanced online advertising system 174, an advertiser 72 can associate a CPA bid price 252 with an ad 188 in variety of ways, such as by a maximum bid CPA 252, a variable bid CPA bid 252 (FIG. 9), an ad-based CPA bid 252 (associating a bid with an ad), and/or a beacon-based fixed bid 252 (associating a fixed bid with a beacon 234).

With a maximum bid CPA 252, the advertiser 72 associates a different maximum CPA price 252 with each of a plurality of ads 188, e.g. for tens, hundreds, thousands, or millions of ads 188. For example, a large retailer 72 may have a separate ad 188 for each of the millions of products 590, e.g. 590a (FIG. 25), in an associated catalog 462 (FIG. 17), wherein each ad 188 may have a different associated CPA 252 reflecting the value to the retailer 72 of a purchase action 86 of that product 590. Some advertisers 72, such as lead-generation advertisers 72, may have single objective goal 86, and may set a single maximum CPA 252 that applies to all their ads 188.

With maximum bid CPA 252 in the enhanced online advertising system 174, an advertiser 72 doesn't always pay the maximum CPA 252. For example, in some system embodiments, for any action 86 resulting from placement 194 of an ad 188, the system 174 reduces the actual CPA 252 to be paid 594 (FIG. 25) to be just one increment more, e.g. one cent more, than the minimum necessary to keep the ad's position, i.e. ranking 510 (FIG. 19) relative to other ads 188 on the publisher page 12. Thus, an advertiser 72 can set a maximum bid 252 that reflects the true value of the associated action 86, while being assured that the advertiser 72 only pays a "market price", relative to other advertiser bidders 72.

Figure 25:
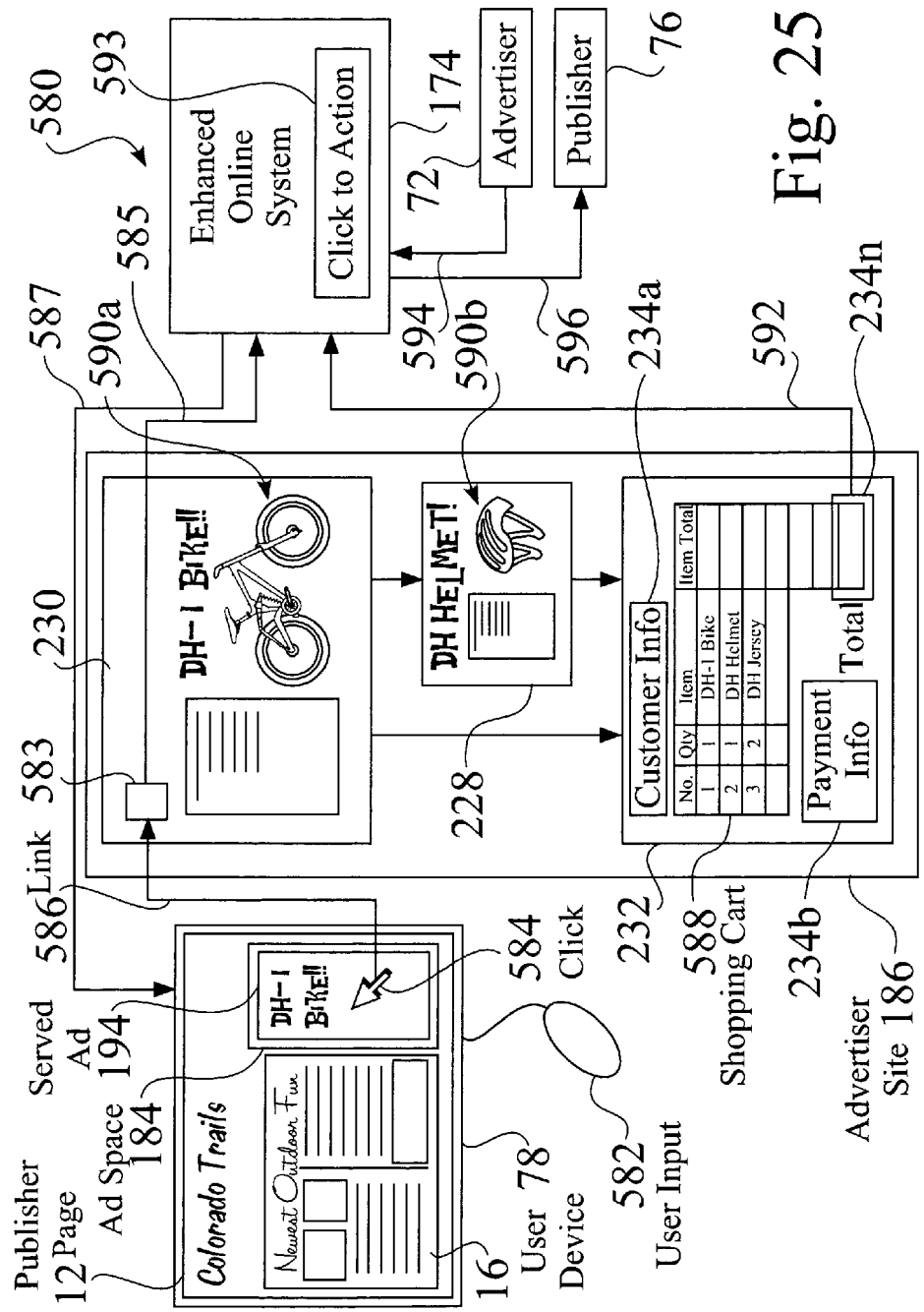
FIG. 25 shows user impression and clicking, linked navigation to an advertiser site, user actions at the advertiser site, and system reporting of action confirmations.

Variable bid CPA 252 is typically a beacon-based commission bid 252, wherein a variable amount is associated with a beacon 234. With variable bid CPA 252, the advertiser 72 decides in real time how much to pay for an action 86 resulting from placement 194 of an ad 188. For example, a retailer 72 may define an "action" 86 to be completing a purchase, whereby the retailer 72 will pay for each such action 86 a percentage of the gross margin of the products 590 (FIG. 25) in the consumer's shopping cart 588 (FIG. 25). As well, a retailer 72 that desires to build its customer base may pay a low price or nothing for purchase actions 86 by existing customers USR, and a higher price, e.g. $25US, for each new customer USR who purchases 86 as a result of an ad 188, where such a payment, e.g. $25 US, represents a portion of the expected lifetime value the new customer USR will bring to the retailer 72.

Compared to setting a fixed maximum CPA 252, variable CPA 252 more accurately reflects the value of an action 86 resulting from an ad 188. For example, a retailer 72 might create two different ads 188 for the same product 590. One ad might appeal to price-sensitive customers USR who end up purchasing just the product 590 advertised 188, whereas the other ad 188 might appeal to price-insensitive customers USR who end up purchasing much more than just the advertised product 188. By paying for each action 188 separately as it occurs, the advertiser 72 automatically conveys to the system 174 the true underlying value of each different ad 188. The advertiser 72 is not required to know ahead of time how much each ad 188 is worth, and doesn't need to measure the value, as the system 174 inherently provides the value on behalf of the advertiser 72.

Regardless of bid method, the advertiser 72 knows that the larger its bid 252, the more likely its ads 188 will be shown 194 on any given publisher page 12, and if shown, preferably the higher or more visible on the page 12 relative to other ads 188. Thus, the more the advertiser 72 bids 252, i.e. agrees to pay 594 (FIG. 25), the more actions 86 are generated by the system 174. The advertiser 72 can therefore readily decide on the tradeoff between bid price 252 and number of actions 86, based on its own business goals.

Figure 10:
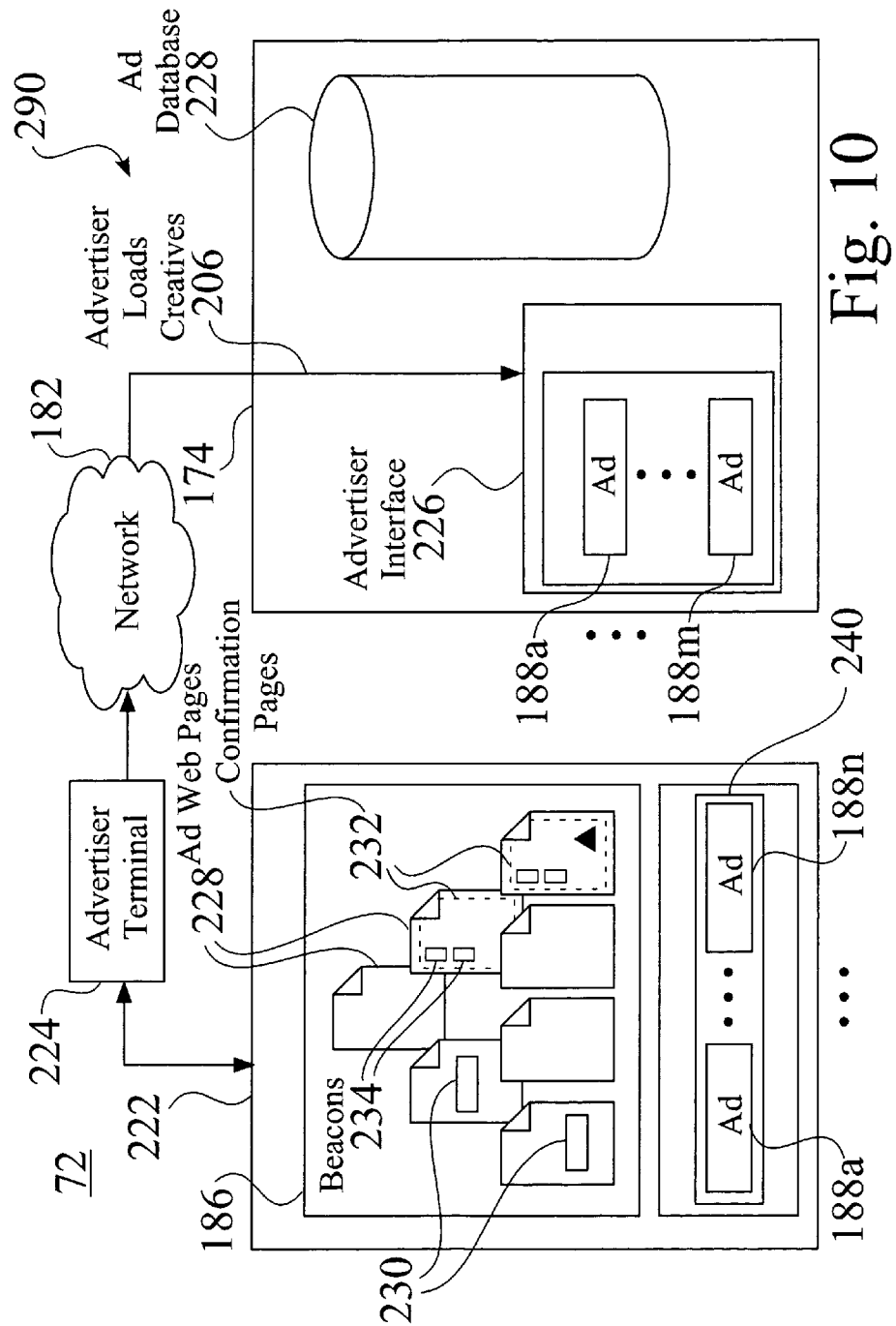
FIG. 10 is a schematic diagram of the loading of one or more creatives associated with an advertising campaign.
Figure 11:
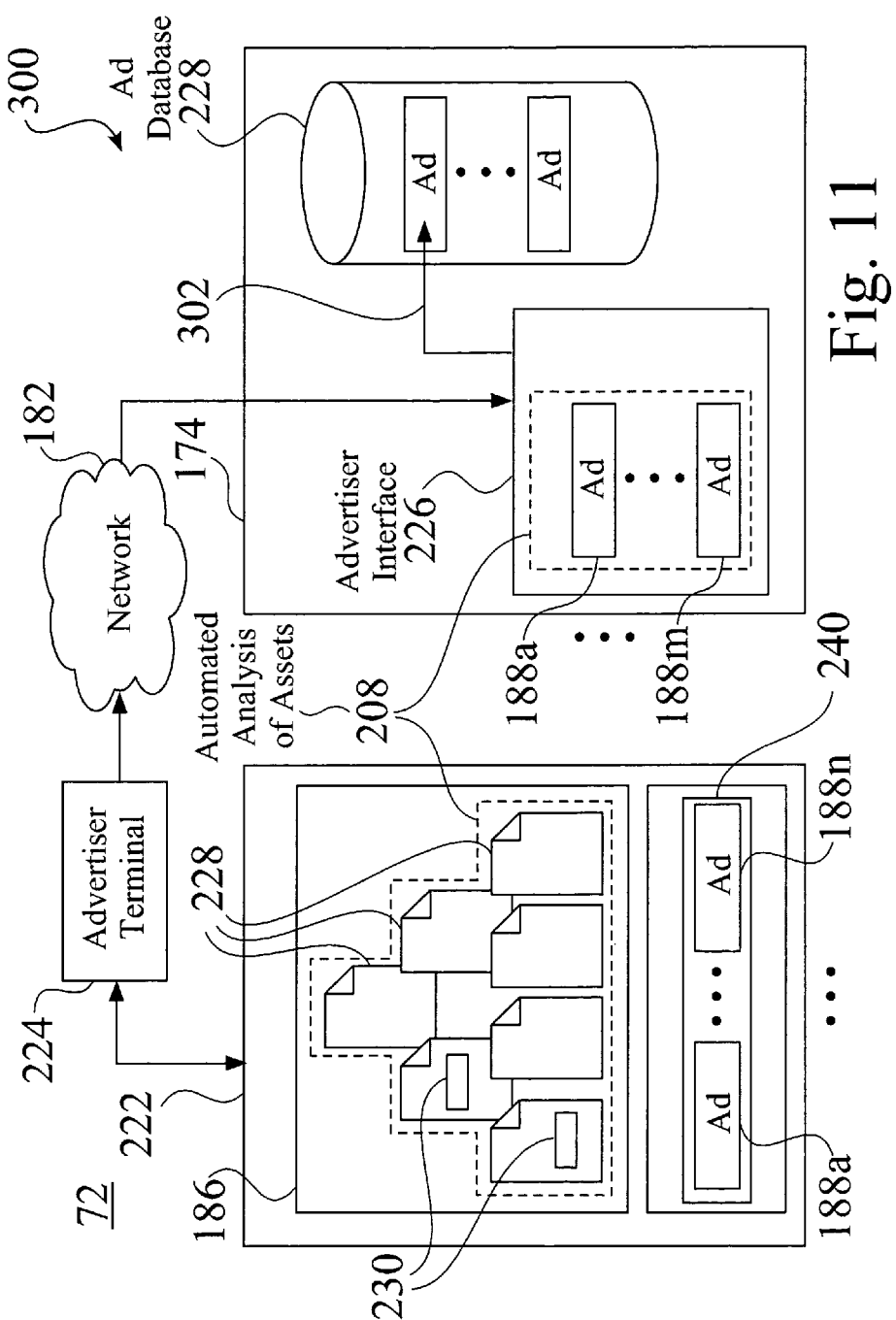
FIG. 11 is a schematic diagram of an automated analysis of assets associated with an advertising campaign.

FIG. 10 is a schematic diagram 290 of the loading of one or more creatives 188 associated with an advertising campaign 222 in an enhanced online advertising system 174. FIG. 11 is a schematic diagram 300 of an automated analysis 208 of assets associated with an advertising campaign 222 in an enhanced online advertising system 174. The enhanced online advertising system 174 automatically analyzes, i.e. configures 208 the assets associated with the entered advertiser campaign 222, including the ad web pages 188, landing pages 230, and advertisements 188 associated with the advertiser web site 186, and stores 302 the analyzed assets for use by the system 174.

As discussed above, advertisers 72 that use conventional advertising networks are typically required to input a large amount of information in regard to their own perceived relevance of their ads 188, and their own perceived relative relevance to possible publisher sites 12, e.g. such as to input a large number of key words associated with ads and their respective advertiser web site 186. Existing ad technologies require a large amount of manual effort by an advertiser to generate and target ads, and the relevance is limited to the expertise of the advertiser 72.

In contrast, the enhanced online advertising system 174 significantly simplifies interactions and inputs from an advertiser 72. As the system 174 automatically analyzes, i.e. configures 208 the assets associated with the entered advertiser campaign 222, such as to provide contextual analysis of any and all content 228,230,188,240 the relevance of the advertiser campaign 222 and ads 188 are automatically determined. As will be described below, overall relevance in the enhanced online advertising system 174 is not limited to the analysis 208 of advertiser assets 228,230,188, as the system 174 preferably provides a comprehensive determination of relevance, such as including relevance to publisher assets and relevance to users USR.

Publisher Ad Site Interaction with Enhanced Online Advertising System.

Figure 12:
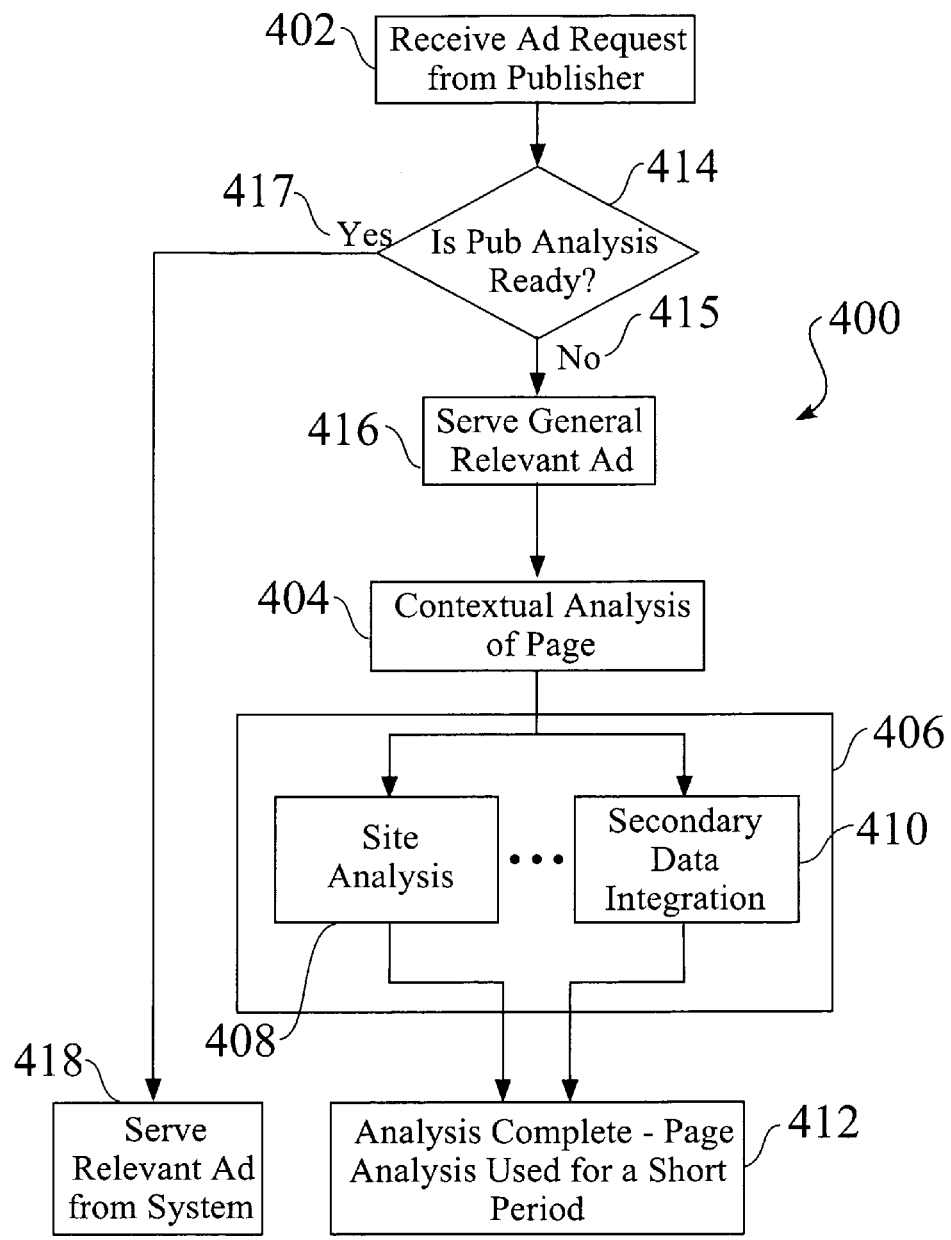
FIG. 12 is a process flow diagram for publisher input in an enhanced online advertising system.

FIG. 12 is a process flow diagram for publisher ad calls 400 in an enhanced online advertising system 174. One or more ad requests 402 are automatically generated from the browser 190 at a user device 78, when a user USR visits a web page 12 at the publisher web site 14, in response to available ad space 184 (FIG. 6) on the corresponding publisher web page 12.

Figure 19:
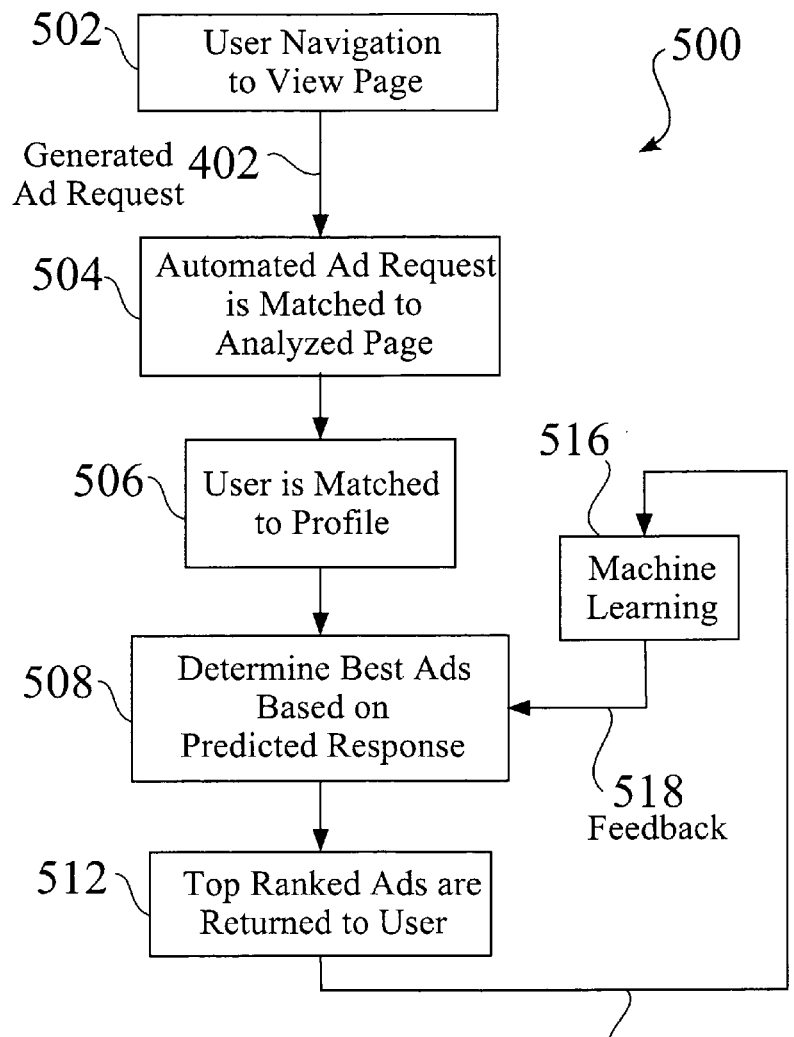
FIG. 19 is a process flow diagram of resultant system actions associated with user activity in an enhanced online advertising system.

If a determination 414 is made that prior analysis 404, 406 is ready 417, e.g. has already been performed and is considered to be fresh, i.e. current, the system 174 may proceed to determine 418 the best ad 188 or ads to serve 194, such as seen in process 500 (FIG. 19).

If the determination 414 is made that prior analysis 404, 406 is not ready 415, e.g. that some or all of the analysis 404,406 has either not been performed or is not considered to be fresh, i.e. current, the system 174 may preferably proceed to serve 416 an ad 188 of general relevance during a first ad call 402, until contextual analysis 404 can be performed. In some system embodiments 174, ads 188 that are determined to be of general relevance are selectable by publishers 76, wherein the system 174 allows each publisher to define one or more default ads 188. The system 174 can then show one or more of the default ads 188 for any publisher page 12 that hasn't yet been analyzed, until the system 174 has finished analyzing the page 12. Some system embodiments 174 may alternatively select general ads 188, based on the title of the page 12, which can be passed in the ad call 402, and/or based on one or more other feature elements associated with the publisher 76 which the system 174 has knowledge of and which require no additional analysis.

Figure 13:
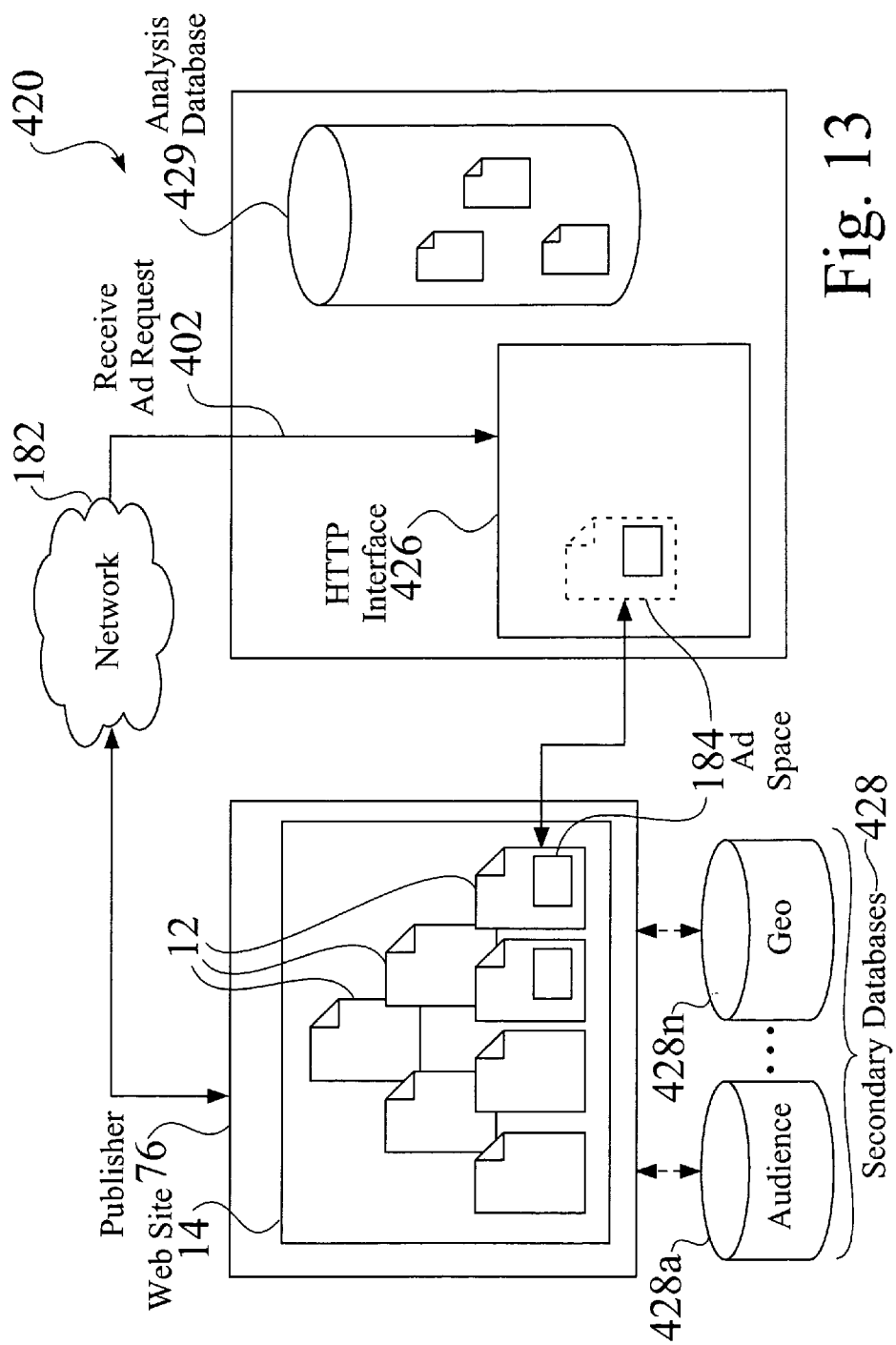
FIG. 13 is a schematic diagram of an input of an ad request in an enhanced online advertising system.

As needed, such as for new publisher content or for contextual analysis that is determined to preferably require updating, the system 174 provides an automated contextual analysis 404 of the web page 12 corresponding to the available ad space 184. The system 174 also preferably provides secondary analysis 406 of other relevant publisher assets 12, 184,428, such as but not limited to contextual analysis 408 of one or more other publisher web pages 12 associated with the publisher web site 14, and an integration 410 of secondary data 428 (FIG. 13). The results of the page analysis 404 and secondary analysis 406 are then stored 412, such as preferably for a limited time, e.g. such as for any of an hour, a day, a week, or a month, to ensure the current relevance of the stored publisher information 412.

FIG. 13 is a schematic diagram 420 of an input of a publisher ad request 402 in an enhanced online advertising system 174. An ad call 402 from a publisher web site 14 is received by the enhanced online advertising system 174, typically through an HTTP interface 426. One or more secondary information sources 428, such as but not limited to databases 428, may be directly or indirectly associated and/or relevant to the publisher 76, to the web site 14, and/or to one or more publisher web pages 12 or other content contained therein. For example, audience information 428a may provide information as to the intended or actual audience of a publisher web site 14, while Geo information 428n may provide information as to the actual location of the user USR, or an intended service region of the publisher web site 14.

Figure 14:
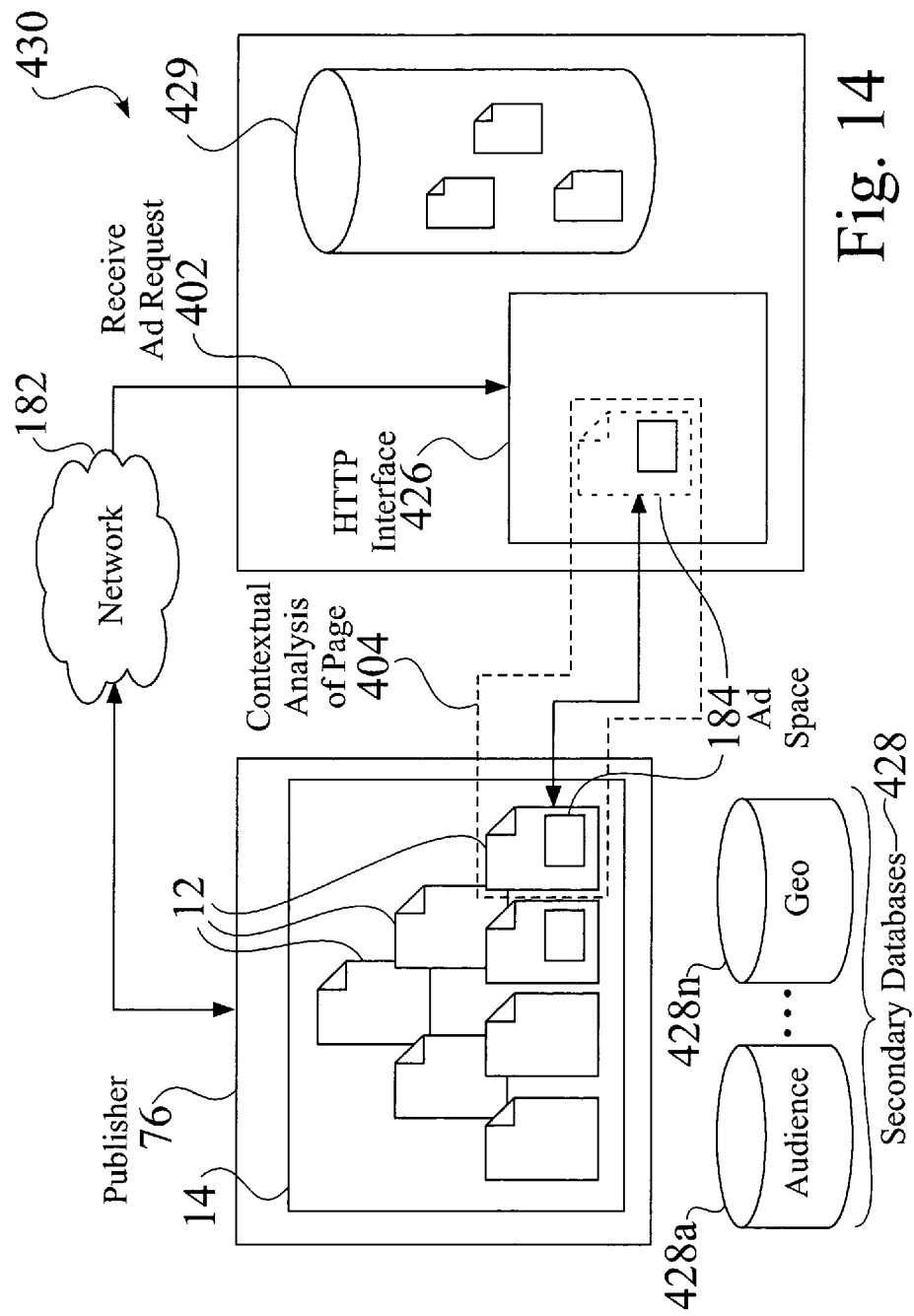
FIG. 14 is a schematic diagram of contextual analysis of a web page associated with an ad request.
Figure 15:
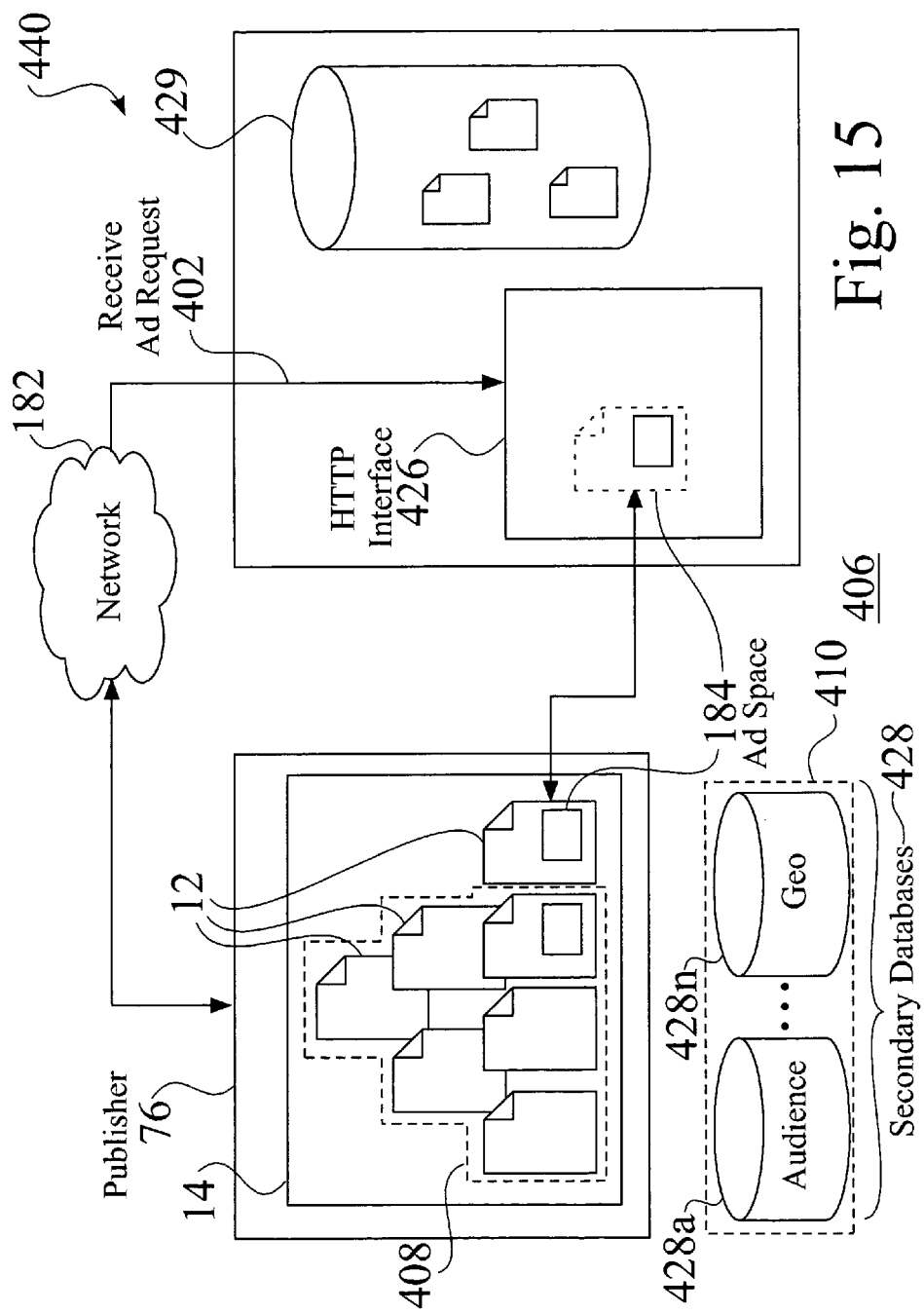
FIG. 15 is a schematic diagram of site analysis and integration of secondary data associated with an ad request.
Figure 16:
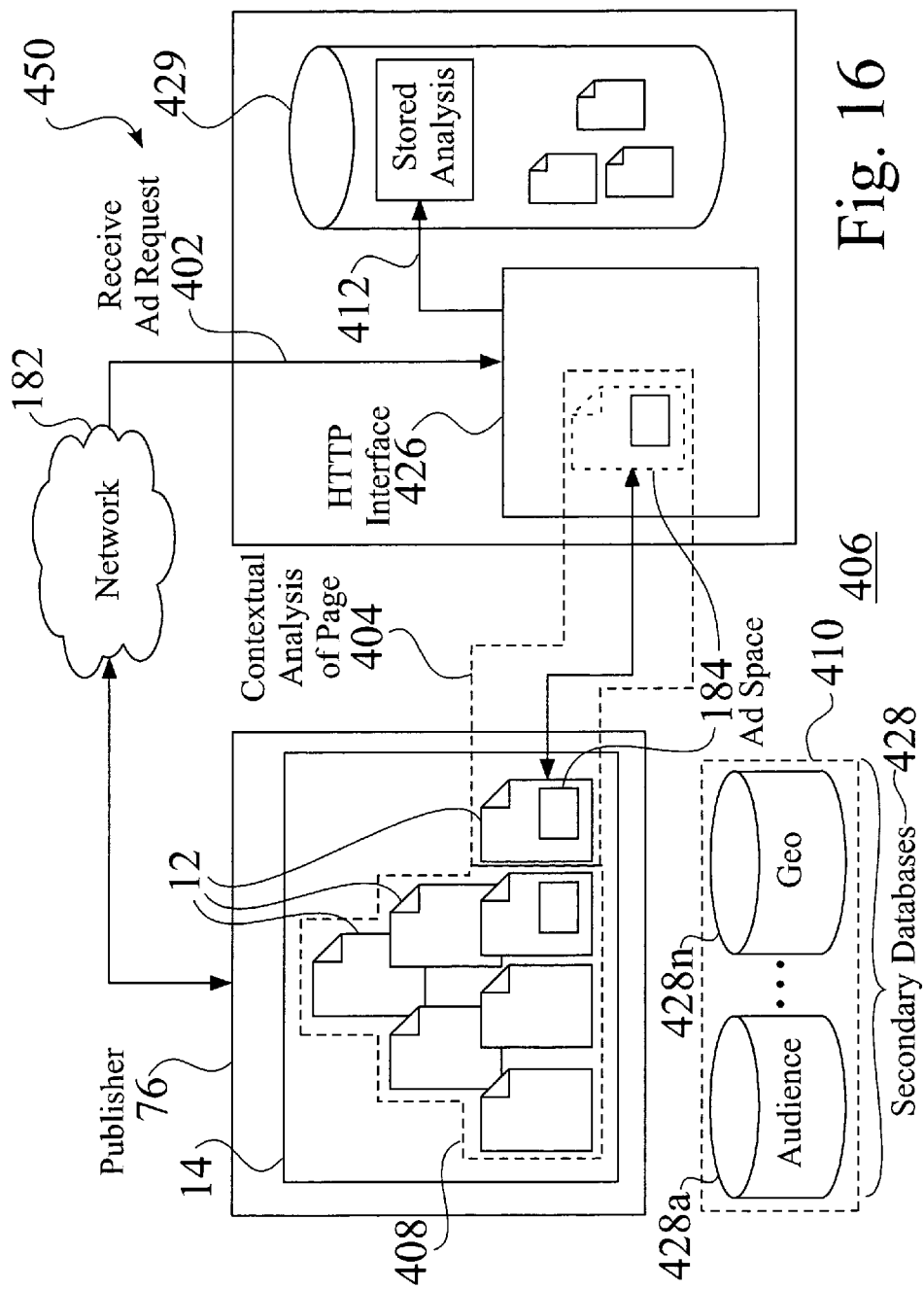
FIG. 16 is a schematic diagram of completion and storage of publisher analysis associated with an ad request.

FIG. 14 is a schematic diagram 430 of contextual analysis 404 of a web page 12 associated with an ad request 402 in an enhanced online advertising system 174. FIG. 15 is a schematic diagram 440 of site analysis and integration of secondary data associated with an ad request 402 in an enhanced online advertising system 174. FIG. 16 is a schematic diagram 450 of completion and storage 412 of publisher analysis associated with an ad request 402 in an enhanced online advertising system 174, including the results of the contextual analysis 404 of a web page 12 and preferably including the results of the secondary analysis 406 of other relevant publisher assets 428, such as but not limited to contextual analysis 408 of one or more other publisher web pages 12 associated with the publisher web site 14, and an integration 410 of secondary data 428.

Catalog Service within the Enhanced Online Advertising System.

Figure 17:
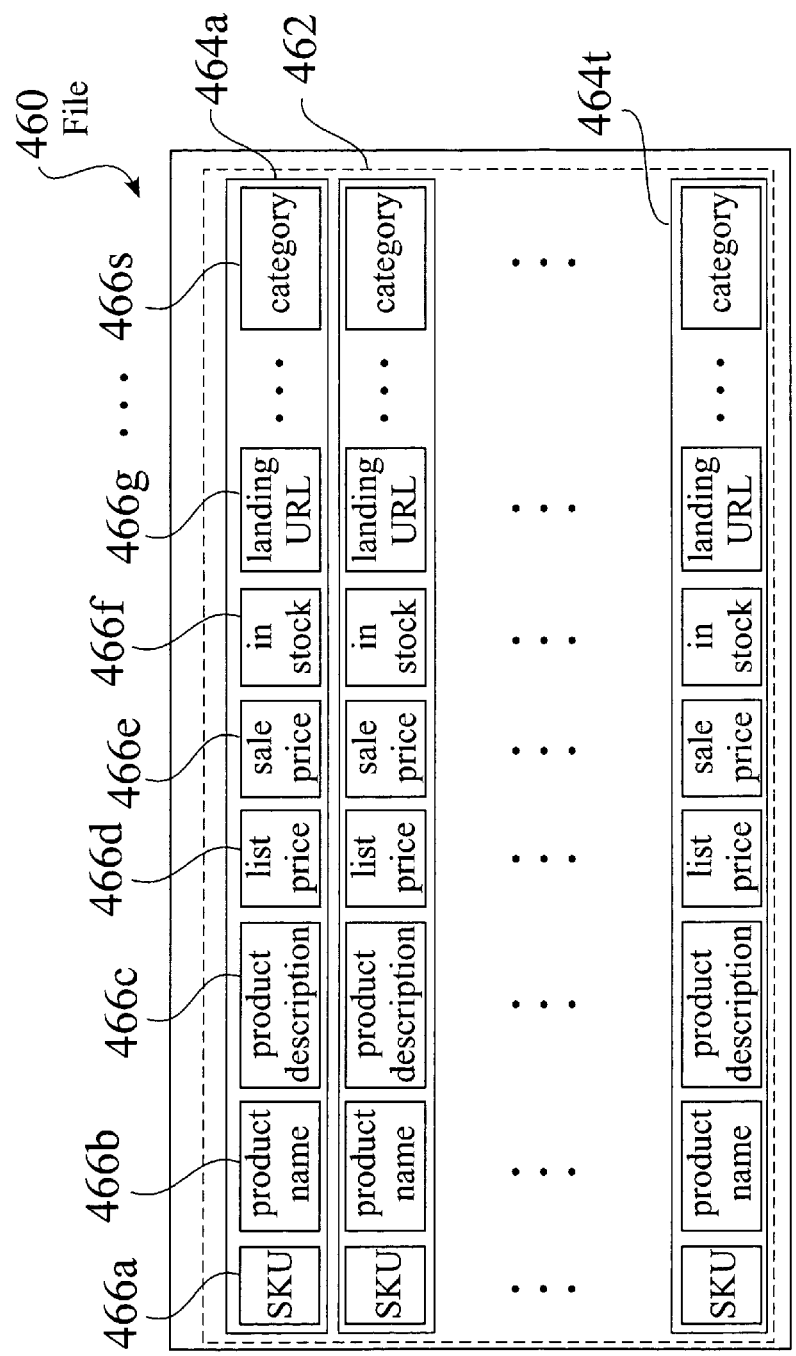
FIG. 17 is a schematic diagram of a file for a catalog of product assets and associated information.
Figure 18:
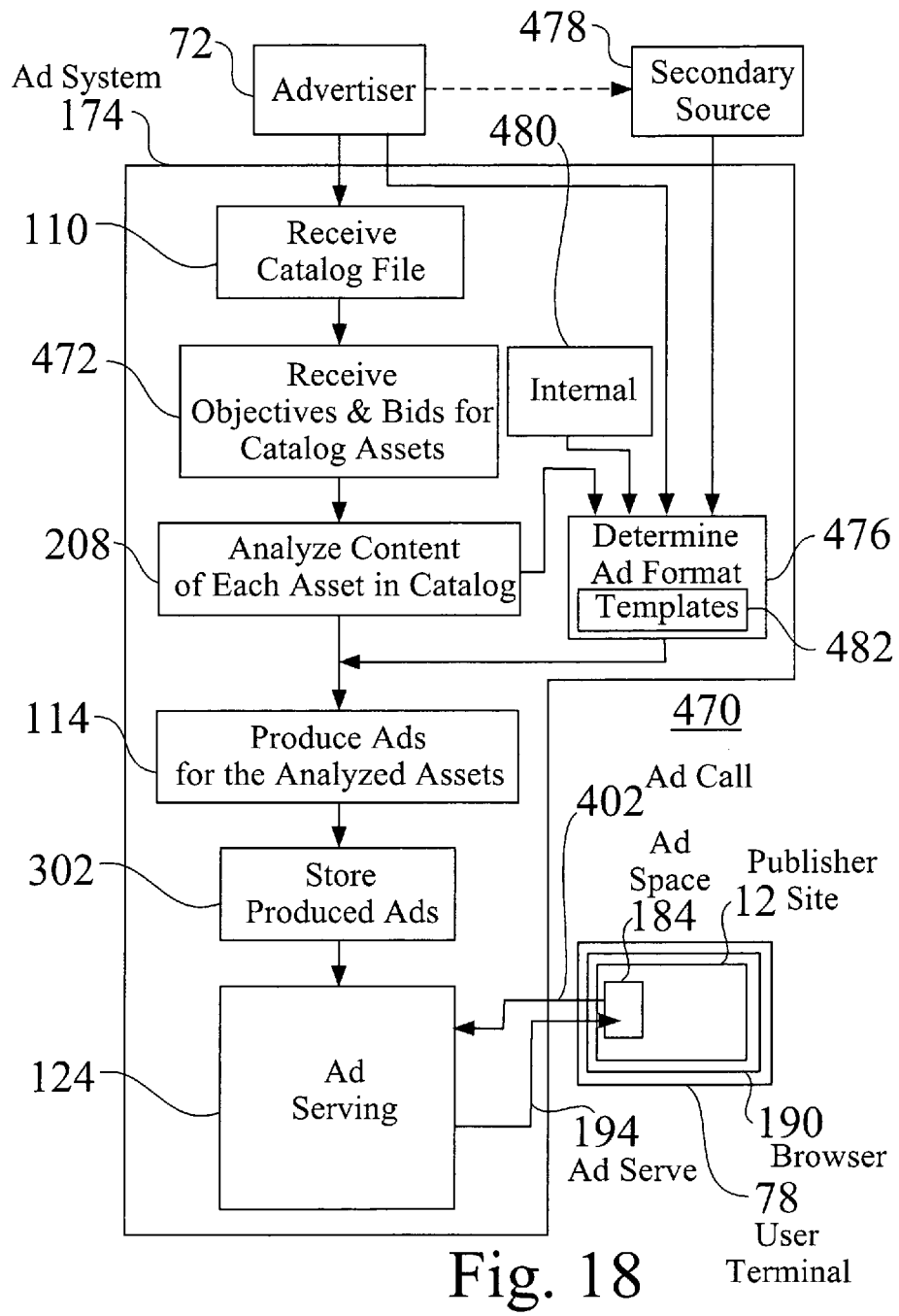
FIG. 18 is a process flow diagram for the input, analysis, ad generation and ad serving for catalog assets in an enhanced online advertising system.

FIG. 17 is a schematic diagram of a file for a catalog 462 of product assets and associated information. FIG. 18 is a process flow diagram 470 for the input, analysis, ad generation and ad serving for catalog assets in an enhanced online advertising system 174.

The exemplary file 460 seen in FIG. 17 typically comprises information regarding a catalog 462 of one or more advertiser assets, i.e. products 590, e.g. 590a,590b (FIG. 25), and is typically arranged in a file format 460 comprising records 464, e.g. 464a-464t respectively associated with assets 590, such as products 590 or services 590. Each product record 464 comprises fields 466, e.g. 466a-466s correspondingly associated with products 590, such as but not limited to an SKU 466a, a product name 466b, a product description 466c, a list price 466d, a sale price 466e, a stock indicator 466f, a landing URL 466g, a category 466s, and/or the URL of a thumbnail image of the product 590.

While some advertisers 72 may have a relatively limited number of available products or services 590, many advertisers 72, such as retail stores and/or web sites 72, often have hundreds of thousands or even millions of products 590, whereby the application of human expertise in the establishment and promotion of more than a limited percentage of a catalog 462 is often unfeasible or impossible.

The enhanced online advertising system 174 inherently provides great value to advertising entities 72 having catalogs 462 of products and/or services 590, whereby a catalog file 460 may be received and automatically analyzed, to automatically produce advertisements 188 which may be efficiently stored and served by the system 174.

As seen in the exemplary process flow diagram 470 of FIG. 18, the system 174 receives 110 a catalog file 460 from an advertiser 72, and the advertiser 72 is 10 able to input, at step 472 goals for one or more catalog items 590, such as by setting 202 (FIG. 8) objectives, i.e. actions 86 (FIG. 8) and by assigning 204 (FIG. 9) corresponding bids 252 (FIG. 9).

The bid price 252 of an ad 188 is preferably assigned from a price field 466, e.g. 466e, in the catalog 462. This is important for both ad-based CPA bids 252 and commission-based CPA bids, both of which require that each ad 188 have an assigned CPA 252.

An advertiser 72 can preferably send new versions of the catalog file 460 periodically, e.g. once a day or once a week. The system 174 identifies which items, e.g. 464,466 in the catalog 462 are new, which have been modified, and which have been deleted, and updates the ads 188 accordingly.

The system 174 preferably performs an analysis 208 of the content 466 of each of the assets, i.e. products 590 in the catalog 462, as with analysis 208 (FIG. 7) of received creatives 188. The analysis 208 typically comprises an analysis of any or all product fields 466, e.g. such as fields 466 to be included in the ad 188, as well as other field information 466. The analysis 208 may also preferably comprise extensive contextual analysis of any or all advertiser assets, such as but not limited to any elements of the advertiser web site 186, landing pages 230 and/or other advertiser web pages 228.

The system 174 then typically produces, at step 114, ads 188 for the analyzed assets 590, i.e. products 590. As seen in FIG. 18, the system 174 may also determine an appropriate format 476 for one or more of the ads 188 for an advertiser 72, such as to apply an ad template 482. The determination of ad formats 476 may preferably include input from any of the advertiser 72, a secondary source 478, e.g. such as an ad design firm associated with the advertiser 72, internal ad format input 480, e.g. such as to provide one or more ad styles, and in some system embodiments 174 may also receive input from content analysis 208.

In some system embodiments 174, business rules are expressed in a scripting language at step 476, responsive to which the system 174 selects one or more fields 466 from an asset record 464 corresponding to a catalog item 590, and transforms one or more of the fields 466, such as with an ad template 482, to produce a corresponding catalog ad 188.

As also seen in FIG. 18, the system 174 similarly stores 302 the catalog ads 188, and can integrate and serve 194 the ads 188 alongside other submitted ad creatives 188 as desired, as shown schematically by the ad serving module 122.

User Interaction with the Enhanced Online Advertising System.

FIG. 19 is a process flow diagram of automated system actions 500 associated with user activity in an enhanced online advertising system 174. When a user USR navigates 502 to view a publisher page 12 through a user terminal 78, an ad request 402 is generated and sent to the system 174. The automated ad request 402 is then matched to the stored analysis results 412 associated with the viewed page 12, which may preferably further include secondary analysis information 406 (FIG. 6, FIG. 12). The user USR is also preferably matched to a profile 524, such as an anonymous profile 524, stored in a profile database 522. One or more of the best available stored ads 188 are selectively determined 508, based on a prediction of effective impression revenue of the ads (ECPM), which is preferably a function of the stored analysis results 412 and/or the matched profile 52. One or more of the top ranked ads 188 are then returned 512 to the user terminal 78 for served display 194 (FIG. 6) within the served 192 (FIG. 6) page 12. Subsequent actions 86 are then tracked back 132 to the system 174 which, in addition to other system functions, e.g. such as but not limited to tracking of revenue, can also preferably be used for machine learning 516, whereby the system 174 provides feedback to the determination step 508.

Figure 20:
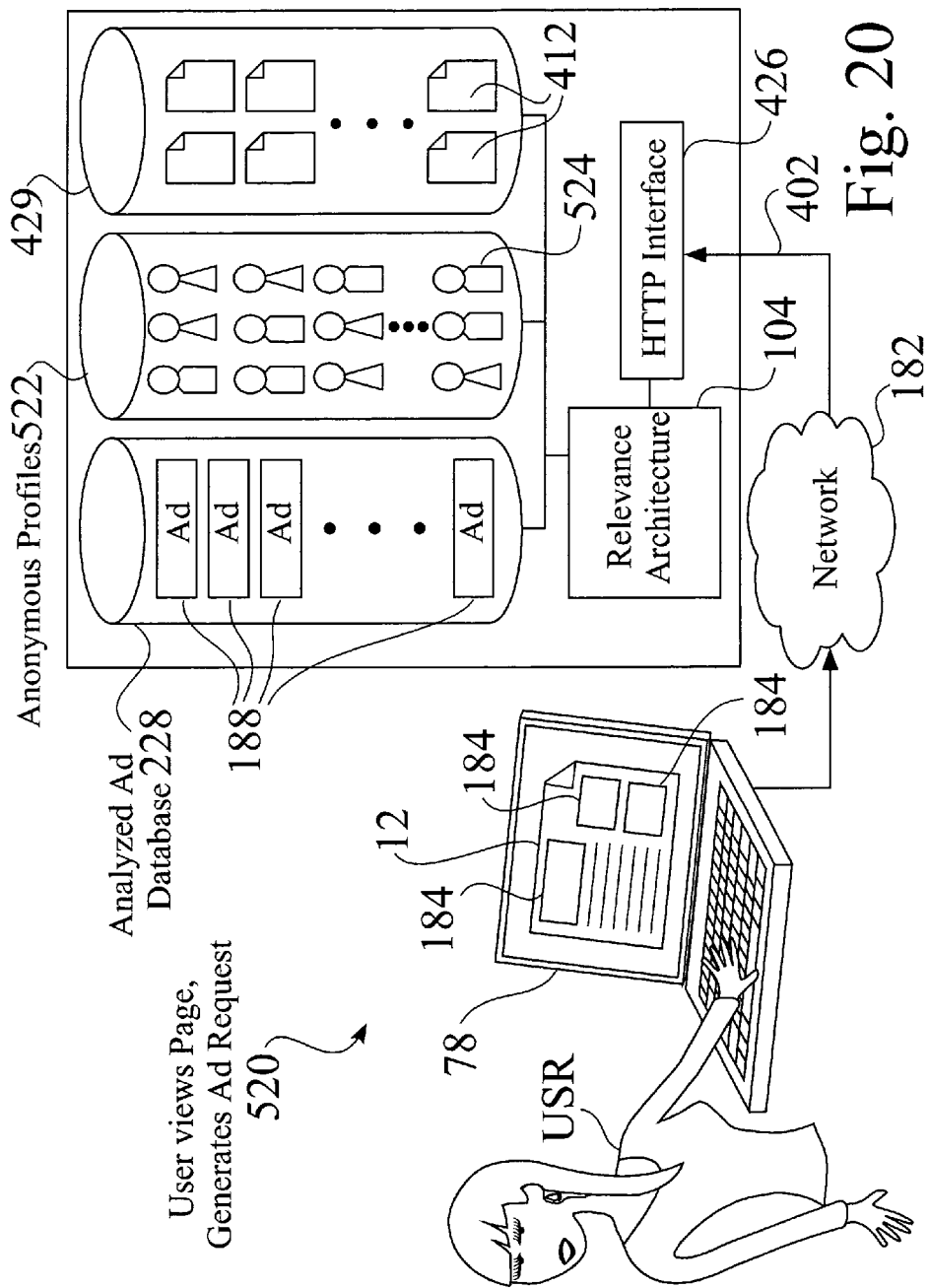
FIG. 20 is a schematic diagram of an automated ad request associated with user activity in an enhanced online advertising system.

FIG. 20 is a schematic diagram 520 of an automated ad request 402 associated with user activity in an enhanced online advertising system 174. For example, when a user USR navigates 502 to view a publisher page 12 through a user terminal 78, an ad request 402 is generated and sent to the system 174.

Figure 21:
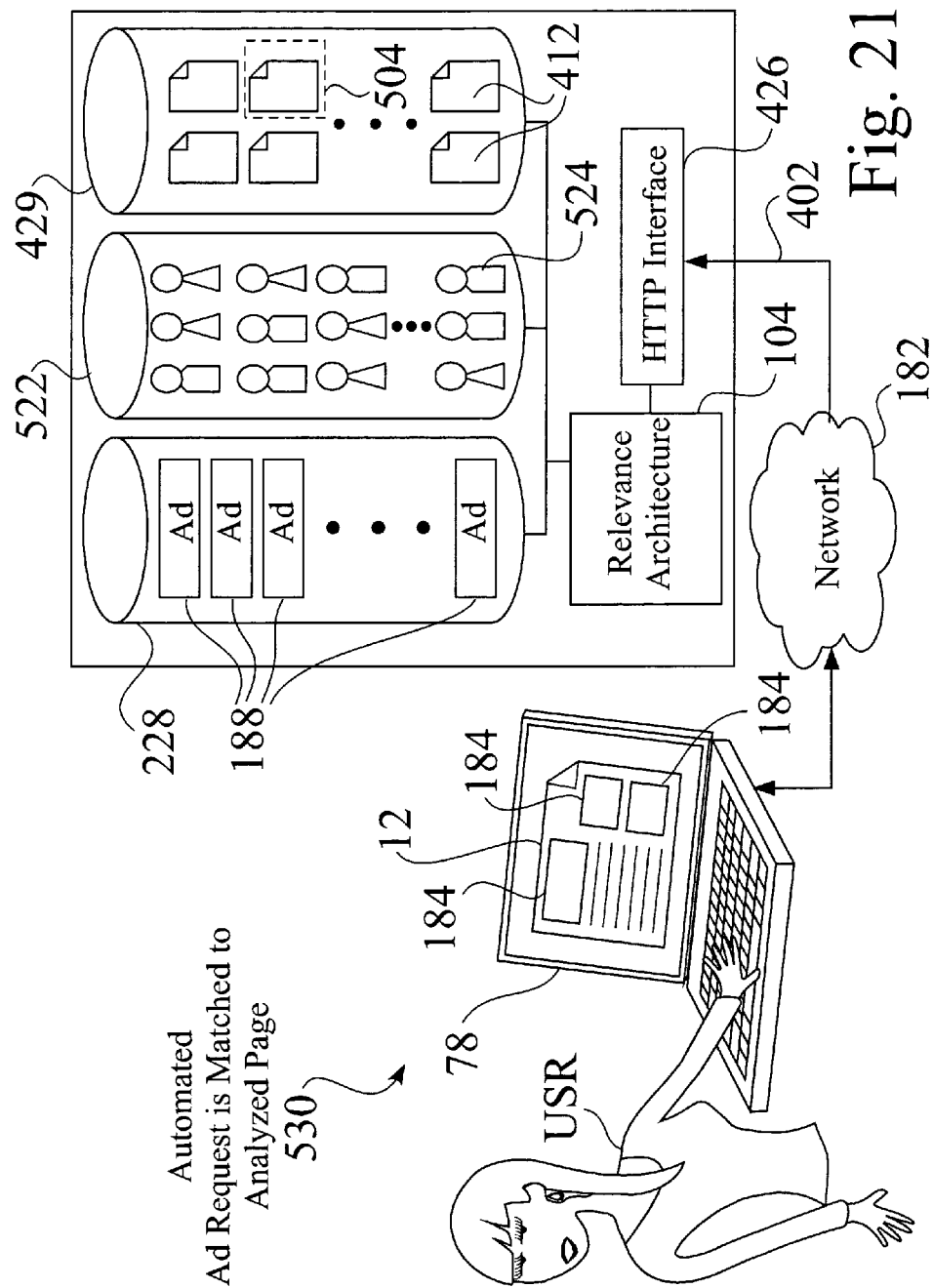
FIG. 21 is a schematic diagram of a match between automated ad request and an analyzed page.

FIG. 21 is a schematic diagram 530 of a match 504 between a received automated ad request 402 and stored analysis results 412 associated with the viewed page 12, which may preferably further include secondary analysis information 406 (FIG. 12, FIG. 15, and FIG. 16).

Figure 22:
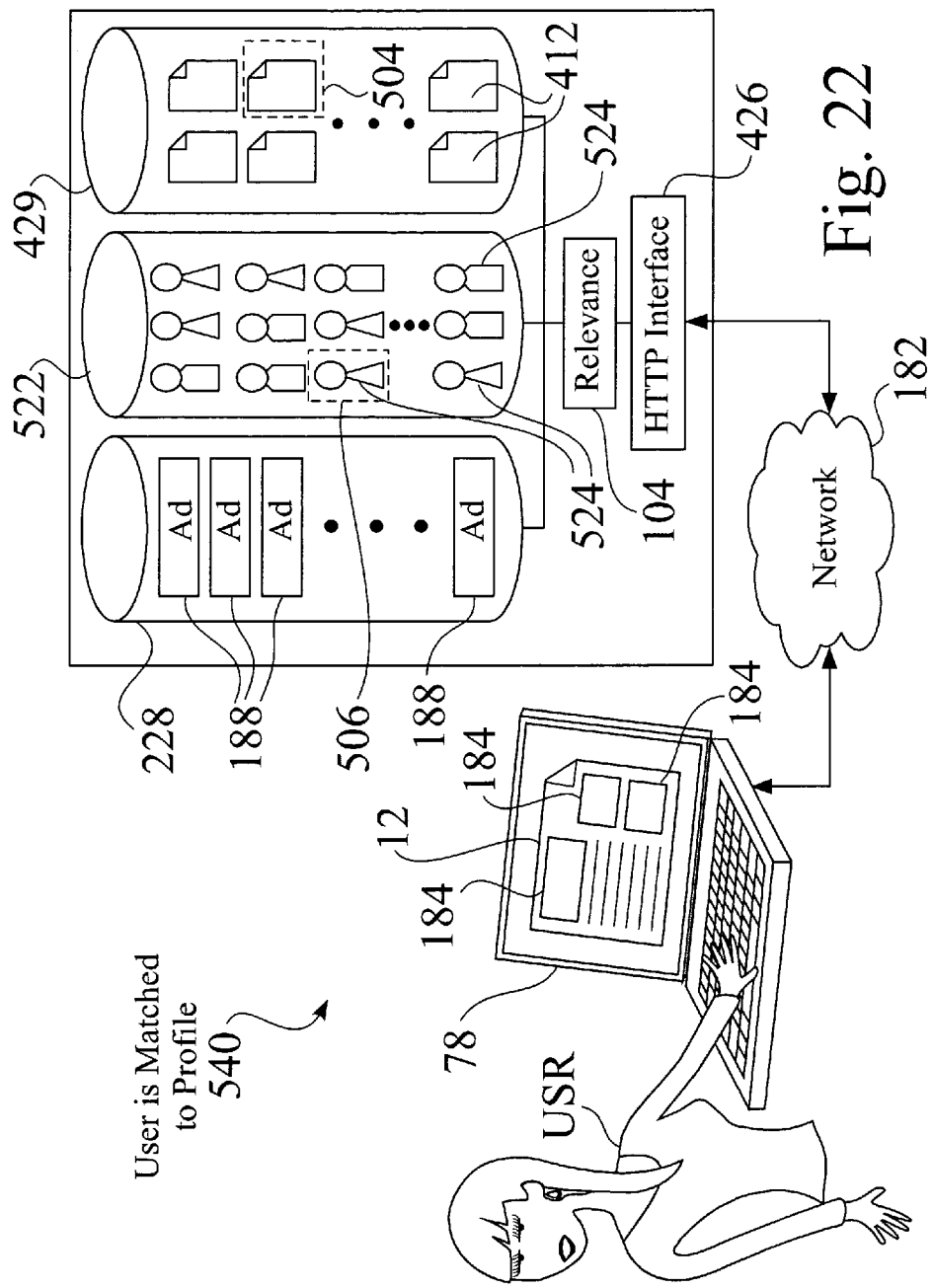
FIG. 22 is a schematic diagram of a match between a user and a stored user profile in an enhanced online advertising system.

FIG. 22 is a schematic diagram 540 of a match 506 between a user USR and a stored user profile 524 in an enhanced online advertising system 174, whereby the system 174 typically includes profile storage 522 for a plurality of profiles 524, e.g. such as anonymous profiles 524 that can be used to statistically match relevant information to a user USR, based on any known information regarding the user USR, such as any of location, gender, age, interests, purchases and usage patterns, and/or any other prior actions 86 by the user USR, such as tracked and reported by the system 174.

Figure 23:
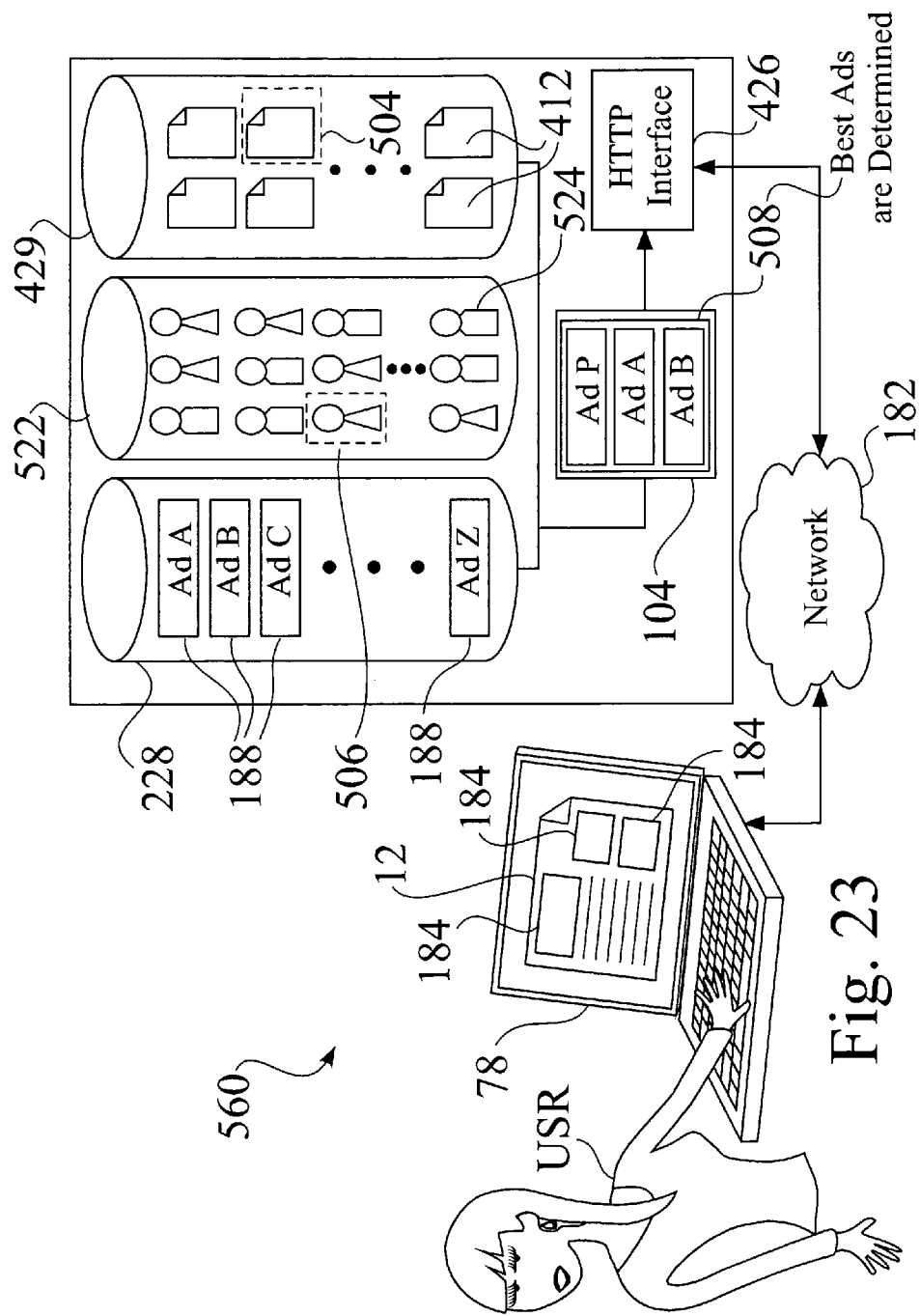
FIG. 23 is a schematic diagram of ad selection based upon predicted user response.
Figure 24:
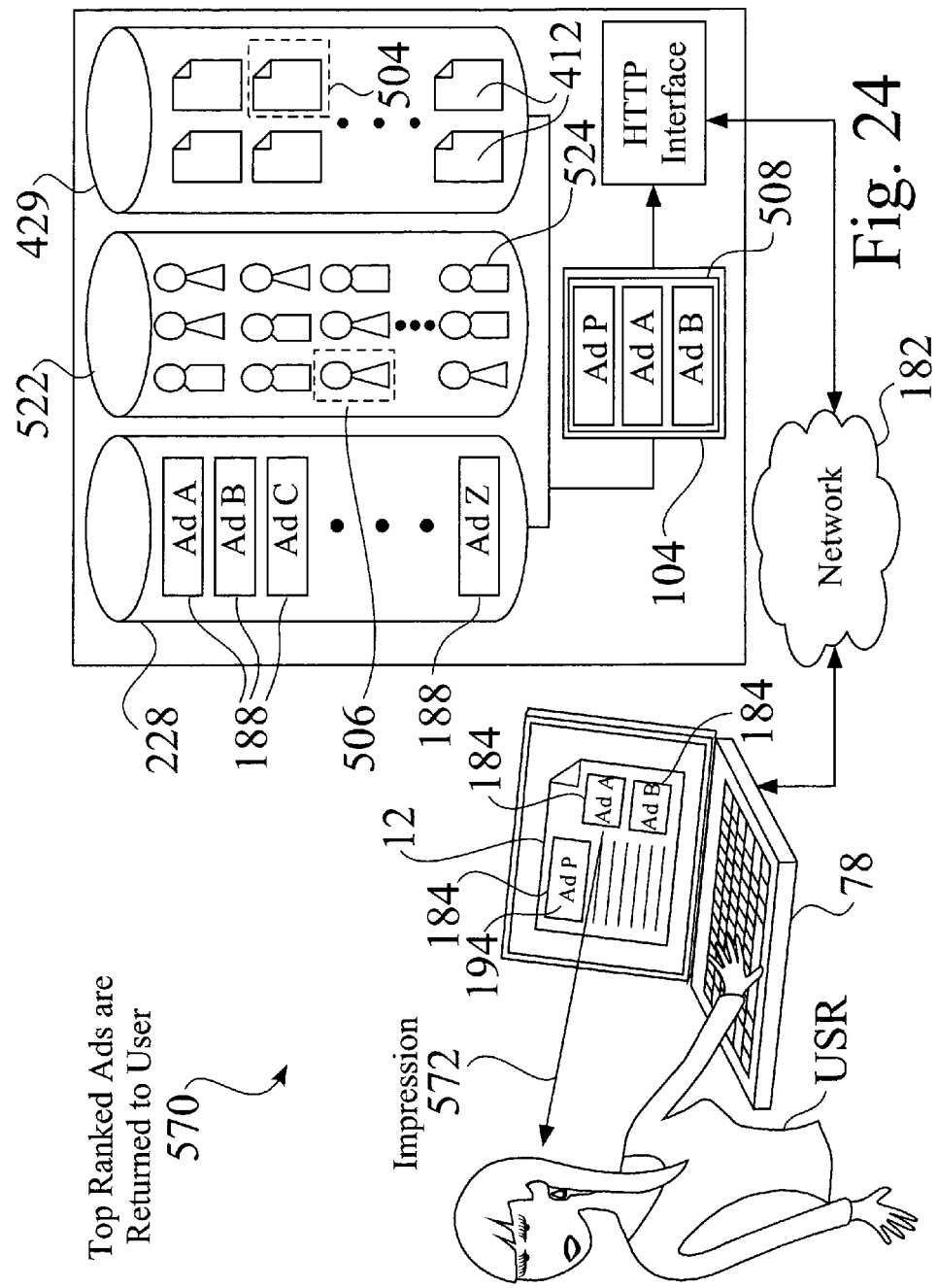
FIG. 24 shows the return of one or more top ranked selected ads in an enhanced online advertising system.

FIG. 23 is a schematic diagram 560 of selective determination 508 of ads 188, which is preferably based upon either predicted or observed effective impression revenue of the ads (ECPM), in an enhanced online advertising system 174. FIG. 24 is a schematic diagram 570 that shows the return of one or more top ranked selected ads in an enhanced online advertising system 174.

For ads 12 that appear very frequently on publisher pages 12 that get lots of traffic, the system 174 may preferably use observed action rates 86 of the ad 188 on those pages 12, such as in preference to predicted action rates.

For ads 188 that appear very frequently on publisher pages 12 that get lots of traffic, i.e. clicks 584, the system may preferably incorporate observed action rates 86 of the ads 188 on those pages 12 in addition to the predicted action rates 86. In such cases, the observed action rates 86 may often be more accurate.

For each such pair of target page 12 and ad 188, the system 174 preferably tracks the past number of impressions 572 and resulting actions 86. To get a final probability of action for estimating ECPM, the system applies a blending function B to the predicted probability p, the number of impressions i, and number of resulting actions a:

$$B(p,i,a)$$

While there are a number of possible blending functions, a preferred blending function B tests impressions i and actions a for statistical significance. For example, in one blending embodiment, if the significance exceeds a threshold, e.g. +/−5 percent with 95 percent confidence, the system 174 uses the observed action rate 86; otherwise, the system 174 uses the predicted probability 86.

FIG. 25 is a schematic diagram 580 of exemplary system functionality in the enhanced online advertising system 174. As seen in FIG. 25, when a user USR navigates 502 to a publisher page 12 having available ad space 184, the system 174 presents, i.e. serves 194 one or more ads 188, based upon effective impression revenue of the ads (ECPM).

A user USR may then select, i.e. click 584 on a served ad 188, typically by a user input 582, such as in response to an impression 572 (FIG. 24). The system 174 provides a link 586, from which the user browser 190 navigates to the advertiser site 186, such as through a designated landing page 230 associated with the ad 188.

As seen in the exemplary system embodiment 174 shown in FIG. 25, the click 584 and/or navigation 586 are typically tracked back 585, typically by a redirect URL 583 served by the system 174, such as to track 585 the click 584 as a desired action 86, and/or for tracking of click to action 593. When the redirect URL 583 is fetched, the system 174 records the click 584, and then responds with an HTTP redirect 587 to the browser 190 at the user terminal 78, which tells the browser 190 to fetch the original landing-page URL.

In regard to the exemplary click to action 593 seen in FIG. 25, for a user USR who initially clicks 584 on an ad 188 to navigate to an advertiser site 186, and who at a later time, e.g. one or two weeks later, returns to the advertiser site 186 and proceeds to purchase one or more items 590 within a click to action time 593, the action 86 is properly captured, such that payment 594 may be received from the advertiser 72, and such that payment 596 may be made to the publisher 76.

Also in regard to the click to action association window 593 shown schematically in FIG. 25, an advertiser 72 can preferably specify the number of days that can elapse between the user clicking 584 on an ad 188 and then coming back to the advertiser's web site 186 to complete the action 86. For example, a typical retailer 86 may set the association window 593 to 45 days, such that as long as a user USR who clicks on the retailer's ad 188 makes a purchase within 45 days, the system 174 gets credit, e.g. payment 594, for that action 86.

As seen on the exemplary landing page 230 in FIG. 25, the page 230 typically comprises text copy, one or more images, and purchase information regarding a product 590a, e.g. such as a bicycle 590a associated with the served ad 188. For products 590 associated with catalog ads 188, the text copy, images, and purchase information may typically correspond to field information 466 from a catalog file 460 (FIG. 17) (FIG. 18).

As also seen in the exemplary advertiser web site 186 in FIG. 25, a user USR may add one or more products 590 to a shopping cart 588, such as during navigation through one or more advertiser web pages 228. For example, the user USR may be provided with contextual links or user initiated searches from a first product 590, e.g. 590a to one or more other products 590, e.g. such as a bike helmet 590b. The user USR may then typically navigate to a confirmation page 232, such as having a shopping cart 588, which may include one or more beacons 234 associated with actions 86, such as a beacon 234a associated with lead generation 86 at the advertiser site 186, e.g. by a customer USR providing an email address and/or other contact information, a beacon 234b responsive to the entry 86 of payment information, and/or a beacon 234n responsive to a final confirmation of a purchase checkout 86 of one or more items 590 in the shopping cart 588.

The beacons 234, i.e. action tags 234, are responsive to one or one actions 86, which serve to confirm the actions 86 and are tracked back 592 to the enhanced online advertising system 174. As seen in FIG. 25, during the process of an exemplary purchase, a user USR ended up with four purchased products 590, such as the bicycle 590*a* directly associated with the served 194 ad 188, a related helmet product 590*b*, as well as 2 bike jerseys. Based upon the entered bid 252 and bid type, e.g. percentage or commission of the ad item 590*a* or of the entire shopping cart 588, a payment, credit or similar transaction 594 is typically made from the associated advertiser 72 to the system 174. Similarly, a payment, credit or similar transaction 596 is also made toward the publisher 76, such as from the system 174, typically for compensation related to placement, i.e. serving 194 of the ad 188.

As seen in FIG. 25, the enhanced online advertising system 174 greatly simplifies the generation and targeting of ads 188, and provides significantly greater ad relevance for served 194 ads 188, resulting in ads 188 that are more meaningful to consumers USR, more effective for advertisers 72, and thus more lucrative for publishers 76.

While existing ad technologies require a large amount of manual effort to generate and target ads, they provide at best mediocre relevance. In contrast, the enhanced online advertising system 174 simplifies the generation and targeting of ads 188, and also provides significantly greater ad relevance for ads to be served 194, resulting in ads 188 that are more meaningful to consumers USR, more effective for advertisers 72, and thus more lucrative for publishers 76.

The enhanced inline advertising system 174 comprises a unique combination of key elements, including:
 a pricing model based on bidded cost-per-action (CPA), in which advertisers bid and pay only for true results;
 a state-of-the-art search technology that predicts ad relevance using dozens of pieces of evidence;
 increased ad coverage via automatic generation of ads and the uniform handling of text and graphical ads; and
 a pricing model based upon bidded cost per action (CPA) pricing.

In the enhanced online advertising system 174, advertisers 72 preferably only pay for actual business results, based upon "cost per action" (CPA), which may include but is not limited to a cost per ad impression (CPM) or a cost per ad click (CPC). With CPA pricing, the advertiser 72 pays for consumer "actions" 86 resulting from the ads 188 that are meaningful to their business and are measured easily. Typical actions 86 comprise any of making a purchase, downloading a free coupon, registering for a community Web site, requesting a quote for an auto loan or mortgage, e.g. a "lead", viewing a movie trailer, and acquiring a new customer.

Some embodiments of the enhanced online advertising system 174 also provide the selected use of alternate pricing models by an advertiser 72. For example, an advertiser 72 can effectively choose to use cost per ad impression (CPM) or cost per ad click (CPC), such as by defining a desired action 86 associated with an ad to be viewing or clicking on the ad 188.

CPA pricing has long been attractive to direct-response advertisers, those who justify the spending on advertising based on immediate, measurable results. With CPM or CPC pricing, the advertiser 72 must work hard to target the ads 188 and measure their effectiveness, so as not to waste money on impressions or clicks that don't generate business. With CPA pricing, the ad network 174 assumes all the risk of targeting the ads 188, measuring their effectiveness, and generating revenue 596 for publishers 76. Advertisers 72 do not typically care about these issues, since advertisers 72 are typically only required to pay for actual business results.

A number of existing ad networks provide CPA pricing, but with significant limitations. With such conventional networks, CPA prices are negotiated manually between the network and the advertiser, resulting in inaccurate estimates of the effective impression revenue of the ad (ECPM). Since ECPM is typically used for selecting ads to be displayed, the inaccuracies result in suboptimal relevance for the consumer and revenue for the publisher. These other networks generally have a single, uniform CPA price applied to the entire run of an ad throughout the network.

Measuring Actions.

The enhanced online advertising system 174 provides the advertiser 72 with several mechanisms widely used in the industry for associating actions with impressions or clicks of ads and counting the resulting actions.

The enhanced online advertising system 174 typically provides two kinds of beacons 234 (FIG. 8), such as using images and/or JavaScript. The beacons 234 are placed on an ad web page 228, typically on a confirmation page 232 associated with an action 86 selected by the advertiser 72, to confirm the completion of the action 86 by the user USR, such as located on a purchase confirmation page 232 or a download confirmation page 232.

An image beacon 234 comprises a small transparent image 234 placed on the confirmation page 232. The image 234 is served from the enhanced online advertising network 174, with a system URL. When the user's browser 190 fetches the confirmation page 232, the browser 190 also fetches the beacon image 234, which signals to the system 174 the completion of an action 86. The system 174 typically associates the action 86 with either an ad impression 572 or click 584, using system cookies 191 (FIG. 6) that were set in the user's browser 190 when an ad 188 for that advertiser 72 was displayed or clicked.

A JavaScript beacon 234 is a JavaScript function 234 served from an URL associated with the system 174, and placed on the confirmation page 232. When the user's browser 190 fetches the confirmation page 232, the function 234 executes and examines the browser 190 for system cookies 191, in order to associate the action 86 with an ad impression 572 or click 584.

The system 174 can also utilize some kinds of third-party beacons 234, which operate in a similar manner. As well, instead of beacons 234 and cookies 191, some system embodiments 174 add a unique code in the landing-page URL of an ad 188 that identifies the particular click-through 584. The advertiser's web server 186,224 can read the code, and track the code through to completion of an action 86. The advertiser 72 can then send the system 172 a data feed of completed actions 86, along with their unique codes.

Measuring Variable CPA Actions.

In some system embodiments 172, to use the system's variable CPA pricing 252, an advertiser 72 adds a parameter to the confirmation page's beacon 234 that indicates the amount the advertiser 72 will pay for that particular action 86.

For example, a retailer 72 may preferably select to pay variable CPA 252 that comprises a percentage of the gross margin of the products 590 in the consumer's shopping cart 588. When a consumer user USR completes an action 86 the advertiser's Web application 142 (FIG. 5) generates a confirmation page 232, including the HTML for the system beacon 234. The Web application 142 computes the amount the advertiser 72 is paying for the action 86, and adds the value as a parameter to the HTML code for the beacon 234. When the user's browser 190 retrieves the confirmation page 232, it also retrieves the beacon 234, which communicates to the enhanced online advertising system 174 the actual CPA 252 associated with the action 86 for which the advertiser 72 is paying.

This approach provides the advertiser 72 with the utmost flexibility in computing variable CPA 252, while disclosing nothing except the final CPA amount to the enhanced online advertising system 174. In some system embodiments 174, the advertiser's Web application computes the actual amount of the CPA 252 dynamically at the time of the action 86, using business data and rules contained within the application 142. The business rules can be as simple or as sophisticated as the advertiser 72 is willing to implement. In some system embodiments 174, the only information typically transmitted to the enhanced online advertising system 174 is the computed CPA amount 252. For example, a retailer 72 paying a percentage of its shopping cart gross margin typically transmits the CPA amount 252 to the enhanced online advertising system 174, and is not typically required to transmit information regarding the specific products in the cart 588, their purchase price, or the gross margin.

Inherent Fraud Protection.
Attempted "Cheating" by an Advertiser.

In an event wherein an advertiser 72 tries to cheat enhanced online advertising system 174 and its publishers 76 by withholding some or all beacons 234 acknowledging completed actions 86 for an ad 188, the advertiser 72 is inherently only cheating itself. For example, in such an event, the enhanced online advertising system 174 notices that the rate of actions 86 has fallen, and thus computes a lower ECPM ranking 510 for the ad 188, whereby the ad 188 is then less likely to be displayed 194, if at all. An advertiser 72 therefore inherently lowers the bid price 252 associated with an ad 188 by attempting to cheat on the reporting of beacons 234.

Similarly, if a variable-CPA advertiser 72 puts a lower price in its beacon 234 in an attempt to cheat the enhanced online advertising system 174, such an advertiser 72 simply lowers the expected CPA 252 from the ad 188, and thus the ad's ECPM ranking 510, whereby the ad 188 is less likely to be shown 194.

Click Fraud Versus CPA Fraud.

As discussed previously, click fraud is a serious problem for ad networks using CPC pricing. For example, it's very easy for a fraudster using off-the-shelf software to generate "bots" that repeatedly click on ads 188, thereby sapping the budgets of advertisers 72 and possibly generating fraudulent revenue for unscrupulous publishers 76. But compared to click fraud, it's much harder to perpetrate CPA fraud with the enhanced online advertising system 174, as such fraud is much easier to detect.

For example, a fraudster first might grab a copy of the system beacon 234, and write a bot to retrieve it repeatedly, in the hope that it would generate multiple action reports. As with click fraud, this is easy to detect, since multiple beacon retrievals come from the same source IP address. As well, for many if not most advertisers 72, such a fraudster would have to make a purchase to obtain a copy of the beacon 234.

A more sophisticated fraudster would realize this, and may alternately write a bot that fetches the beacon 234 from multiple machines 78, perhaps hundreds or thousands of them ("zombies" taken over by spyware). The enhanced online advertising system 174 easily detects this as well, by only recognizing a small number of actions 86 to be recorded for each unique ad click 584 (FIG. 25) or impression 572 (FIG. 24). When the enhanced online advertising system 174 serves an ad click 584 or impression 572, the system 174 typically writes a system cookie 191, containing a 64-bit random number identifying the click 584 or impression 572. When the corresponding beacon 234 is repeatedly fetched, such as by a bot, the enhanced online advertising system 174 typically accepts only the first action report 592 (FIG. 25) with that 64-bit number in the beacon's cookie 191, while discarding subsequent action reports 592. Therefore, if a fraudster tries to fabricate 64-bit click/impression ids, the probability of guessing a valid id is extremely small. As well, all of the tracking data corresponding to the landing URL and cookie 191 is preferably cryptographically encrypted and signed, such that it is virtually impossible for a fraudster to fabricate an identification of a click 582 or impression 572.

A less sophisticated fraudster might focus his attention on beacons 234 for advertisers 72 whose actions don't require a purchase, such as a free coupon download. Such a fraudster may attempt to write a bot that clicks on an ad 188 and then clicks on the associated beacon 234. As before, simple IP-address filtering by the system 174 identifies such fraudsters.

While more sophisticated fraudsters may attempt use a large number, i.e. an army, of zombie terminals 78, such actions are readily directly defeated by advertisers 72 using a CAPCHA or other similar mechanism that verifies if a human USR, rather than a bot, is interacting with its ad Web pages 228 (FIG. 8). For example, CAPCHAs often require the user USR to enter a scrambled sequence of letters that only human users USR can read.

Relevance: State-of-the-Art Search Technology.

The enhanced online advertising system 174 displays highly relevant ads 188 to users USR by applying state-of-the-art search technology. To select ads for a publisher web page 12 and a user USR, the enhanced online advertising system 174 gathers a large amount information about the page 12, the publisher 76, the advertiser 72, and/or the user 72, and may preferably include many other factors. The gathered and stored information is referred to herein as the "context". The enhanced online advertising system 174 then uses the context like a search query, such as to search in real time, or to search and then briefly cache 635 (FIG. 30), through millions of ads 188 to find the few ads 188 that are most relevant to display 194.

Defining Relevance in the Enhanced Online Advertising System.

The enhanced online advertising system 174 preferably defines the relevance of an ad 188 for a given context to be exactly the effective revenue, e.g. the ECPM, which the enhanced online advertising system 174 expects to receive if it displays the ad 188 in that context.

An ad 188 by its very nature represents a commercial exchange with the user USR. An ad 188 is therefore important to the user USR to the degree that the user USR finds it useful in completing a commercial exchange. If a consumer USR clicks on an ad 188 she or he thinks is interesting but then fails to complete the exchange, then most likely that ad 188 is not of ultimate value to the consumer USR. That is, the more likely a consumer USR is to complete a commercial exchange, i.e. an action 86 via an ad 188, the more value the ad 188 has to the consumer USR, and the higher the effective revenue.

As well, a commercial exchange involving small amounts of money is typically less important to a user USR than one involving large amounts. For example, a typical user USR cares much more about purchasing a $30,000 car than a $10 book. The CPA price 252 of an ad 188 is typically directly proportional to the value of the commercial exchange 86. Thus, the higher the CPA price 252, the higher the value to the user USR of the underlying commercial exchange, and the higher the effective revenue.

Thus, both the rate at which consumers USR respond to an ad 188 and the monetary value of the ad 188 determine the importance of the ad 188 to the consumer 188. Therefore, in preferred embodiments of the enhanced online advertising system 174, factors that determine the effective revenue of an ad 188 are dependent on both the rate at which consumers USR respond to an ad 188 and the monetary value of the ad 188.

Relevance and Relevance Features in the Enhanced Online Advertising System.

Some conventional ad technologies typically require test campaigns to measure how well an ad 188 performs in a given context. Such testing often limits the relevance of the ads 188, the number of ads 188, and the number of publisher pages 12 that can be effectively targeted.

In contrast, the enhanced online advertising system 174 is able to predict the revenue related to an ad impression 572 for an ad 188 that has never even been seen before, in a context, e.g. a publisher page 12 and user USR that have also not been seen before. The enhanced online advertising system 174 can therefore inherently be scaled to provide highly accurate and relevant targeting for virtually an unlimited number of ads 188 and publisher pages 12 and users USR. Advertisers 72 can freely generate many different ads 188 to accomplish the same goal, such as to find out which ads 188 work best in which contexts, at a cost much lower than other ad solutions.

As well, the enhanced online advertising system 174 preferably provides a predictive technology that is based on machine learning 516 (FIG. 19). While traditional ad solutions typically use only a few variables, such as key words and phrases manually entered by an advertiser 72, the enhanced online advertising system 174 is inherently scalable to incorporate a significantly large number, e.g. dozens or even hundreds, of relevance features into the predictions of relevance.

As seen in FIG. 19, actions 86 are tracked back 132 to the system 174 which, in addition to other system functions, e.g. such as but not limited to tracking of revenue, can also preferably be used for machine learning 516, whereby the system 174 provides feedback 518 (FIG. 19), to improve the predicted response of selected ads 188, at step 508 (FIG. 19).

Machine learning 516 produces a function P that preferably takes as input all of the "relevance features" of the ad 188, the advertiser 72, the target page 12, the publisher 76, and the user USR, and predicts the probability that the user USR will take action 86 on that ad 188 in that context. These features are represented as a feature vector 814 (FIG. 29) of numbers, and the function P maps the feature vector 814 to a predicted probability of action 86. The feature vectors 814 may typically comprise hundreds of elements each.

In some system embodiments 174, the machine learning algorithm 516 produces P using training data 132, e.g. comprising at least a portion of the tracked actions 86, that typically comprises a very large number, e.g. 100K or more, of examples, where each example corresponds to an ad 188 presented in a context to a user USR, and whether or not the user USR took action 86. Each example is represented as an input feature vector and output of 0 (no action) or 1 (action). The training data 132 preferably comes from the ad network 174 itself, by randomly sampling the examples from the millions of presentations 194 of ads 188 the network 174 makes every day.

The machine-learning algorithm 516 is retrained frequently, as frequently as once a day, which allows the system 174 to continually optimize the prediction function P based on the current advertisers 72 and publishers 76, the current users USR, and the current time of year.

In some system embodiments 74, many different machine-learning algorithms 516 are applied to the tracked training data 132, such that the system 174 can apply 518 whatever algorithm 516 that provides 518 the best results 508.

Furthermore, some embodiments of the enhanced online advertising system 174 preferably incorporate both text features and behavioral features, e.g. past behavior of users, to determine and present ads 188 having the greatest predicted value to each user USR. In addition, machine learning allows the system 174 to quickly incorporate new relevance features, such as for embodiments of the system 174 used for different markets, e.g. interactive television.

Some embodiments of the enhanced online advertising system 174 provide a wide variety of relevance features, such as but not limited to term matching, category matching, concept matching, context identification, brand power, time, action history, and or user behavior.

In term matching, the system 174 may preferably consider term matches between a publisher site 12 associated with an ad call 402, and advertising sites 186 associated with ad creatives 188, wherein the term matching may consider any of:
  one or more levels of headings;
  proximity of terms, e.g. such as using an N-word phrase dictionary or a term distance computation;
  synonyms matching, e.g. thesaurus based;
  mutual information; and
  term expansion, e.g. such as using relevance feedback and/or corpus thesaurus.

Category matching between system entities, e.g. between publisher assets and advertiser assets, may be based on externally defined categories, such as ODP, Yahoo, advertising industry codes, and/or may be based on categories constructed by the system 174, such as automatically constructed, i.e. clustered categories, and/or manually constructed ad vertical categories. In some system embodiments 174, categories are represented by any of a simple list, a hierarchy, and/or or a multi-hierarchy, in which a subcategory may be included in more than one supercategory. Such hierarchies are sometimes called "taxonomies".

Some system embodiments 174 provide URL-matching based on determined distances, such as corresponding to ODP categories. If a page 12 is determined to belong to two or more categories, the distance may be calculated based on best match or weighting, e.g. such as wherein the determined weight is a measure of the parts of the taxonomy path that are in common. For example, the system 174 may consider length of path in common divided by the average of various path lengths.

In some system embodiments 174, category variables may also drive weighting of other features, wherein the system 174 may list the categories as feature values, so the learning algorithm, i.e. relevance component 104 (FIG. 5) can use other variables differently, based on the category value. As well, some system embodiments 174 take into account the past aggregate action rates on each pair of target page category and ad category.

Category matching in the enhanced online advertising system 174 may also take into account market-basket analysis of categories, and/or URL based page classification using URL components, e.g. such as based on prior knowledge of an advertiser 72.

In embodiments of the enhanced online advertising system 174 that provide concept matching, the system 174 may provide page level concept extraction and matching, such as for between any of a target page 12, an ad creative 188, such as comprising ad fields, e.g. ad copy 466, and a landing page 230. As well, the system 174 may provide paragraph level concept extraction and matching, such as for but not limited to blog and/or news bulletin formats 12. In some embodiments of the enhanced online advertising system 174, concepts are recognized by building extended word-connectivity graphs, e.g. such as using WordNet™, and finding the near-disjoint-subgraphs.

In embodiments of the enhanced online advertising system 174 that provide context identification, the system may consider the content and user interface, i.e. layout of the context, such as for any type of context, e.g. email, search, blog, RSS, news, and/or product review. In some systems 174, the type of context is obtained by any of programmatically detecting the type, by using third-party classification, e.g. such as provided by comScore, and/or by manual classification. For example, the context may be recognized by user intent and/or propensity to click 584. Contextual identification may also be used by the system 174 in regard to the position of available ad space 184, such as at the top, right, left, or bottom of a publisher page 12, such as wherein the position is determined by the system 174 or provided to the system 174 by code associated with the publisher page 12.

Some embodiments of the enhanced online advertising system 174 may preferably consider brand power in relevance determinations, such as based on the name or associated identity of a publisher 76 and/or advertiser 72, and/or by rates of user traffic to the publisher or advertiser sites, e.g. Nielsen, comScore, or Alexa, and/or by the measures of Web links referencing the publisher sites 14 and/or advertiser sites 186.

Some embodiments of the enhanced online advertising system 174 may preferably consider time in relevance determinations, e.g. the time of day, day of week, the number of days before or after a holiday or annual event, the particular holiday or annual event, and the season of the year.

As well, some embodiments of the enhanced online advertising system 174 may preferably consider action histories in relevance determinations. For example, the system 174 may preferably record each measure of action history, e.g. such as clicks, actions and revenue, which may be tracked and calculated per unit time and/or total, and may also preferably be weighted by an exponentially decreasing function. In some system embodiments, the action histories are preferably input into the relevance function 104, such as to create a positive feedback loop. In some system embodiments 174, action histories comprise any of:

Number of clicks per {page, publisher} and {ad, advertiser} pairs;

Number of actions per {page, publisher} and {ad, advertiser} pairs; and/or

Revenue per {page, publisher} and {ad, advertiser} pairs.

Furthermore, some embodiments of the enhanced online advertising system 174 may preferably consider the behavior of users USR. For example, the system 174 may preferably provide matching between geographic locations of the user USR and the advertiser 72, such as based on IP addresses.

As well, the past performance of an advertiser 72 with users USR in the same geographic location as the current user USR, such as based on IP address, may be considered to be relevant. For example, the IP address of the current user USR may be determined to be relevant in conjunction with the past performance of ads 188 by the advertiser 72, e.g. the system may observe a distribution of the response to an advertiser's ads 188 by geographic location, using the IP address of the users USR who have completed actions 86, wherein a ranking feature comprises the percent of all users USR who have responded to the advertiser USR who are in the same geographic region as the current user USR. Such location-based relevance may preferably be used for advertisers 72 and/or ads 188 that have a geographic appeal, such as for ads 188 for a service-based company that are particularly relevant to regions in which the company serves, or for business entities 72 that have regional stores near a user USR.

The system 174 may also consider any of recency, frequency, and/or monetary behavior of a user USR, such as by a site or page category. For example, a browser 190 at a user terminal 78 corresponding to a user USR can be tagged, using anonymous cookies 191, whereby the recency, frequency, and/or monetary behavior of a user USR is reported and tracked, such as in regard to a user profile 524 anonymously associated with the USR, which is stored 522 and then preferably integrated with relevance determinations 104.

The system 174 may also preferably integrate matching of demographics between {advertiser 72, product line 462} and {publisher 76, publisher site 14 and/or section 12}. Demographics may include the distribution of age, gender, household income, geographic region, or level of education across the visitors to the advertiser or publisher sites. For example, the system 174 may provide demographic matching based on external information, e.g. data from comScore, or may determine demographic matching based on data provided by advertisers 72 and publishers 76.

As well, the system 174 may also preferably integrate the purchase habits of users USR through the use of external data, e.g. PRIZM.

Pricing Architectures in the Enhanced Online Advertising System.

In some preferred system embodiments of the enhanced online advertising system 174, every time the system 174 receives an ad call 402 from a publisher page 12, the system 174 conducts a real-time auction among advertisers for the ad slots 184 (FIG. 6) on the page 12. The advertisers' ads 188 that will deliver the greatest revenue per ad impression (RPAI, what the industry calls ECPM, or cost per thousand impressions 572) are chosen for the page 12.

In the enhanced online advertising system 174, however, advertisers 72 are not required to submit their bids 252 in units of RPAI. Instead, advertisers 72 typically bid and pay for actions 86, which are not necessarily limited to impressions 572 or clicks 584 (what the industry calls CPA, or cost per action). The system 174 then automatically translates CPA bids 252 into RPAI bids, based on an estimation of the probability that an action 86 will occur given an ad impression 572 (FIG. 24).

In preferred system embodiments of the enhanced online advertising system 174, the system allows the advertiser 72 to bid a maximum CPA 86 for actions 86, whereby the advertiser 72 will not be required pay more than a specified maximum CPA 252 for an action 86. As well, for actions 86 associated to an ad click, the total CPA the advertiser 72 actually pays is reduced from the maximum to an incremental value more than that needed to maintain ranking for the ad 188 above the next highest-ranked ad 188.

Setting CPA Bids.

The system typically measures actions using beacons 234, and advertisers 72 associate CPA bids 252 for actions 86 with the corresponding beacons 234. For a given ad campaign 222, the system 174 preferably provides advertisers 72 with different selectable methods for assigning CPA bids 252 to actions 86, such as by ad-based CPA 252, beacon-based fixed CPA 252, or beacon-based commission CPA 252.

Ad-Based CPA.

In ad-based CPA bidding 252, there is one beacon 234 in the campaign, and a CPA bid is assigned to each ad within the application. Whenever an ad 188 is clicked and eventually triggers a beacon 236, the system 174 uses the assigned CPA of the ad 188, times a bid factor associated with the ad 188, as the CPA bid 252 for the beacon 234.

For example, for a retailer 72 that is resistant or unable to put a variable-CPA beacon 234 on their confirmation page 232, the retailer can pay different CPAs 252 in ad-based CPA 252, based on the likely product 590 that is purchased, whereby actions 86 are associated to the most recent ad 188 clicked.

Beacon-Based Fixed CPA.

In beacon-based fixed CPA bidding, there are multiple beacons 234 in a campaign 222, with a different CPA bid 252 assigned within the advertiser application 142. When a beacon 234 is triggered, the CPA bid 252 is determined to be the amount assigned to the beacon 234, times the associated ad's bid factor.

For example, an exemplary private search entity 72 may have three different actions 86 they want to track: downloading a search toolbar, signing up for an email list, and doing paid search on the entity's site. Using beacon-based fixed CPA 252, each action 86 may be designated as a different amount 252 by the entity 72. A user USR clicking on an ad 188 could end up generating one or more of the actions 86, and different ads 188 may lead to different average mixes of actions, e.g. one ad 188 can drive users USR primarily to the download, while another ad 188 can drive users USR primarily to an email list.

Beacon-Based Commission CPA.

In beacon-based commission CPA bidding, there is one beacon 234 in the ad campaign 222, and the total value of the action 86 to the advertiser 72, such as the total value in a shopping cart, is passed dynamically via the parameter in the beacon call 234. The action's CPA bid 252 is equal to that value, times the bid factor of the associated ad 188.

For example, a sophisticated retailer 72 may want to assign a "true value" to each action 86, e.g. such as the total value in the shopping cart 588, and pay for the advertising accordingly, such as for some ads 188 that statistically yield a larger-value shopping cart 588 than other shopping carts 588.

For all three methods of assigning bids described above, the system 174 allows the advertiser 72 to associate a "bid factor" with an ad 188, the ad group 240, or the campaign 222. A bid factor allows the advertiser 72 to make instant adjustments to CPA bids 252, without reloading ad catalogs or changing server-based business rules setting commission CPA 252. For example, a catalog retailer 72 using ad-based CPA 252 can assign the list price 466d (FIG. 17) of each item 590 being advertised to the corresponding ad 188. The retailer 72 can then set a bid factor to be a percentage of the list price 466d that should be paid as the CPA 252. Similarly, a retailer 72 using beacon-based commission CPA 252 passes the value of the shopping cart 588 (FIG. 25) in the beacon call 234, and sets the bid factor to be the percentage of the shopping cart 588 that is bid as the CPA 252.

With all the bidding methods described above, the advertiser 72 can preferably define the maximum number of actions 86 from any one beacon 234 that can be associated with a single ad click. This "action cap" defaults to 1. When the action cap is set greater than 1, a variable number of actions 86 can be associated with an ad click, and thus the total CPA associated with the ad click is variable. Similarly, with commission CPA 252, the total CPA associated with an ad click is variable.

Estimation of RPAI.

As noted above, the system 174 may preferably rank each ad 188 according to the estimated effective revenue the system 174 will receive by displaying the ad (RPAI). The system 174 estimates an ad's RPAI as the probability of a user USR taking at least one action 86 on the ad 188, times the estimated total likely bidded CPA (TLBC) that the advertiser 72 is willing to pay for actions resulting from the ad 188, as shown:

$$RPAI(ad) = Pr(actions \geq 1 | ad\ shown\ on\ target\ page) * TLBC(ad)$$

The probability of at least one action 86 occurring from the ad 188 is preferably estimated by a machine-learned model, and refined by observations.

Estimation of the total likely bidded CPA resulting from actions 86 associated to an ad 188 is not always straightforward, since multiple actions 86, and actions 86 with varying CPA, can be associated with a single click on an ad 188. As well, different ads 188 can drive much different mixes of actions 188 and varying CPA 86. For example, a beacon 234 with varying CPA may generate maximum CPA values varying from $1 to $100, with an average of $53. Rather than assuming that $100 is the maximum CPA the advertiser is willing to pay, the system may preferably assume the maximum is $53, such as to avoid an overestimation of the maximum CPA that could over rank the ad 188.

For ads 188 that generate a large number of actions 86, the system 174 may preferably estimate TLBC based on past history of the ad 188. However, many ads 188 do not have enough actions, or any actions at all, for the system 174 to observe a valid average. In such cases, the system may preferably estimate the TLBC for an ad 188 from aggregate behavior of all ads 188 in the same ad campaign 222.

The formulae for the estimates of TLBC are based on the application-assigned CPA of ads and beacons, which allows the advertiser to adjust those assigned CPAs up or down and achieve instant changes in total likely bidded CPA.

Each method of pricing requires a different way of estimating TLBC. The estimates below use observed data for an individual ad 188 or, if there isn't enough such data, the observed data for the containing campaign 222 (FIG. 8). As well, sophisticated estimates can be made by using observed data from the ad group 240 (FIG. 8), from the advertiser 72, from similar advertisers 72, and/or from similar ads 188 with other advertisers 72.

Estimation of Ad-Based CPA.

In ad-based CPA, the estimated total likely bidded CPA (TLBC) is defined as the assigned bid 252 of the ad 188, times the average number of actions associated with each ad impression generating at least one action:

$$TLCBC(ad) = \text{assigned\_CPA}(ad) * \text{action\_rate}(ad) * \text{bid\_factor}(ad)$$

where $$\text{action\_rate}(ad) = \frac{\text{number of actions triggered by } ad}{\text{number of clicks on } ad\ \text{generation at least 1 action}}$$

In situations where there aren't enough action-generating clicks on ad 188 to get a statistically valid average, e.g. if the denominator is <10, then the action rate for the campaign 222 may preferably be used instead, as shown:

$$\text{action\_rate}(campaign) = \frac{\text{number of actions triggered by any } ad}{\text{number of clicks on any } ad\ \text{generating at least 1 action}}$$

If the denominator is <10, the action rate for the campaign is 1. Note that if the action cap is 1, action rate(ad) is always 1.

Estimation of Beacon-Based Fixed CPA.

In a beacon-based fixed CPA pricing model, the estimated total likely bidded CPA (TLBC) is defined as the sum, over all beacons 234 for an ad campaign 222, of the CPA of the beacon 234, times the average rate at which the beacon 234 is triggered for that ad 188, as shown:

$$TLBC(ad) = \text{bid\_factor}(ad) * \sum_{\substack{\text{Every beacon in} \\ \text{the advertiser}}} \text{assigned\_CPA}(beacon) * \text{action\_rate}(beacon, ad)$$

where:

$$\text{action\_rate}(beacon, ad) = \frac{\text{number of actions on beacon triggered by ad}}{\text{number of clicks on } ad \text{ generating at least 1 action}}$$

If there aren't enough action-generating clicks 86 on ad 188 to get a statistically valid average, e.g. if the denominator is <10, then the action rate for the campaign 222 may preferably be used instead, as shown:

$$\frac{\text{action\_rate}}{(\text{beacon, campaign})} = \frac{\text{number of actions on beacon triggered by any } ad}{\text{number of clicks on any } ad \text{ generating at least 1 action}}$$

If the denominator is <10, the campaign action rate for a beacons is 1.

Estimation of Beacon-Based Commission CPA.

In a beacon-based commission pricing method, the system 174 requires advertisers 72 to assign a CPA 252 to each ad 188, as well as pass a total value in the associated beacon call 234. The assigned CPA is typically the list price 466*d* of the item 590 in the catalog 462 being advertised, and the bid factor is the percentage of the shopping cart 588 the advertiser 72 wishes to pay 594 the system 174 as a commission. The estimated TLBC is therefore the assigned CPA of the ad 188, times a bid adjustment factor, as shown:

TLBC(ad)=assigned_CPA(ad)*adjustment_factor (ad)* bid_factor(ad)

The bid adjustment factor for beacon-based commission pricing represents how much the shopping cart 588, e.g. all actions or purchases 86 that are triggered by an ad 188, typically differs from the assigned CPA of the ad 188, as shown:

$$\text{adjustment\_factor}(ad) = \frac{\sum_{\substack{\text{Every action} \\ \text{triggered by ad}}} \text{assigned\_CPA}(action)}{\sum_{\substack{\text{Every click on ad} \\ \text{generating at least 1 action}}} \text{assigned\_CPA}(ad) \text{ at time of click}}$$

wherein the assigned_CPA(action) is the value passed to the system 174 by the advertiser 72 on the beacon call 234. If there aren't enough action-generating clicks on ad to get a statistically valid average, e.g. if the denominator is <10, then an adjustment factor for the campaign 222 may preferably be used instead, as shown:

$$\text{adjustment\_factor}(campaign) = \frac{\sum_{\substack{\text{Every action} \\ \text{triggered by any ad}}} \text{assigned\_CPA}(action)}{\sum_{\substack{\text{Every click on ad} \\ \text{generating at least 1 action}}} \text{assigned\_CPA}(ad) \text{ at time of click}}$$

If the denominator is <10, the adjustment factor for a campaign is 1.

Computation of Moving Averages.

The estimates of total likely bidded CPA (TLBC) typically require computing moving averages of various statistics of actions 86 associated to clicks generating at least one action 86. To compute these averages, the system 174 preferably records at least the following information about each action 86, as shown:

action id;
click id;
ad id;
campaign id;
time of click;
assigned_CPA (ad) at time of click; and
assigned_CPA (action).

Since actions 86 are relatively rare events, the system 174 may preferably retain these records for very long periods of times.

As an example of a moving average computation over N days, e.g. N=30, W can represent the number of days in a campaign's click-to-association window. The current average is computed over a period of click times that starts W days ago and extends to W+N−1 days ago. An attempt to use more recent data would not be valid, since not all of the actions for recent clicks would have occurred yet.

In the above example, if there isn't at least W+N days of data for the campaign 222, e.g. such as because the campaign 222 is new or because the statistics have been reset, then the oldest N days (or parts thereof may preferably be used to compute the average.

The moving averages are computed very efficiently by the system 174, such as by maintaining in a database the summaries of the numerators and denominators for ads 188 and campaigns 22, covering the time period of the moving average. Periodically, such as once a day, the action records are scanned, wherein actions 86 whose time of click starts exactly W days ago are added to the summaries, and actions whose time of click starts W+N days ago are removed from the summaries.

For an exemplary system 174 that has $10^9$ ad calls per month, such a system 174 may have approximately $10^5$ actions per month, or about 30K actions per day. Thus, there would be at most $10^5$ ad summaries maintained at any one time, and at most 60K action records to process on a daily basis, e.g. every night.

The ad-level averages are preferably reset whenever the text of the ad 188 or its landing page 230 change. The campaign-level averages are preferably reset whenever a campaign changes "significantly", e.g. when more than 25% of the ads 188 have had their averages reset. The system 174, such as through client services, preferably includes means to reset the averages of ads 188 and/or campaigns 222, such as by commands or controls.

In some system embodiments 174, the system 174 preferably monitors such resetting activity, such as to monitor whenever the averages are reset for possible attempts to game the system by an advertiser 72.

Bidded CPA: Reducing the Maximum CPA and Invoicing.

Some embodiments of the enhanced online advertising system 174 preferably use a type of second-price auction, by which advertisers 72 are able to price their actions 86 according to their true value to the advertiser 72. In a second-price auction, the goods go to the highest bidder, but the highest bidder pays just a little more than the second-highest bidder. The highest bidder thus has assurance that he or she does not pay too much by submitting a bid that reflects the true valuation of the good or service.

In such a system 174, the system 174 promises advertisers 72 that they will pay a CPA for one or more actions 86 associated with an ad 188, which are just high enough to maintain the ad's ranking 510 above the next highest-ranked ad 188. When an ad 188 is displayed 194, the system 174 computes an estimated reduced bid amount that the advertiser 72 should pay for actions 86 associated to that impression of the ad 188, using the following formula:

$$\text{reduced\_CPA}(ad_1) = \min\left( \begin{array}{c} TLBC(ad_1), \\ Pr(action \mid ad_2) * TLBC(ad_2)/Pr(action \mid ad_1) + \$0.10 \end{array} \right)$$

where $ad_2$ is the next-highest ranking ad after ad. The system 172 then preferably discounts all actions resulting from that impression of the ad 188, such as by the following factor:

$$\text{discount\_factor}(ad_1) = \frac{\text{reduced\_CPA}(ad_1)}{TLBC(ad_1)}$$

The discount factor and the bid factor are recorded in the redirect URL of the ad 188 and then in the user cookie 191, when the user clicks on the URL. When an action 86 for that click occurs, the advertiser 72 is invoiced for the action 86 with the discount applied as shown:

discount_factor($ad_1$)*assigned_CPA(action)*bid_factor($ad_1$)

Details of Advertising Entities in the Enhanced Online Advertising System.

FIG. 26 is a functional hierarchy 600 of the entities in the system used to represent advertising agencies, advertisers, and ads. An agency 602 may typically be associated with or comprise a group 604 of one or more advertisers 72, and also typically includes account management 606. One or more campaigns 608 are associated with an advertiser 604. As well, one or more ad groups 616 are typically associated with each campaign 608, wherein the ad group 616 typically comprise any of one or more text ads 618, graphical ads 620, hybrid ads 622, or rich media ads 624. A beacon library module 610, a creative library module 612, and a performance report module 614 are also typically associated with the advertiser module 604.

Detailed System Architecture Principles.

Figure 27:
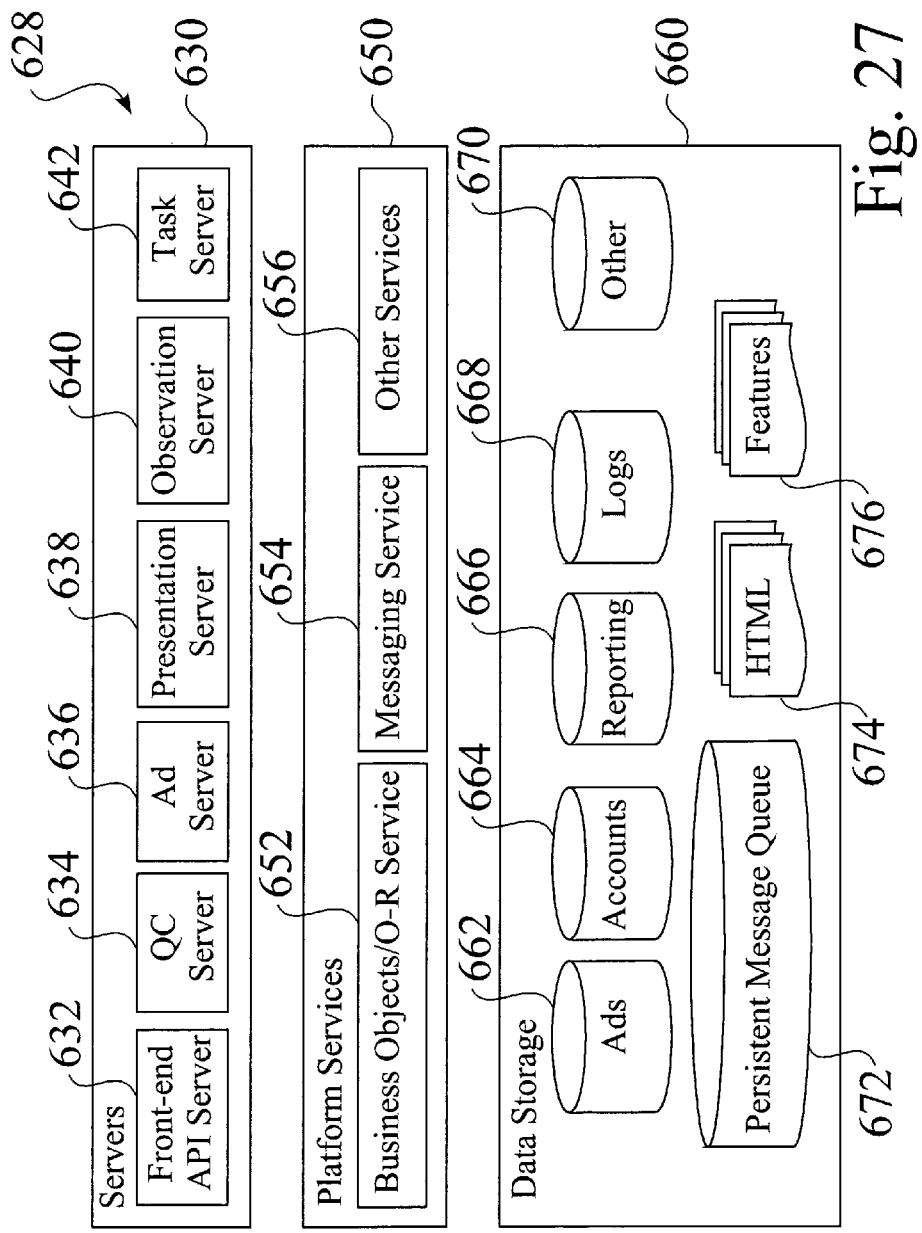
FIG. 27 is a detailed schematic view of logical components associated with an exemplary embodiment of an enhanced online advertising system.

FIG. 27 is a detailed schematic view 628 of logical components associated with an exemplary embodiment of an enhanced online advertising system 174. In preferred embodiments of the enhanced online advertising system 174, any architectural component whose volumetric requirements can increase over time is preferably scalable, wherein scalability is preferably obtained by the addition of hardware, after any necessary performance optimizations are made on the core code.

As well, all components are preferably designed with fail-over in mind. In addition, all critical data is preferably stored on redundant storage, which is preferably local to a particular server, and/or stored at a cluster-accessible storage, e.g. such as DB, NFS, SAN or similar. Ad serving is preferably de-coupled from ad management, such as if the ad management system goes down, the ad server 636 can continue to function. As well, ad serving and ad management preferably have different uptime requirements.

As seen in FIG. 27, a front-end/API server 632, e.g. a tomcat based server 632, runs the advertisers and publisher applications 142 (FIG. 5). The front end server 632 also typically supports API-based manipulation of the ads 188 and other business objects.

One or more query coordinators 634, i.e. QC servers 634, distribute browser, i.e. runtime ad requests 402 across the ad servers 636. An ad server 636 searches a subset of the ads 188 in response to requests from the query coordinator 634, and returns 914 (FIG. 30) the best ads 188 for the associated request 908 (FIG. 30) to the query coordinator 634.

A presentation server 638 accepts ad requests 402 from the network and forwards them to the query coordinator 634. The presentation server 638 also formats ads 188 that are selected by the query coordinator 634 with snippets of HTML. The presentation server 638 also acts as a click redirector for landing-page URLs, and it tracks the invocations of beacons 234.

An observation server 640 monitors the budgets for ads 188 and ad campaigns 222, click-through rates, click-to-action rates, and coordinates pausing/stopping ads 188 in the system 174.

As well, a distribution server 702 (FIG. 28) acts as a propagator of new and updated ads 188 and their feature vectors 814 (FIG. 29) to the rest of the system 174. The distribution server 702 also gives the target page feature vectors 12 to the query coordinators 634.

A scheduler 704 (FIG. 28), e.g. a singleton process, kicks off periodic system tasks, e.g. such as but not limited to hourly, every eight hours, nightly, and/or weekly.

Task servers 642 comprise generic worker servers 642 for performing various off-line tasks in the system 174. All offline activities are typically designed to be executed by one or more task servers 642.

Servers 630 typically use platform services APIs 650 to perform common tasks, like reading and writing business objects or communicating with other servers 630. For example, business objects/O-R service 652 reads and writes business objects in the system 174, such as but not limited to ads 188, accounts, and/or bills.

While the business objects/O-R service 652 is not typically used for logging impressions or clicks, the business objects/O-R service 652 may be used for reading/writing feature vectors 814 (FIG. 29), if performance is sufficient. In most system embodiments 174, the primary role of the business objects/O-R service 652 is to allow applications to manipulate business objects in the system 174, while ensuring transactions (ACID) and relationships between the objects.

A messaging service 654 is used by the servers 630 to reliably communicate with each other. Servers 630 use reliable data storage directly or indirectly via services, and are typically associated with databases and pure file system mechanisms.

Figure 28:
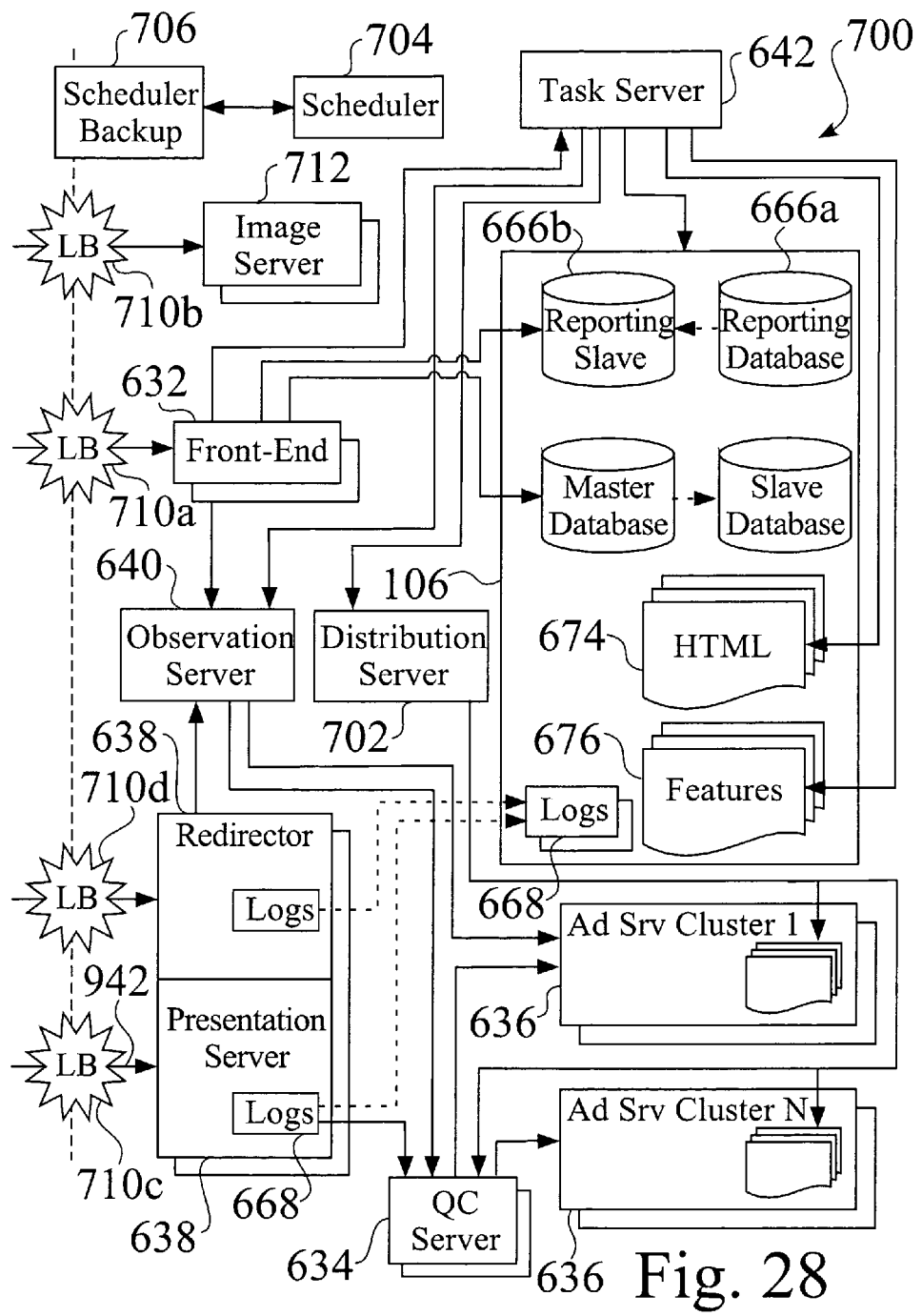
FIG. 28 is an architectural diagram for an exemplary embodiment of an enhanced online advertising system.

FIG. 28 is an architectural diagram 700 for an exemplary embodiment of an enhanced online advertising system 174.

Figure 29:
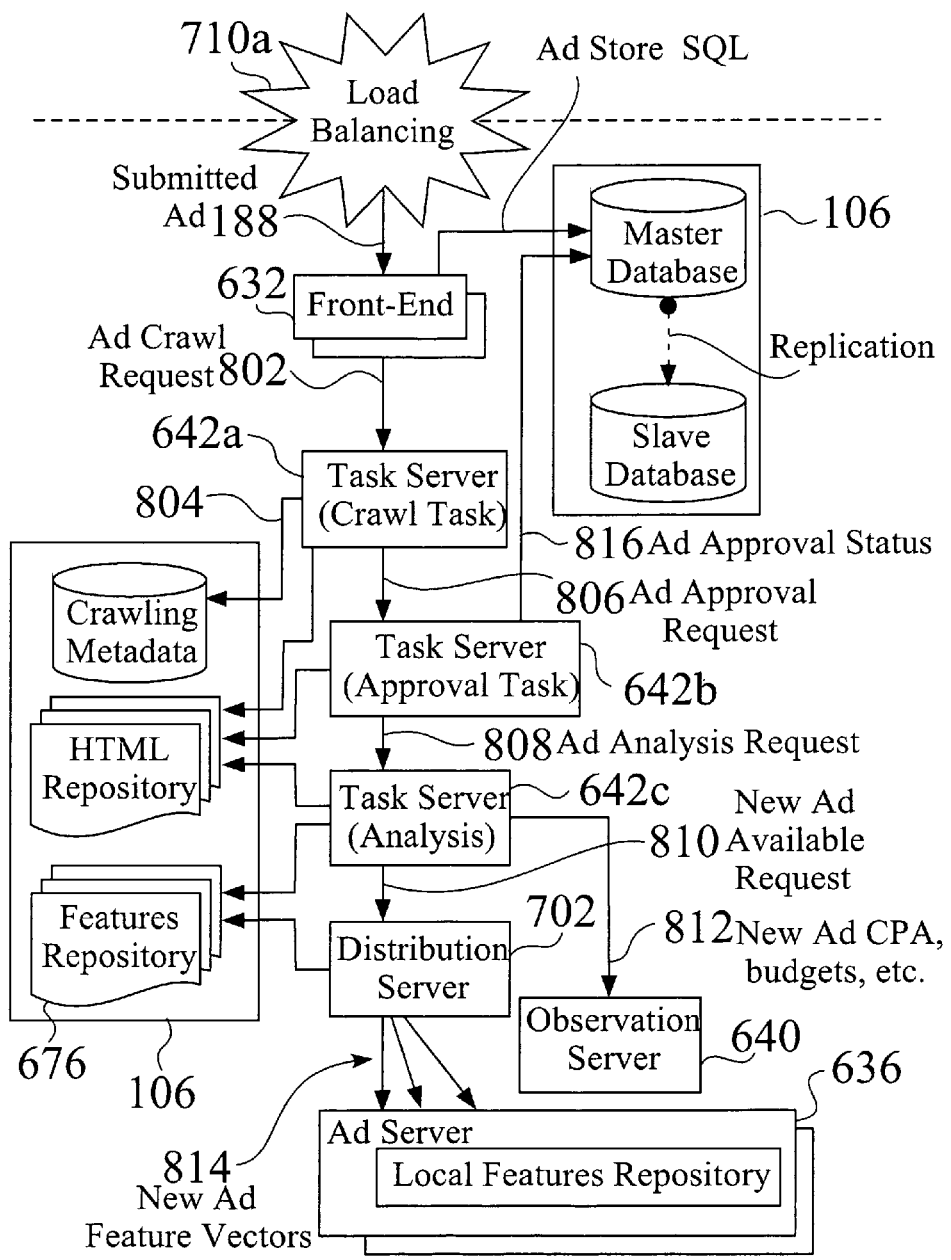
FIG. 29 shows process flow in an exemplary enhanced online advertising system.

FIG. 29 shows process flow 800 in an exemplary enhanced online advertising system 174, which provides the following process interactions between various logical processes:

Ad Creation Request.

An advertiser 72 creates an ad 188. The front-end code, e.g. such as running inside a tomcat-based front end server 632, receives the ad 188 and typically uses an O-R mapping layer to save the ad 188. The front end server 632 then publishes a transactional message that an ad 188 was created and that the ad 188 requires approval, such as by an approval task server 642b.

Ad Approval Request is Picked Up by the Task Server.

One of the task servers 642, such as the crawl task server 642a, may first need to fetch the landing page 230 (FIG. 8) for the ad 188, such as if the content 16 on the landing page 230 requires additional analysis 208 (FIG. 11). After the landing page 230 is crawled 804, a new request 806 for ad approval is generated.

The ad approval request message 806 is executed by one of the task servers 642, e.g. 642b, running approval tasks, which evaluates the ad 188 for consistency with publishing guidelines. An ad 188 may also be randomly selected for manual review, which results in the ad 188 being placed on the manual reviewer's queue of ads 188 to be looked at.

If the ad 188 is approved, an ad analysis request message 808 is published as needed, such as by the approval task server 642b, to announce that a new ad 188 that hasn't been analyzed 208 (FIG. 7; FIG. 11) currently exists on the system 174. A task server 642, e.g. an analysis task server 642c, that responds to ad analysis and/or page analysis requests, picks up this ad analysis request message 808. The analysis task server 642c typically analyzes and classifies ad 188, and computes other ad features. The analysis task server 642c then marks the analyzed ad 188 as ready for serving 194, and publishes a new ad available message 810, and/or other corresponding new ad information 812, such as but not limited to the selected action 86 and/or associated ad budgets.

The distribution server 702 and observation server 640 pick up the new ad information 810,812. The distribution server 702 then propagates the new ad feature vectors 814 to the appropriate ad server 636 that should have this new ad 188. As well, the observation server 40 is made aware 812 of the new ads budget and initial observed CPA, such as in case of a modified ad 188, so that the observation server 640 can stop the ad if 188 the budget is exceeded.

Run-Time Ad Requests.

Figure 30:
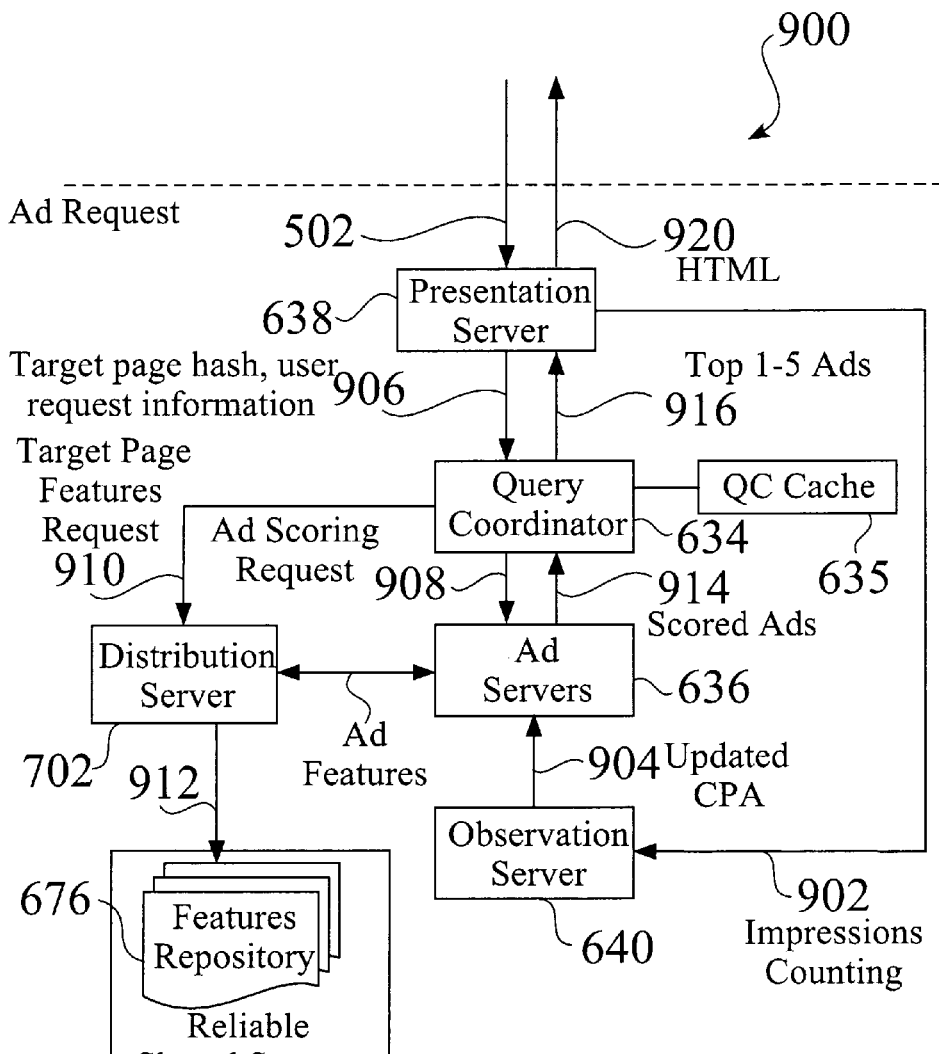
FIG. 30 shows system response to an ad request from a target page in an exemplary enhanced online advertising system.

FIG. 30 shows system response 900 to a browser ad request 402 from a target page 12 in an exemplary enhanced online advertising system 174. When a target page 12 at a user terminal 78 requests 402 an ad 188 to be displayed 194 (FIG. 6), the presentation server 638 computes the hash function 906 on the incoming referrer URL and directs the hash 906 to the right query coordinator 634. The query coordinator 634 either has the cached results 914 of a previous ad call 402 for this target page 12, or asks 908 the ad server cluster 636 to compute the results. In the case when a computation is necessary, the query coordinator 634 may preferably first return some default best performing ads 188, and then in a separate thread, initiate the ad scoring coordination process. First the query coordinator 634 looks up the features for the target page 12 at the distribution server 702. Then the query coordinator 634 elects an ad server cluster 636 on which to execute the query and call them with the feature vector 814 for the target page 12. Then the query coordinator 634 typically waits an incremental amount of time for the ad servers 636 in the cluster to finish, and merges the results, while keeping a small number of the most relevant ads 188. The query coordinator 634 also typically requests the ad copy for this very small number of relevant ads 188 from the ad server 636. The query coordinator 634 then caches the results for an incremental period of time, so that the request 906 does not have to get recomputed. Therefore, the next time a browser request 402 for this target page 12 is received, the query coordinator 634 already has the most relevant ads in its cache. The query coordinator 634 may preferably rotate through the best performing ads, such as to return one or more, e.g. 1 to 5, of the selected and ranked ads 188 to the presentation server 638 for HTML generation.

Every time the presentation server 638 includes an ad 188 in HTML 920 (FIG. 30) to be displayed 194, the presentation server 638 also writes 902 (FIG. 30) to the impression log. The log is periodically rotated. The impression log is used primarily for building the ad selection model, where a sample of the log records suffices. Therefore, it is not necessarily to archive the impression logs. In fact, it may not even be necessary to generate the log records all the time.

The presentation server 638 transmits, i.e. flushes, the per-ad impression counts 902 (FIG. 30) to the observation server 640, and may also preferably remove impressions 572 that are deemed to be robots, i.e. fraudulently fabricated or otherwise provided. Observation servers 640 keep observed CPA information in memory, and periodically send updated aggregate information 904 to the ad servers 636 themselves. The ad servers 636 then preferably use the refined numbers 904 to come up with more appropriate ads 188.

Click or Beacon Request and Ad Pause/Delete.

Figure 32:
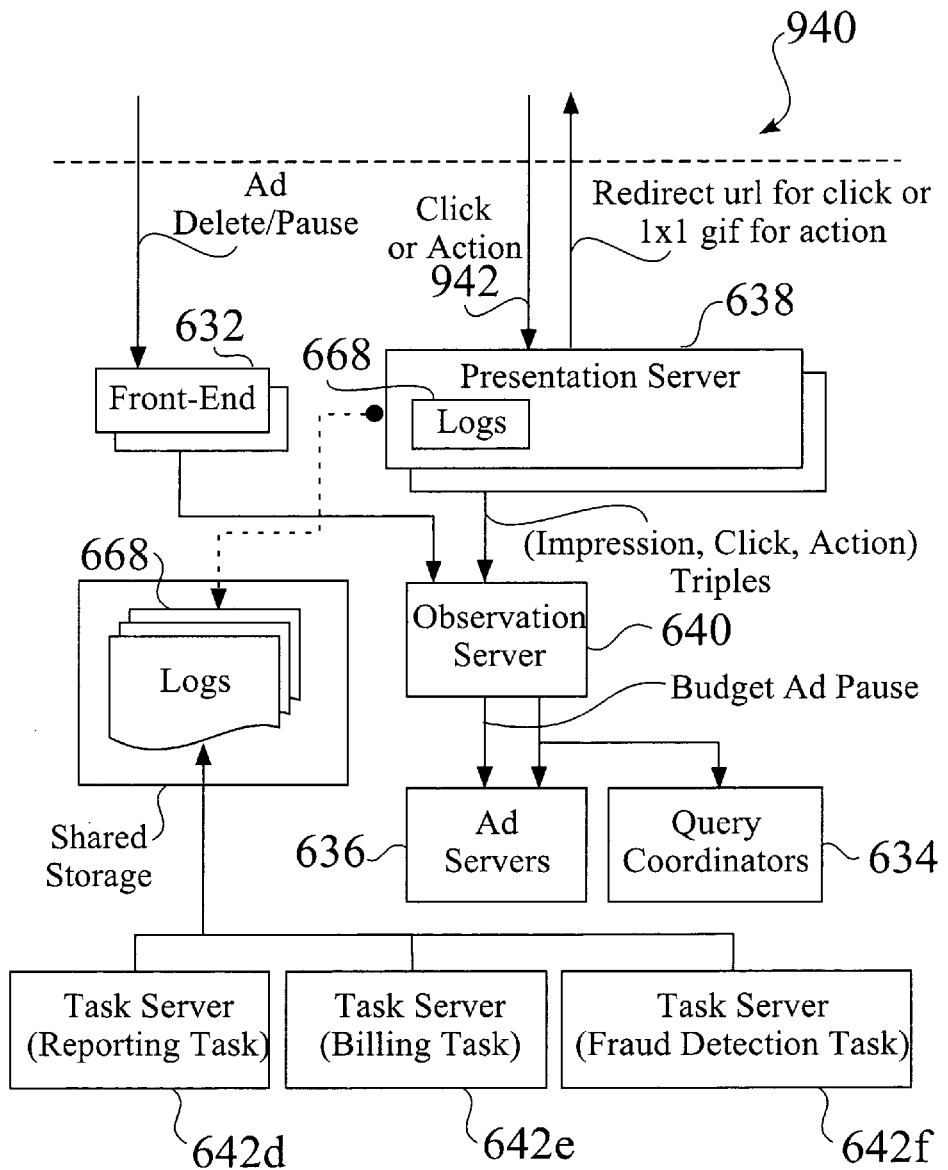
FIG. 32 shows click or beacon request and Ad Pause/Delete.

FIG. 32 is a schematic diagram 940, which shows click or beacon requests and Ad Pause/Delete functionality in an exemplary enhanced online advertising system 174. When an ad 188 is clicked on 942, the click 942 is preferably load-balanced 710c (FIG. 28) among a cluster of identical presentation servers 638 which are also referred to as redirectors 638 in this context. The request to the redirector 638 contains the redirect URL and additional request information necessary to close the loop, e.g. such as but not limited to ad id, advertiser id, and/or cookies. Immediately after the request 942 is decoded, the redirector 638 returns a reply 944, such as a redirect URL 944, to the browser 190. Action requests 592 (FIG. 25) from a beacon 234, e.g. an image beacon 234, are typically handled similarly, whereby a replay 944 comprising an exemplary 1×1 image 914 is returned back to the browser 190, instead of a redirect URL 944.

The presentation server 638 first preferably filters incoming 942 impressions, clicks and actions 86, such as to throw out robot-based and easily detectable non-human traffic. The remaining log items are logged to disk in a separate non-incoming request thread. The logs 668, e.g. 668a, are periodically rotated and a log rotation message is generated. The message triggers a sync 946 of the log 668a to centralized log storage 668b. A set of daily tasks 642 periodically processes the logs 668, such as on a daily basis. Variety of daily activities 642 are performed, such as but not limited to quick reporting aggregates for near-real time reporting 642d, fraud detection 642f, daily reporting aggregates for accurate reporting 642d, model building, and/or billing 642e.

Presentation servers 638 also send the filtered log information 948 to the observation servers 640, whereby clicks and actions 86 may preferably be sent instantly, while impression data 86 may be batched. Observation servers 640 keep counters on each ad 188 they see on valid impressions, clicks and actions 86, which are referred to as an ad I.O.C. triple 86. The observation servers 640 in turn make decisions, such as if the ad 188 should be allowed to play or if the ad 188 should be paused 950. In addition, observation servers 640 propagate the recomputed observed CPA rates 952 to the ad servers 636 themselves, such as instantly when a click or action occurs, and/or batched, such as for ads 188 with impressions only.

If an ad action sends the campaign 222 or ad budget over the daily maximum, the appropriate observation server 640 generates a pause message 950 that is sent to the ad servers 636 as well as the query coordinators 634, wherein ad servers 636 preferably no longer score the ad 188 until a next allowed time period, e.g. the next day, while the query coordinators 634 check what ads 188 are paused 950 before serving ads 188 from their cache.

When an ad 188 is deleted or paused by the advertiser 72, such as through an the advertiser application 142 (FIG. 5, the observation server 640 similarly receives the message, and is responsible for pausing or stopping 950 the ad 188 from being played.

Ad Scoring Details.

At the core of the system 174 the ads 188 are scored, such as by models that predict the RPAI of showing the ad for a given target page 12 and user USR, where the RPAI is estimated as the probability the user USR will take action on the ad times the total likely bidded CPA of the ad:

RPAI(ad)=$Pr$(actions≥1|ad shown on target page)
    *TLBC(ad)

The probability of action 86 is estimated using a machine-learned model that takes as input a relevance feature vector 814 (FIG. 29) that measures various attributes of an ad 188 and the context of where the ad 188 is being shown and the user USR it is being shown to. The relevance features 814 can be grouped into the following categories:

| Feature Range | Description |
| --- | --- |
| Ad/Landing Page | Features from the ad or landing page. |
| Target page | Features from the target page |
| Target page/Ad+ Landing Page features | Features that computed by combining the target page and ad, for example term match features |
| User-dependent features | Features that depend on the particular user viewing the publisher page, such as the past behavior of the user |

To avoid execution of the most time-consuming model on each ad 188 when a target page request 402 comes in, a number of heuristics is pursued. The system 174 typically provides multi-model scoring, using an iterative application of models to possible ads 188 for a particular target page 12.

Multi-model scoring is a process of applying different models to set of ads 188. Each model reduces the set of ads 188 to a small number of final ads 188. Each model is more expensive to apply.

Given a target page 12, the first, i.e. qualification, heuristic model processes any of exclusions, out of budget constraints and other constraints, to reduce the pool of ads 188 to a smaller pool of ads 188 that are to be scored further. The output of this model is 0 or 1, depending on whether the ad 188 is allowed to be used in further scoring.

Next, a second "cheap" model is applied to each of the remaining ads. The cheap model is a machine-learned model using a very small number of relevance features to make a rough estimate of RPAI. A small percentage, e.g. 5 percent, of the ads 188 with the highest estimated RPAI are passed to the next model.

Finally, an "expensive" model is applied to the remaining ads. The expensive model is a machine-learned model using the full set of relevance features to make refined estimates of RPAI.

The estimated RPAI for an ad is actually a confidence interval [min RPAI . . . maxRPAI], representing the uncertainties of the machine-learned model and the methods used for estimating TLBC. At each iteration, the ads with the largest maxRPAI are selected and passed to the next model.

The second major heuristic is caching of scored ads 188 per target page 12. The result of scoring of a target page 12 on an ad corpus is cached on the query coordinators 634. In some system embodiments, the top 1K ads 1888 are placed into the cache, and are used for a certain period of time before it is recomputed again. Therefore behavioral features cannot be used in such a model. To properly use behavioral features, caching is not possible and the whole multi-model process needs to be executed for every request.

The third major heuristic is distributing the ads across multiple servers. Ads are distributed into a cluster of ad servers 636.

The fourth major heuristic has to do with how term match features are represented. Term match features represent a major relevance component, but are expensive to compute. In order to compute them efficiently, an in-memory inversed term to ads index of ad/landing page terms is constructed. The target page 12 is reduced to a small number of most important terms and is executed as a Boolean OR query over the in memory-index.

Ad Network Components.

Load Balancers.

The enhanced online advertising system 174 typically comprises a number of load-balancers 710, e.g. 710a-710d, that handle identical servers 630 (FIG. 27). For example, as seen in FIG. 28, load balancers 710a are located in front of the front-end server 632, the image server 712 and the presentation server 638. These load balancers 710, which in some system embodiments are generic, are typically hardware round-robin based balancers 710 that also support fail-over, and mark servers 630 as suspect.

Presentation Server.

Incoming ad requests 402 are typically load-balanced 710 to a set of presentation server machines 638. These machines 638 elect a query coordinator 634, based on the incoming target page hash 906 (FIG. 30). The presentation machines 638 also compose the final HTML 920, based on the small number of ads 188 returned to them by the query coordinators 634.

The presentation server 638 computes the target page hash 906, and forwards the request 906 to the same query coordinator 634 every time, unless the designated query coordinator 634 is unreachable, in which case another query coordinator server 634 using the second hash function is selected. The system 174 preferably selects the same query coordinator 634 every time for a particular target page 12, as the query coordinators 634 cache the ads 188 to be displayed 194.

Presentation servers 638 also serve as redirectors of clicks and recorders of actions 86. A cluster of identical redirector servers 638 handles a large number of incoming requests and can easily scale to handle more with addition of new hardware.

Redirector functionality by a presentation server 638 is non-blocking, and returns the redirect URL as soon as it decodes the posted request. The redirector thread then adds the incoming request parameters to a list of requests to be processed for logging in another set of threads, and then returns to the pool of available redirect threads. The logging thread processes the request parameters and first analysis the request a known list of robots and spammers. It can also perform simple fraud analysis. If a logging entry survives this set of checks, it is then written out to a disk to a log file 668, such as in a compressed and/or optimized form. The log file 668 is periodically rotated and a message of a redirector log rotation or completion is published and directed as necessary. Task servers 642 process the new logs 668 to incorporate new information in the system. The information is also sent to the observation server 640. While the message is typically sent immediately for clicks 584 and actions 86, the message may be batched for impressions 572.

Query Coordinator.

Query coordinators 634 comprise servers that perform smart load-balancing across the ad servers 636 in the cluster. A query coordinator 634 is responsible for a particular set of target pages 12, and stores information regarding these target pages in memory, e.g. such as the top 30 to 50 target page concepts that are determined during an ad crawl. Such information is typically only loaded when a target page 12 is requested and is kept in an LRU cache. A cache miss results in an attempt to load this information from distribution server 702. If that is proved unsuccessful, then the target page 12 has not been seen before, and a message is generated in the system to analyze the page 12.

Assuming the target page information is available, on an incoming ad request 402,906, the query coordinator 634 first consults its cache 635 (FIG. 30) to see if the top N ads for this target page 12 have been pre-computed earlier. A cache miss results in the query coordinator 634 quickly returning a set of popular ads 188 to the presentation server 638. After the query coordinator 634 finishes serving the request, the thread continues. The query coordinator 634 then selects an ad server cluster 636 on which to run the ad scoring. The query coordinator 634 passes the information on the target page 12 and the document frequencies for the terms in the target page 12 to each ad server 636 in the cluster, and then waits for the ad servers 636 to give back the results. The ad servers 636 execute all the models, and the query coordinator 634 waits with a timeout for them to finish. The query coordinator 634 merges the results back together, and keeps an even smaller number of ads 188 and requests the ad content and observed CPA for these ads 188 from the ad servers 636 in a second round trip. Then the ads 188 are cached and are ready for serving next time a request 402 on this target page 12 comes in.

The cache content 930 lives for a specified amount of time. The amount of time since the last request 402 for each target page 12 is recorded. If a cache entry 188 in the cache 635 gets old and the system 174 still receives requests for this target page 12, the query coordinator 634 repeats the ad scoring process. This way the cache 635 stays current for the active target pages 12.

While some preferred embodiments of the enhanced online advertising system 174 recompute the best ads 188 every time an ad request 402 is made, other system embodiments 174 use caching 635, such as to provide most system performance with more limited computational resources.

Ad Cache Rotation.

The top ads 188 in a cache entry 930 are typically rotated 934 for multiple requests 402. The rotation algorithm 934 preferably looks at the observed CPA rates returned with the ad servers 636 and computes the percentages of time that cached ads 188 should be shown.

When selecting a specified number, e.g. four, of the "best" ads 188 to show for a target page 12, there are often many more than the desired number of ads 188 that have approximately the same estimated revenue per ad impression (RPAI). System embodiments 174 may have uncertainty in estimated RPAI values, such as due to machine learning, the limited observations of ad performance, and/or system estimates of total likely bidded CPA (TLBC). In the presence of such uncertainties, the system 174 cannot distinguish small differences in RPAI among ads 188.

Therefore, preferred system embodiments 174 take into account such uncertainties. For example, in some system embodiments 174, the system 172 selects a larger number of ads 188 actually needed, wherein the selected ads 188 have a similar predicted RPAI. The system 174 then rotates through the selected ads 188 when choosing the desired number of ads, e.g. four ads 188 to show on a target page 12. The system 174 therefore does not "lock in" on a small set of ads 188 for a target page prematurely, until the system 174 has collected enough observations about the ads 188 to be confident of the system RPAI estimates. In some system embodiments, such a rotation is preferably biased towards ads 188 with higher RPAI estimates.

System Confidence Framework.

The estimated RPAI of each ad 188 is expressed as a confidence interval of minimum and maximum RPAI, shown as:

$$[\text{minRPAI(ad)} \ldots \text{maxRPAI(ad)}],$$

where the confidence is a threshold set by the system, e.g. 95 percent. The system 174 assumes that the revenues resulting from individual ad impressions are uniformly distributed in that interval. Other system embodiments 174 may assume other distributions, e.g. a normal distribution, that more accurately model the estimates of RPAI. As discussed above, RPAI is calculated as:

$$\text{RPAI(ad)} = Pr(\text{actions} \geq 1 | \text{ad shown on target page}) * \text{TLBC(ad)},$$

where the probability of action is based on a blending of predicted and observed probabilities, and TLBC is based on observed action rates and beacon values. Each of those inputs has a confidence interval that the system 174 can estimate and propagate through the computation of RPAI.

Some system embodiments 174 estimate a global 95 percent confidence interval for predicted probabilities, such as by performing an offline comparison of the predictions with actual probabilities. For example, the system 174 may observe that on average, predicted probabilities are +/−10 percent of observed probabilities 95 percent of the time. In other system embodiments, 174, the system 174 may assume an initial global constant interval, e.g. +/−5 percent.

For observed probabilities and TLBC, the system 174 may also preferably estimate the interval based on the number of observations in the data, using standard statistical techniques.

In some system embodiments 174, the ad servers 636 and query coordinators 634 sort lists of ads 188 by their mean estimated RPAI, wherein the confidence intervals of ads 188 are typically represented by a mean plus an error margin, rather than as a minimum and maximum, such as to avoid the computing the mean in real time, with a large number of data.

System Ad Cache Rotation.

As discussed above, the query coordinator 634 maintains a cache 635 in some system embodiments 174, to map a target page 12 to a candidate list 930 of at most the top N ads for that target page 12, where N may be on the order of 100.

To compute the candidate list 930, the query coordinator 634 periodically calls the ad servers 636, e.g. every 15 minutes, wherein each ad sever 636 periodically searches its associated ad index, and returns a list of at most M ads 188 on that ad server 636 with the highest mean RPAI, which is equal to:

$$(\text{minRPAI(ad)} + \text{maxRPAI(ad)})/2.$$

The value of M is preferably fairly large, e.g. 50, so that M multiplied by the number of ad severs 636 is much greater than N. The query coordinator 634 then merges the returned lists into a single sorted list 930, such as sorted by mean RPAI.

When an ad call for an ad unit of c ads arrives at the query coordinator 634, the query coordinator 634 enumerates through the candidate list 930 of ads 188 and, for each ad space 184, randomly chooses an RPAI from the ad's interval. The query coordinator 634 then returns the c ads 188 with the highest randomly chosen RPAIs.

This algorithm provides a rotation of the ads 188 biased by their confidence intervals, as shown:

bestAds=empty priority queue of length c
for each ad in list of ads for target page
    randomRPAI=random value in [minRPAI(ad) . . . maxRPAI(ad)]
    insert <ad, randomRPAI> into bestAds The random value is chosen from the confidence interval, based on the assumed distribution of possible values of RPAI within the interval (uniform, normal, etc.).

In some system embodiments 174 the list 930 of N candidate ads 188 is relatively short, e.g. 100, so this algorithm is executed exceedingly fast. In some system embodiments 174, wherein the cost of computing the random values is expensive, the list of ads 188 may preferably rotated after every r ad calls 402, e.g. every 5 ad calls 402.

In some system embodiments 174, such as to reduce execution time, the list of ads 188 is rotated just once, such as for every five ad calls 402. However, since such ad rotation is typically fast and inexpensive, most system embodiments 174 may preferably provide rotation for each upon each add call 402.

When an ad server 636 comes online/offline it sends a message to the query coordinators 634 in the system so that they know which ad servers 636 should be available for ad serving. The query coordinator 634 selects an ad server cluster 636 that it knows can handle the request, and the query coordinator 634 monitors this request in case of failure, such as if timeout is detected. If such a failure is detected, the ad server 636 is marked as suspect, and typically retried within a certain period. If the ad server 638 doesn't come back up, a message is generated, in which human involvement may be required. This is done in addition to the standard SNMP type monitoring that IT software performs.

Front-End Servers.

Front-end servers 632, e.g. tomcat based servers 632, serve html pages, and typically use a business objects layer to manipulate database entities. Front-end servers 632 publish messages when certain important events have to occur, like an approval of an ad or stopping a running ad. These messages get picked up by other running components. Front-end servers 632 also support SOAP (or other protocol) API requests for ad management and other tasks.

Distribution Servers.

Distribution servers 702 have a job of giving new ad, landing page 230 and target page features to the correct ad servers 636 and query coordinators 634. For every ad 188 and page 12 in the system 174, the most recent date of update is tracked by a distribution server 702, and is stored in the database. Upon restart, the distribution server 702 reads the most recent date of update for all ads 188 and target pages 12. Distribution servers 702 preferably have a fast connection to the disk based feature repository storage 676 (FIG. 30).

When a new or updated ad 188 exits the analysis pipeline or a new or updated target page 12 exists the analysis pipeline, a message is published on the bus of its existence. This message 812 (FIG. 30) is picked up by the observation server 640 that wants to enforce the budgetary constraints. A similar message 810 (FIG. 30) also gets picked up by the distribution server 702, which then loads the feature vector 814 for the new object into its memory. The distribution server 702 pushes the new ads 188 or target pages 12 to the ad servers 636 or query coordinators 634, or responds to the periodic pull time type commands from them. A query coordinator 634 may ask if a certain page 12 has changed since the date that is stored on the query coordinator 634. If the page 12 hasn't changed, then it will be told 'no'. If the page 12 has changed, the page will be given a new feature vector 814. The ad servers 636 can perform a similar process, except the process is performed on an ad bucket level, rather than on the level of a single target page 12. The ad server 636 asks the distribution server 702 to give it all the ads 188 for a bucket that have changed since a given date. The ad server 636 may get back some ads 188, or it may get no ads 188. On a complete recovery of an ad server 636, it will ask for all the ads 188 in the bucket since the beginning of time.

The distribution server 702 acts as an in-memory database of what ads 188 and what pages need to live where. If a distribution server 702 crashes, the distribution server 702 simply re-reads the tables with the ads 188 and pages and catches up on the missed new ad/page messages, which are preserved in a persistent queue.

Observation Servers.

Observation servers 640 keep track of all the ads 188, ad groups 240 and campaigns 222 in the system 174. For example, observation servers 640 monitor the active vs. paused status of ads 188, as well as observed CPA and daily (or weekly) budgets. If an ad 188 needs to be paused or deleted, the associated observation server 640 communicates the deletion to the ad servers 636 and query coordinators 634. If an ad 188 has its budget exceeded, the associated observation server 640 pauses the ad 188 on other servers 630.

Observation servers 640 also propagate latest up to date observed CPA rates to the ad servers 636. Observation servers 640 are notified by the presentation servers 638, in regard to any of impressions, clicks and/or actions 86. For example, clicks or actions may result in immediate notifications, while impressions are typically batched.

In some embodiments of the enhanced online advertising system 174, a single observation server 640 can handle all the ads 188. In embodiments of the enhanced online advertising system 174 that comprise a plurality of observation servers 640, a mapping scheme maps ad ranges to the appropriate observation servers 640, similar to the map used to distribute ads 188 between the ad servers 636.

Observation servers 640 typically load the data cubes for aggregated CPA rates on startup. Observation servers 640 also recompute the daily CPA rate cube and store it for reporting purposes. On crash recovery, the observation servers 640 reload the cubes and catch up on the pause/delete messages as well as any missed impressions/clicks/actions.

Ad Servers.

Ad servers 636 respond to an incoming request from the query coordinators 634. Ad server functionality 636 typically operates in a cluster of identical servers 636, such as wherein each ad server 636 is responsible for handling a certain subset of ads 188. Ad servers 636 are typically combined into clusters of ad servers 636 that are identical. The ad server 636 selects the top N best ads 188 for the request from its subset of ads 188 and sends the associated ad ids back to the query coordinator 634. The entire process of scoring ads 188 occurs very quickly, typically in less than 100 ms.

There is no redundancy of ad servers 636 within the cluster itself. The number of machines 636 in the cluster is proportional to the number of ads 188 in the system and the number of incoming requests for which full ad scoring has to be performed. The number of servers exceeds the number of requests that they have to handle at peek time by a margin that covers MTBF related properties of the hardware. At any given point a number of ad servers 636 in any cluster may be down, and the ads 188 that reside on that ad server 636 may be temporarily unavailable for serving.

Ad servers 636 typically operate in a cluster, wherein ad server 636 are registered with a global repository of ad servers 636, and the updated map is then given to the query coordinators 634. When an ad server 636 goes down, after a number of retries it is assumed to be down and the map is adjusted to exclude it.

Ad Server Rebuild Approach.

Ad servers 636 preferably stay in sync with the ads 188, by continuously rebuilding the ads 188 in memory. For example, in some system embodiments, some or all of the ads are divided into ad buckets, with a large number, e.g. 100K ads 188, per bucket. The ads 188 are typically placed into buckets based upon their id, wherein a bucket typically comprises a contiguous range of ad ids. Ad ranges between buckets do not overlap. Therefore, while earlier created buckets may get sparse, e.g. as old ads are deleted, newer buckets are typically more full, except for the latest bucket, that is always being filled up. Because the ad ids in a bucket are contiguous, the system is typically able to compress the ad ids successfully when constructing the ad index.

Each ad server 636 is allowed to have a certain number of ads. Each bucket loaded onto an ad server 636 keeps track of how many ads 188 it has. Thus, an ad server 636 always knows how many ads 188 it has, and if it has a spot for another bucket. When a new bucket is created, it is tied to a particular ad server 636 and it doesn't move. The bucket creation algorithm does the following:

- adjusts the map to have a new entry between an ad range and the bucket;
- allocates a bucket to a particular server in each cluster based on the server load (number of ads). The allocation must not exceed a maximum number of ads per server. If no allocation is possible, no ads can be added to the system until new hardware is added. The system is monitored to detect when it will be full, e.g. in some embodiments, sales engineers look at the system before loading 10M ads into it; and
- the final step in bucket allocation is propagating the map through the system to the query coordinators 634 and other servers 630.

The map from ad ranges to buckets and from buckets to servers is relatively small. For a system 174 that has 100K ads per bucket, there are 1K buckets for 100 M ads 188. Each bucket lives on as many servers as there are clusters. Propagating this relatively small information can be done with a few network packets.

Instead of having an offline rebuild server, rebuilding typically happens continuously on a running ad server 636. The ad server 636 gets the ads and features from the distribution server 702, as described above. The ad server 636 typically remembers a timestamp for each bucket that it has, so that it can "catch up" to the most up to date state when it connects to the distribution server 702, or is called by the distribution server 702 in the case of push.

A rebuild process in an ad sever 636 preferably works without starving the ad scoring threads. In a pull system model, a rebuild thread wakes up periodically and pulls the new ad data from distribution for the buckets that it is responsible for. For each bucket the rebuild thread comprises the steps of:

- performing the following for each transaction:
  - reading the ad bucket data starting with the last known date that it has;
  - writing the read in data to disk; and
  - adjusting the timestamp for this bucket and also write it to disk; and
- adjusting its internal memory representation, i.e. an ad index, of the ads 188, based on the disk copy.

The ad index comprises a hierarchy of posting lists. Each posting list maps a term (or a 8-byte fingerprint of the term) to a list of ads 188 that contain the term. The complete list of ads 188 for a given term may come from multiple posting lists. The lower-level posting lists are made small enough so that the cost of inserting a new ad 188 is low. In the steady state, an ad server 636 receives a small number of new ads 188 per day. These new ads 188 are preferably added to the lower-level posting lists. When a lower-level posting list grows beyond a certain threshold, its content is merged into a higher-level posting list.

The ad index can be implemented as a highly concurrent data structure, where posting lists are updated in place. The ad index can also be implemented as a Lucene-like structure where changes are never performed in place. Instead, a new and smaller index is preferably built to accommodate the changes.

To process a modified ad, e.g. such as due to a refresh of a landing page 230, or a deletion of an ad 188, the ad server 636 needs to know the difference between the old version and the new version (null for deletion). If the distribution server 702 does not send the content difference along with the change request, the ad server 636 typically maintains the ad content on its local disk, and computes the difference before adjusting the ad index.

Stop messages are typically broadcast in the system 174 by the observation server 640, so that both ad servers 636 and query coordinators 634 reflect in their cache all the stop requests. The final adjustments of stop requests is handled by the billing systems and reporting systems 666, where the exact times of actions and clicks are correlated to the times of stop events.

System Scheduler.

The scheduler 704 (FIG. 28) makes sure that tasks in the system 174 start at a certain time. The scheduler 704 does not run the tasks; it just starts the tasks, which are scheduled at regular intervals, such as but not limited to:

- fraud detection on the click-stream and report generation for publishers or advertisers, e.g. nightly;
- periodic invoice generation and billing, e.g. monthly; and/or
- periodic bulk mailing, such as to communicate "your credit card is about to expire" e.g. monthly.

One instance of scheduler 704 typically runs and hands out tasks at any given time.

Task Servers.

There are typically a large number of tasks in the system 174 that are executed by the task servers 642, given the data required for the task. Such tasks typically comprise any of:

- intelligent approval of the ad;
- crawler tasks;
- page analysis;
- fraud detection on the click-stream;
- nightly report generation for publishers or advertisers;
- monthly invoice generation and billing; and/or
- bulk mailing, e.g. "your credit card is about to expire".

Some of these tasks are periodic in nature, based and are triggered by the scheduler 704. Some of these tasks are based on the events introduced by a message in the system 174. Task servers 642 are typically adapted to perform a variety of tasks, such as pick up any task that implements a task interface and to perform the requested task. Task servers 642 typically subscribe to receive various messages, and to execute specific application or platform code depending on the message type. Some embodiments of the system 174 are preferably configurable to have a given number of task servers 642 that are capable of executing certain tasks, whereby certain servers 642 are set aside for ad approval for example, and perform no other tasks.

Crawling and Page Analysis.

When a system becomes aware of a new page 12 that needs to be crawled, the page 12 enters a page analysis system. Pages 12 typically have a designated lifecycle in the page analysis system, wherein the lifecycle comprises stages. For example, typical stage levels for a page 12 comprise any of new, crawled, classified, concepts extracted, features computed, and/or analysis completed.

The page analysis system is backed up with persistent storage that describes what the system 174 knows about the page 12, and what the system 174 has done with the page, i.e. crawled content or text classification for the page 12. While most page and ad information is stored in the database, the feature vectors 814 are stored in disk on a shared reliable storage that is accessible by the task servers 642.

A single or multiple set of tasks is responsible for getting a page to the completed phase. The page analysis system is a pipelined system with a set of interfaces that a segment in the pipeline should implement. For example, the first segment performs crawling. The second segment performs classification. These tasks are either performed back to back on the same machine as part of a general framework or messages are published upon the completion of each segment to be picked up by another task server. The tradeoffs are ease of scalability vs. having the data to perform the next step of the pipeline in memory.

The first step in the pipeline is crawling. The crawling task server 642a, i.e. the crawler 642a is a very basic component that fetches the target page 12 when a new target page appears in the system 174. The crawler 642a is a task that runs on the task servers 642, and it responds to a message or a database event that a new page needs to get crawled. It places the results of the crawl into the data storage for crawled pages. If a crawl was unsuccessful, it schedules the page to be re-crawled. After a certain number of attempts a page is abandoned.

Once the page 12 is crawled, the page 12 is analyzed by the rest of the pipeline and finally when that finishes, there is a message sent to the observation server 640 and distribution server 702 to make the ad go live. Alternatively, the observation server 640 can poll the page store periodically for changes. Note that the system 174 does not typically use an ad 188 unless its landing page 230 has been crawled at least once. The landing page 230 often contains valuable information, such as user reviews. Therefore, serving ads 188 without knowing the content of a landing page 230 may lead to poor ad selections. The principle holds true for catalog ads, which can take days to crawl, due to the large number of landing pages 230 per site.

All pages typically have to be periodically re-crawled. Re-crawl intervals depend on the rate of ad requests 402 from the page 12, and how often changes are detected during re-crawls. If a page 12 appears static, the system 174 may preferably re-crawl it less often. If a page 12 changes often, may preferably schedule the page for re-crawling often. As well, if during a re-crawl it is determined that a page 12 hasn't changed, the system does not execute further analysis of the page 12. Note that the analysis pipeline may be different for target pages 12 versus ads 188 and/or landing pages 230.

Most web sites tolerate only a small number of requests per second, e.g. such as from a single IP. Therefore, the system 174 preferably throttles the traffic generated by the crawler. For example, some preferred embodiments of the system 174 allow the publisher 76 and/or the advertiser 72 to configure the maximum number of requests per second for each domain. To increase the crawler throughput, some system embodiments 174 employ multiple external IP addresses.

The crawler 642a may need to handle subscriber-only sites. For example, most of the articles on nytimes.com require a sign-on credential. At a minimum, the crawler should be able sign in with an account set up by our professional service.

Summary of Crawling Requirements.

Publishers 76 and advertisers 72 are preferably able to throttle the download bandwidth on a per-domain basis. For example, such constraints may comprise no more than K requests per second per IP address (K is typically small, such as 1), and/or no more than M bytes per second per IP address. The system 174 is also preferably able to cap the aggregated crawler traffic, so that crawler functionality does not monopolize the network 174.

The system 174 preferably fetches new pages 12 as soon as possible. For example:

new target pages 12 are preferably fetched within seconds, to ensure the quality of ad selection for the page 12;

new landing pages 230 for non-catalog ads 188 are preferably fetched within minutes, e.g. 15 minutes, so that new ads are deployed in a timely manner; and/or new landing pages 230 for catalog ads are preferably fetched within a day (some system embodiments 174 may not be able to guarantee that such pages are fetched in minutes, because an advertiser 72 may load millions of ads 72 at a time.

Figure 31:
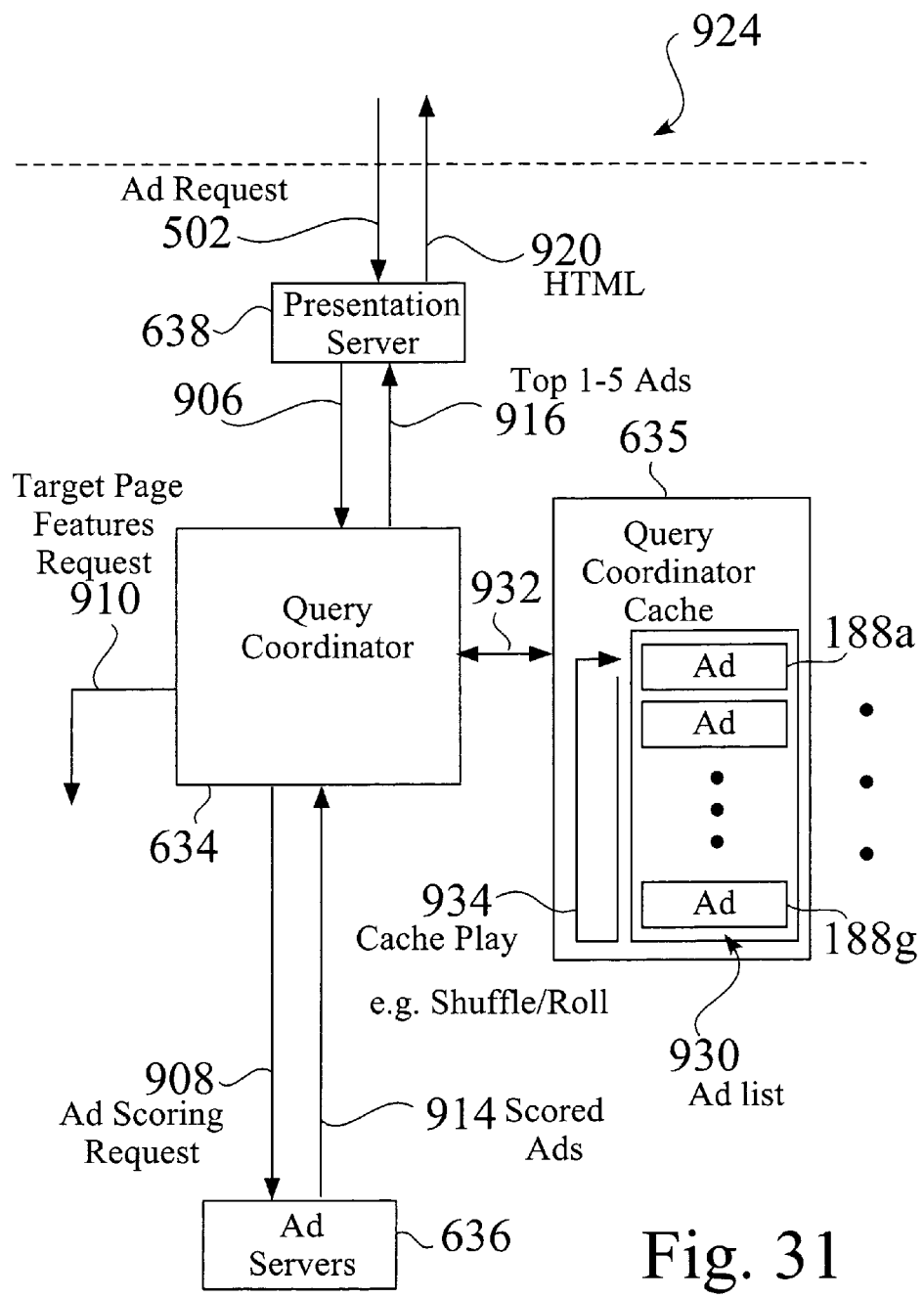
FIG. 31 shows exemplary ad caching in an exemplary enhanced online advertising system.

The system 174 also preferably re-fetches all pages periodically to ensure their content is up to date. For example, target pages 12 that are cached by the query coordinator 634 are preferably automatically re-fetched every N minutes. For target pages 12 that have a high rate of change, N is likely to be a small number, e.g. 15. The system 174 does not typically re-fetch a target page 12 if the target page 12 is never used, nor does the system 174 typically refresh a target page 12 if the target page 12 is flushed from the cache 635 (FIG. 30, FIG. 31), due to the absence of a recent hit.

The landing pages 230 for modified ads 188 are typically treated like new landing pages 230, wherein such landing pages 230 are typically re-fetched within minutes. As well, the landing pages 230 for modified catalog ads 188 are typically treated like new landing pages 230, wherein such landing pages 230 are typically re-fetched within a day. Furthermore, the landing pages 230 for all ads 188 are typically re-fetched at least once every M days, e.g. at least once every 30 days. The system 174 may increase the frequency of re-fetch for a page 12, such as if the observed frequency of change is higher.

During peak load, the crawler 642a may not be able to complete all fetches in time. In some system embodiments, when such a situation arises, the crawler 642a executes the fetches in the following order:

new target pages 12;

landing pages 230 for new non-catalog ads;

existing target pages 12;

landing pages 230 for modified non-catalog ads;
landing pages 230 for new catalog ads;
landing pages 230 for modified catalog ads; and
landing pages 230 for unmodified ads.

The crawler 642a is able to handle web sites with a reasonable authentication protocol. For example, the crawler should be able to send the user name and the password over https and receives any cookie(s) that are returned by the site.

The crawler 642a is able to recover from a crash gracefully without "forgetting" work. For example, if the crawler 642a shuts down during a page fetch, the page should be re-fetched automatically upon startup.

In one estimation of crawler performance, an exemplary enhanced online advertising system 174 has a workload comprising 20,000 target pages 12, Twenty million ads, of which 1 percent change per day, in which all target pages 12 are refreshed every 15 minutes, and in which all landing pages 230 are refreshed once a month. In the steady state of such a system 174, the crawler 642a needs to issue (20,000*240+ 20,000,000*0.01+20,000,000/30)=5.7 million fetches/day, or 66 fetches/second. Assuming a 2 MB/sec network (16 Mb/sec) and an average page size of 10K bytes, the crawling process takes about 8 hours for one day's worth of work. To bootstrap a 20 million ad inventory in a day, the crawler is able to complete 231 fetches a second. In the exemplary system 174, this performance may not be possible at all times, such as if the majority of the ads 188 come from a few catalog advertisers 72 that only allow a few requests a second. Therefore, for large catalog campaigns 222, it may take a few days for their ads 222 to go live after they are bulk loaded into the system 174.

Monitoring.

All of the servers 630 in the system 174 are typically monitored for performance and failure. Generic monitoring software is used by the ops. Gracefully taking down some servers 630, like the ad server 636, results in a message published on a bus so that query coordinator 634 knows not to attempt to use this server for serving ads.

System Maintenance.

The system architecture preferably permit occasional maintenance operations with as little down time as possible. For example, the ad serving subsystem is designed to be up all the time, even when the ad servers 636 themselves are being replaced. The publisher/advertiser application serve4 142?, on the other hand, can have scheduled down times for maintenance, such as scheduled for small periods and not very often. The system 174 typically performs the following maintenance operations:

Adding/removing presentation servers 638
Adding/removing query coordinators 634
Adding/removing task servers
Replace distribution server 702 or observation server
Adding/removing ad servers 636 from the cluster, for example, to throttle the system capacity or to repair/upgrade the server hardware.
System-wide upgrades, which include:
Upgrading the ad serving subsystem with a new turn release.
Upgrading the database server to a new vendor release, a new turn schema or a new set of hardware.

Adding/Removing Servers.

Adding/removing presentation servers 638 is not a common activity, but when it does happen the load balancers need to be told of the new server 638. The implementation is load balancer dependant.

Adding/removing query coordinators 634 can happen at any time, the presentation servers 638 must use a dynamically updated map to locate the query server(s) for a given impression request.

In some system embodiments 174, the map is designed to first hash the target page URL into a moderate number of buckets, where the number is chosen so that it is small enough to be cached in memory but also large enough to achieve a good load distribution. The system 174 then use a persistent look-up table (called the server map) to assign the buckets to the servers. When a new server is added or removed, the system 174 updates the look-up table accordingly. The server map preferably designates both a primary and secondary query coordinator 634 per target page range. If the primary query coordinator 634 appears to be down, the secondary associated query coordinator 634 is then used. If the secondary query coordinator 634 is down as well, a random query coordinator 634 is then typically used. Note that there can be multiple query coordinators 634 in both primary and secondary buckets, and that all primary query coordinators servers 634 are preferably exhausted before secondary query coordinators servers 634 are considered. Usage of secondary query coordinators 634 may also be triggered by excessive load on the primary query coordinators servers 634.

A new ad server 636 typically registers itself with the global repository of machines in this cluster and participates in the serve/rebuild process. Query coordinators 634 are notified when an ad server machine 636 comes up or goes down in the cluster. Query coordinators 634 can also preferably detect a down ad server 636 and put it into suspect and then into a downed state.

In some system embodiments 174, rather than having multiple instances of observation servers 640 and distribution servers 702, the system 174 may have just one instance each. If one of the servers 640,702 fails, a replacement server 640, 702 may readily be installed, since the system 174 is designed to handle the downtime of these servers without affecting ad server or other operations. They are monitored and failed over in the case they go down to an available blank machine. Adding tasks servers is a matter of task servers starting and subscribing to receive messages.

In some system embodiments 174, the system 174 may preferably comprise at least two of each of these kinds of servers 640,702, with fail-over algorithms.

System-Wide Upgrades.

An upgrade release for an ad server 636 is not preferably performed during any down time of the ad serving subsystem. Therefore, removal of one or more, i.e. a subset of the ad servers 636, is preferably only performed at times when there is at least one active ad server 636 for each redundancy group. The inactive ad server 636 then receives the latest turn code release with the necessary changes to its state data, e.g. a new log format. The upgraded ad server 636 can then be added back to the active pool with the appropriate changes to the server map.

The incremental scheme requires the system to run with two different code releases at the same time. Therefore, the ad server code allows a new release to execute the message protocol of a previous release. For example, in some systems 174, the message protocols are backward compatible, e.g. for at least one version. Alternatively, some system embodiments 174 run both versions of code until all ad servers 636 are upgraded, at which point the system 174 atomically switch to the latest, e.g. more efficient, protocol. In most system embodiments 174, the same upgrade strategy is provided for presentation servers 638 and/or query coordinator servers 634.

Upgrading the database server normally requires a non-trivial amount of down time even with active replication, because the database must permit the interactive applications to read and update the latest data. Consequently, the system 174 schedules such upgrades with the end users USR, who are told that the advertiser and publisher applications 142 are inaccessible during the window of maintenance.

Although the database server is down during the upgrade, the ad servers 636 must continue to serve ads 188. To decouple the database server and the ad serving subsystem, the system 172 preferably follows the design principle that an active ad server 636 never reads data or writes data directly to the database server. Instead, data communication between the two subsystems is preferably asynchronous. A possible design is to have the task server 642 push the incremental changes between the database server and the ad servers 636. The push can be performed at regular intervals, e.g. such as for new ads or new impression counts, or it can be triggered on demand by either subsystems.

The upgrade any of task servers 642, observation servers 640, and/or distribution servers 702 is not typically on the critical ad serving path, so these systems may be safely shut-down, updated as necessary, and brought back up with new software.

Report Store.

The report store is the gatekeeper of all performance data (current and historical) for the system 174. The performance data includes the number of impressions 572, the average rank of the displayed ad(s) 188, the number of clicks 584, the number of actions 86 and the details of all actions 86. The data is preferably used by the web applications for interactive drill-downs as well as background reports. To ensure a reasonable response time, e.g. seconds, the system 174 may restrict the options that can be customized by the interactive reports. The background reports that support a full range of customization may take on the order of hours (but not days) to execute.

Interactive reports are typically further divided into two classes: standard and catalog. The standard reports are for non-catalog based campaigns, each of which has a small ad inventory, e.g. thousands. Catalog reports are preferably provided for catalog-based campaigns 222, which can have millions of ads 188. Again, for the sake of a reasonable response time, the system 174 typically restricts the set of catalog reports. For example, the system 174 does not typically provide performance data at the ad group level 240 for catalog reports.

At any given point in time, the system's workload consists of a mixture of interactive reports and background reports. The reporting system 666 provides the highest service level to the interactive reports. For example, the system 174 ensures that the cost of computing an interactive report is proportional to the data it requires, i.e. small instead of the total amount of data (large). A possible solution is to physically separate the data used by the interactive reports and the background reports (note that the data can still appear to be one piece if the database supports partitioning). In addition, the system 174 may also use a clustered database, where one of the sever instances is dedicated to interactive reports.

Report Data Flow.

The finest granularity of performance data is a daily aggregate or a partial daily aggregate for an individual ad. The partial aggregates for the current day are maintained by the observation server during the ad serving process. These aggregates are sent to the reporting database as frequently as performance permits, preferably once every few seconds, so that the report store can provide up-to-date statistics for the current day.

At the end of the day, the system performs a post-mortem analysis on the click logs and the action logs to detect fraudulent or erroneous entries. After the process completes, the current day's aggregates are adjusted for the differences and the result is officially added to the report store as the authoritative source for all performance data from that day. Finally, the data for the current day are cleared and the same process repeats for the following day.

The observation server 640 may maintain multiple days' worth of performance data if the profit model requires the weight click or action rate over the last few days. However, the permanent (and authoritative) storage for all performance data is the report store. If the observation server crashes, it can recover its data by loading from the report store and replaying the click and action log entries that took place during the crash (recovering the exact impression count from the impression logs is optional).

Any daily performance data that is older than a certain threshold, e.g. 365 days, is rolled off the report store and placed into archival storage, i.e. non-queryable storage. This can be easily done by a database that has native support for partitioning and archiving, e.g. such as an Oracle or MS SQL Server. As the result of the roll-off, the reporting store must maintain a separate per-ad fact table to store the "inception-to-date" performance data. The inception-to-date fact table is updated when the daily data is committed to the report store. Similarly, if the data is rolled off yearly, the system 174 maintains a set of tables for the yearly summary data.

The reporting store maintains a collection of derived tables to speed up time navigation. At a minimum, the reporting store maintains a number of weekly and monthly aggregate tables. The current week's aggregates are recomputed at the end of every day from the daily aggregates, and the current month's aggregates are recomputed at the end of every week. This sort of computation is best done by a database that supports partitioning, parallel queries and possibly materialized views.

For each per-ad fact table, the system 174 maintains a small collection of roll-up tables to speed up the interactive queries. For example, the system 174 may preferably maintain a per-campaign performance data table and a per-advertiser performance data table. However, the number of report combinations may be sufficiently high, such that the system 174 does not attempt to pre-compute all report combinations. Therefore, the reporting system processes interactive queries with reasonable speed. In some preferred system embodiments 174, the underlying database includes native OLAP support, e.g. star joins and parallel queries.

In addition to the performance data, the reporting store also serves as the permanent (and authoritative) store for all actions 86. Since the number of actions 86 per day is expected to be very small, e.g. tens of thousands a day, for reporting to a single advertiser 72, the system 174 may not require any special support for transactions, such as by aggregation from the individual transaction records.

Sizing estimate. For an exemplary system 174 that serves 50 million ads 188, 10,000 distinct target pages 12 per day, and a 15-minute refresh of the target pages 12, an estimation of the size of the per-ad fact table is shown as:

Daily Performance Data:

10,000 pages*100 (re-selection/day)*4 (ads/selection)=4 million rows/day.

Keeping the past 7 days' data requires 7*4 M=28 million rows.

Keeping a year's worth of data requires 365*4 M=1.5 billion rows.
Weekly Performance Data:
    4 million ads/day*7 (days/week)/2 (duplicate per ad per week)=14 rows/week.
    Keeping 4 weeks of data requires 14*4 M=56 million rows.
Monthly Performance Data:
    As most or all ads would seen in a month's time, there would be about 50 million rows a month. Therefore, keeping 12 months of data requires 12*50 M=600 million rows.
Data Storage and Access.
Persistent Data.
    In some system embodiments, there are typically three logical data stores in the system, comprising:
        an application store: transactional data for the publisher/advertiser apps 142 (FIG. 5);
        a feature store: data for ad serving; and
        a report store: performance data for reporting and billing.
    However, the storage mechanism may vary depending on the type of data being served from the stores. The system 174 may therefore employ multiple mechanisms for different data types within a single store, wherein the choice may preferably be guided by the access patterns as follows:
        Flat files for sequential, offline analysis. The target or landing page text and the impression logs fall into this category.
        Indices for lookup-by-id and ordering-by-time. Examples include the page or ad features and the page analysis data (for the crawler).
        Relational databases for transactions and ad hoc queries. The publisher and advertiser configurations are typical examples.
        OLAP databases (parallel queries, partitioning, archiving, materialized views) for building/querying a large amount of data. Reporting on the performance data requires such OLAP supports.
    Each access method must be accompanied by a backup and recovery strategy. For example, to make the indices recoverable, the system 174 periodically checks point the index files, and make sure that lost data from other data sources, e.g. such as from the database, can be replayed or re-computed.
Runtime Data.
    There is variety of data needed for the run-time ad serving. The data is propagated to the ad servers 636 and cached on their local disks. Computed features and feature lookup tables are examples of such type of data. This data is further cached in memory by the ad servers 636 to improve runtime performance. The system uses message queuing to support distributed computing. Messages are persisted using message queuing software for fail-over purposes, as described above in regard to messaging services 654.
Data Access API.
    In some system embodiments 174, Hibernate™, available through Jboss Inc., of Atlanta Ga., is used as the primary O-R mapping layer to access the database-based business objects. As well, in some system embodiments 174, business objects are modeled using a DBDesigner modeling tool, available through fabforce.net, and are converted into schema generation/upgrade instructions and Hibernate™ XML configuration needed to manage these objects during runtime. Furthermore, Java POJO classes may be created that represent the business objects and Hibernate™ runtime supports loading and saving of these objects using byte-code instrumentation. The business objects are used by the front-end applications and various runtime services when database access performance is not an issue.

Runtime ad-serving typically uses feature vectors 814 and optimized versions of loaded database-based objects when needed, and care is taken to make sure that only needed data is fetched, and in the most optimal way possible. Ad-serving also loads and caches (when possible) pre-computed features and feature lookups out of the databases and files. File based data preferably has its own format and loading/saving APIs per type of component.
Messaging.
    The enhanced online advertising system 172 is preferably highly distributed, with many servers 630 and interacting components. To simplify communication between various processes and servers, the system 174 is preferably event-driven, with the messaging infrastructure as the technology to support it. Open source JMS messaging implementation is utilized under the hood. Persistent or transient messaging is used, depending on the desired effect of the message.
    In some system embodiments 174, two types of messages are supported. First, there is transactional messaging, with a message being consumed by exactly one consumer from a cluster of identical consumers. An example of this a creation of an ad 188 that triggers exactly one approval of an ad 188, via the approval task. The second important type of message is a multi-cast message that is consumed by a number of interested parties that are subscribed to consume this type of a message.
    An example would be if an ad 188 is paused, a multi-cast message to all the ad servers 636 serving this ad 188 should stop this ad 188 from being served 194. Messages are asynchronous. Asynchronous messaging is an excellent way to de-couple execution paths in various servers. There are other synchronous ways of supporting communication between the components in the system. However, the proposal is to use messaging architecture as it allows to write software components that do not have to be aware of each other, and simple fire messages in a fire-and-forget mode and assume that an appropriate action is taken at a later point by another software component. Open source messaging implementations, such as JGroups, ActiveMQ and JORAM, support 1-10K messages/second per topic (message size of 1K). Once the messages are properly persisted and replicated, the performance goes down. The architecture is scrutinized not to use messaging excessively, i.e. each impression does not result in a message in the system. Finally, commercial implementations of JMS claim much higher levels of scalability.
Service Oriented Architecture.
    The term "server" 630 has typically been referred to herein as a combination of a machine and its primary role, e.g. such as for a query coordinator 634, an ad server 636, and/or a task server 642. The term "service" as used herein, such as in relation to functionality of hardware, typically refers to software that can receive and process messages, e.g. the "ad server service" is the module that serves ad server scoring requests. Similarly, the term "machine" as used herein, typically refers to the hardware. As well, the term "server" may comprise the main program being run by a JVM. Unless performance is sub-optimal in large n-cpu machines, one server 630 will be assigned per machine. System services are therefore software components that can receive and process a message sent over the system 174. External services can receive messages arriving from outside a server 630, while internal services handle messages from within a server 630.
    While services typically act as a client of the service manager, i.e. an entity that manages service life-cycle issues, services have a primary function to process messages, i.e. serving as a message system client.

Message Destination.

Services are associated with destinations, whereby services read and handle system messages that are sent to a specific destination. To facilitate availability, machines may preferably by treated as generic resources that can easily be assigned responsibilities, such as without significant reconfiguration.

For example, in some system embodiments, non-tomcat servers in the network 174 elect a single server from among themselves to act as a service manager, which tracks and reports the availability of machines on the network 174, as they come online or go offline. The service manager may preferably start various external services, e.g. such as other than tomcat servlets, and assign services to machines, e.g. such as governed by metadata accessed from shared storage 104. Such metadata describes how many instances of specific services to start, and provides instance-specific parameters, e.g. what range of target page id's to assign to a particular query coordinator 634. The centralization of the propagation of this information offers the possibility for heuristics that dynamically map services to machines according to load and measured performance.

Message Bus.

The system 174 typically provides an abstraction layer for sending messages between services and for registering services as recipients for specific destinations. For example, a system MessageBus may provide an enumeration of destinations to which messages may be sent and message handlers may be registered, e.g. TaskServerDest, AdScoringDest, ManualAdApprovalDest, CPAUpdateDest.

The enhanced online advertising system 174 typically enumerates request types, whereby a given message handler can process more than one type of request. The request type is typically required, even for destinations receiving only one type of request, so the message system can more easily report performance data by request type.

Shared metadata characterizes each destination. For example, a message that is successfully delivered to a persistent destination is typically handled by a service, even if no service instances are registered to handle the destination at the time the message is sent, or the message system dies or is stopped before the message is handled, or all services registered for the destination die before the message is handled. This is the JMS terminology; the same concept has been referred to elsewhere in this document as "reliable".

In the enhanced online advertising system 174, synchronous destinations comprise service handlers that are expected to return a response object. The sender blocks until the response is available. A multi-point destination comprises a destination whose received messages are processed by multiple services concurrently, e.g. in separate servers 630.

In some embodiments of the enhanced online advertising system 174, requests to higher priority destinations receive preferential scheduling on the target server 630, without starving requests to lower priority destinations, such as to optimize performance on a highly loaded servers 630, e.g. to improve throughput by restricting concurrency to reduce thread thrashing. In such embodiments, the message system typically provides thread scheduling, by utilizing a thread pool shared by all destinations on a server 630.

In some embodiments of the enhanced online advertising system 174, an estimate is made of the percentage of time that message handlers for a destination are performing I/O, or otherwise waiting for external processes. Such estimations can be used to influence the number of requests that are allowed to run concurrently on the same server 630, such as to avoid thread thrashing.

In some embodiments of the enhanced online advertising system 174, some destinations, such as queues, are transactional. For such a system embodiment 174 that uses JMS terminology, messages that are removed from a transactional queue and unsuccessfully processed by a service are rolled back into the queue. Furthermore, any message-sends performed by the failing message handler are rolled back. In such systems 174, message handlers preferably deal with errors internally, without support from the message system, since message handlers are typically better equipped than the message system to decide how to handle specific failing messages.

Several factors motivate the existence of the messaging abstraction layer, such as:
  providing as simple and natural an API as possible for senders and receivers;
  hiding the chosen implementation technology (JGroups, JMS, shared files, database, TCP/IP, UDP, JavaSpaces, etc.), allowing these choices to be changed transparently when scalability/availability barriers are discovered;
  providing a framework that could be instrumented for performance measurements—alternatively, aspects can be used for this; and/or
  providing a framework that can be used to limit the concurrency of tasks within a single server, thus improving the server's performance by reducing thread thrashing.

In some system embodiments 174, JGroups is used to elect the Service Manager, at startup and after Service Manager failures. In systems 174 where network partitioning is important, JGroups detects the merging of a partitioned network. As well, in some system embodiments 174, external means are preferably be employed to detect network partitioning sooner.

In some system embodiments 174, JGroups is also used to implement multi-point/synchronous/non-persistent destinations. This destination configuration type is used by Query Coordinator 634 to distribute ad scoring requests to all members of an ad server cluster 636 for parallel processing. Each ad server 636 knows, from service startup parameters, what set of ad buckets to process. As well, in some system embodiments 174, JGroups is used for persistent queues.

For asynchronous multi-point destinations, e.g. as by using either JMS or JGroups. the destination type is used by the observation server 640 to send CPA updates to ad servers 636. Such requests are specific to a set of ad buckets, and may typically be processed by two ad servers 636 at a time, the same as the number of Query Coordinators 634. JMS implements this with a publish/subscribe topic, to which ad servers 636 would filter the requests based on the ad buckets. JGroups typically uses either multi-point (TCP/IP) or, by defining multiple groups, multi-cast (UDP).

Summary of Exemplary System Design Principles.

Several embodiments of the enhanced online advertising system 174 use the following design principles:
  Load balancing is preferably based on a dynamically updatable mapping so that the system 174 can throttle the server pool easily.
  The ad server code preferably executes the message protocol from the current release and the previous release, whereby the ad servers 636 can be upgraded individually.
  Communication between the ad servers 636 and the database server is preferably asynchronous, so that the system 174 can serve ads 188, even when the database is unavailable.

System Advantages.

In conventional online ad network systems, advertising entities are typically required to provide expertise in the input of relevance links, i.e. keywords and phrases, from which conventional ad placement systems provide a limited matching of relevance to available ad space, typically based solely on keyword matching between the input advertiser keywords and a search for a match to keywords and phrases in a publisher page.

As well, in conventional online ad network systems, advertising entities are typically required to provide expertise in bidding on a limited range of actions, for which they are also responsible to track the results, and attempt to determine the effectiveness of their campaigns.

In stark contrast, the enhanced online advertising system 174 does not require an advertiser to enter keyword or phrases, as comprehensive analysis is automatically provided, both across advertiser assets and publisher assets. The enhanced online advertising system 174 greatly simplifies the generation and targeting of ads, and provides significantly greater ad relevance for served 194 ads 188, resulting in ads 188 that are more meaningful to consumers USR, more effective for advertisers 72, and thus more lucrative for publishers 76.

The enhanced online advertising system 174 provides search technology-based relevance, and integrates search, contextual and behavioral attributes. As well, no manual targeting is required. While keyword and/or category "hints" may be utilized if available, they are not required.

An ad having a higher rank gets more play, so an advertiser 72 may manually or automatically increase the rank of a desired advertisement, by increasing bid price 252 or improving the quality of the ad 188.

Furthermore, as described above, the system 174 can automatically generate "catalog ads" 188 by taking advertisers product catalogs and automatically generating ads 188 from them. This inherently allows the system 174 to rapidly serve millions of ads 188, and at much lower cost than alternative networks. The system 174 therefore inherently allows advertisers 72 to advertise the "long tail" of their product catalogs 462, i.e. thereby providing ads 188 even for products 590 that would normally receive little attention. Advertisers 72 conventionally have no efficient means to address advertising for the "long tail" of their product catalogs 462, since manual targeting approaches are prohibitively expensive for promoting sales of all products 590. As well, by efficiently providing more ads 188, the system 174 can additionally provide more revenue to more diverse publishers 76, since such catalog ads are only possible because of the automated predictive technology within the enhanced online advertising system 174.

Although the exemplary enhanced online advertising system 174 and methods of use are described herein in connection with an advertising network implemented across the Internet, the system and techniques can be implemented for other content systems and/or networks as well, or any combination thereof, as desired.

For example, while the exemplary enhanced online advertising system 174 and methods of use are described herein in connection with bidded pricing for advertising, the system can alternately be used to link a wide variety of data based on analyzed relevance to one or more entities. As well, the system can alternately be used to integrate a wide variety of factors that may directly and/or indirectly be associated with relevance to one or more entities.

For example, while exemplary embodiments of the enhanced online advertising system 174 are described herein as applied to web pages, the relevance and pricing engine of the system 174 can similarly be applied to any context where the system 174 can measure "features" of the context and then measure consumer response in semi-real-time, such as via a TCP/IP network, e.g. such as for but not limited to mobile devices like cell phones, interactive IPTV, game boxes, and/or desktop applications supported by advertising.

Furthermore, while the exemplary enhanced online advertising system 174 and methods of use described herein in connection with an advertising network, the system and techniques may alternately be implemented for other data or information systems, such as to associate relevance of different sources and/or users of information, which may or may not necessarily be associated with monetary relevance to any entities.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A system implemented across a network having one or more publishing sites correspondingly associated with at least one publishing entity, each of the publishing sites comprising at least one publisher page having publishing content that is displayable to any user of the publishing site, and at least one available ad space, the system comprising:

at least one processor programmed for:
  storing a plurality of anonymous profiles that are associated with a plurality of users;
  analyzing the displayable publishing content accessed from the publishing sites;
  storing the results of the analysis of the accessed publishing content;
  receiving from one or more advertising entities across the network and storing:
    one or more selectable action objectives associated with one or more advertising sites correspondingly associated with the advertising entities, and
    one or more ads having selectable links from which each of the respective advertising sites can be accessed;
  analyzing advertising content accessed from one or more of the advertising sites, wherein the advertising content comprises at least the ads received from the advertising entities;
  receiving from a user terminal across the network an automated request for one or more ads associated with a display to a user associated with the user terminal of one of the publisher pages at the user terminal, the publisher page to be displayed comprising the displayable publishing content and one or more of the available ad spaces; and
  determining if the analyzed publishing content is ready for matching to the stored ads;
  wherein if the processor determines that the analyzed publishing content is ready for matching to the stored ads, the processor is programmed to
    match the automated ad request to at least a portion of the analyzed publishing content for the publisher page to be displayed;
    statistically match the user to one of the stored plurality of anonymous profiles, using known information associated with the user, wherein the known information comprises any of location, gender, age, interests, purchases, usage patterns, or other prior actions by the user;
    predict a response to the ads by the user, wherein the prediction is at least partially based on the matched stored profile and any of the analyzed publishing content and the analyzed ads received from the advertising entities, and wherein said prediction comprises a predicted impression revenue;

determine one or more of the best stored ads based on the predicted impression revenue and an observed effective impression revenue of the stored ads, wherein the processor is programmed to track a past number of impressions and resulting actions, to estimate the observed effective impression revenue of the stored ads; and wherein the processor is programmed to apply a blending function B to the predicted impression revenue p, and to the number of impressions i and number of resulting actions a:

$$B(p,i,a)$$

wherein for each impression i and the resulting action a, the observed effective impression revenue of the stored ads is tested for statistical significance against the predicted effective impression revenue p, wherein when the statistical significance exceeds a predetermined threshold, the processor is programmed to use the observed effective impression revenue of the stored ads as the determined effective impression revenue of the stored ads; wherein when the statistical significance equals or is below a said predetermined threshold, then the processor is programmed to use the predicted effective impression revenue of the stored ads as the determined effective impression revenue of the stored ads; and transmit one or more of the automatically determined best stored ads to the user terminal for integration with the publisher page to be displayed; and wherein if the processor determines that the analyzed publishing content is not ready for matching to the stored ads, the processor is programmed to transmit an ad of a determined general relevance to the user terminal for integration with the publisher page to be displayed, wherein the processor is programmed to determine general relevance based upon any of publisher selection or system analysis.

2. The system of claim 1, wherein the processor is programmed to associate a receipt of a bid price with each of the selectable action objectives assigned by the advertiser entity.

3. The system of claim 2, wherein the processor is programmed to associate a translation of the bid prices with the action objectives to bid prices that are based on estimations of the probability that the actions will occur given a display of the associated ad to the user.

4. The system of claim 1, wherein the user terminal comprises a network enabled device comprising any of a desktop computer, a portable computer, a mobile phone, a personal digital assistant, a television, a game box and a media player.

5. The system of claim 1, wherein the processor is programmed to track completion by the user of one or more of the action objectives.

6. The system of claim 1, wherein the processor is programmed to associate selection of a bid from the advertising entity with the selected action objectives.

7. The system of claim 6, wherein the determination that the analyzed publishing content is ready for matching to the stored ads is at least partially based on a comparison of the bids associated with the selected action objectives from a plurality of advertising entities.

8. The system of claim 1, wherein the analysis of the advertising content comprises a contextual analysis of assets associated with at least one of the advertising sites, wherein the assets comprise any of ads and one or more web pages associated with corresponding advertising sites.

9. The system of claim 1, wherein the analysis of the displayable publishing content comprises a contextual analysis of at least a portion of displayable publishing content for at least one publishing site, wherein the analyzed portion of the publishing sites comprises a publisher page having at least one available ad space.

10. The system of claim 1 wherein the analysis of the displayable publishing content comprises a contextual analysis of displayable publishing content for at least one publishing page other than the publisher page having the available ad space.

11. The system of claim 1, wherein the processor is programmed for analyzing secondary data.

12. The system of claim 11, wherein the secondary data comprises information regarding any of a target audience and a locality.

13. The system of claim 1 wherein, upon selection by the user of an integrated ad displayed at the user terminal, the processor is programmed to transfer the user from the displayed publisher page to a corresponding display of an advertiser site.

14. The system of claim 13, wherein the processor is programmed to track actions at the displayed advertiser site corresponding to one or more of the action objectives selected by the advertising entity.

15. The system of claim 13, wherein the determination of at least one ad associated with the displayed advertiser site is at least partially influenced by one or more tracked actions at the displayed advertiser site.

16. The system of claim 13, wherein the processor is programmed to track by any of a beacon and a cookie located on the advertiser site.

17. The system of claim 1, wherein the selectable action objectives comprise any of acquisitions, purchases, downloads, registrations, donations, clicks, and branding impressions.

18. The system of claim 1, wherein the predicted response is based on relevance features of any of the analyzed publishing context, the analyzed advertising context and information associated with the user.

19. The system of claim 18, wherein the relevance features are represented as feature vectors, and wherein one or more of the feature vectors are mapped to a predicted probability of action.

20. The system of claim 18, wherein the relevance features comprise any of term matching, category matching, concept matching, context identification, brand power, time, action history and user behavior.

21. The system of claim 1, wherein the processor is programmed to:

receive a catalog file from at least one of the advertising entities, the catalog file comprising a plurality of asset records, wherein each of the asset records comprises a plurality of fields correspondingly associated with an asset;

analyze each of the asset records in the catalog file; and automatically produce ads corresponding to each of the analyzed asset records.

22. A process implemented across a network having one or more publishing sites correspondingly associated with at least one publishing entity, each of the publishing sites comprising at least one publisher page having publishing content that is displayable to any user of the publishing site, and at least one available ad space, the process comprising:

providing at least one processor that is programmed to perform the steps of:

storing a plurality of anonymous profiles that are associated with a plurality of users;
analyzing the displayable publishing content;
storing the analysis of the publishing content;
receiving one or more selectable objectives associated with one or more network sites from one or more advertiser entities;
receiving a bid price correspondingly associated with each of the selectable action objectives assigned by the respective advertiser entities;
receiving and storing one or more ads associated with the network site from the respective advertiser entities;
analyzing the ads received from the advertiser entities;
receiving from a user terminal across the network an automated ad request for one or more ads associated with a display to a user of one of the publisher pages at the user terminal, the publisher page to be displayed comprising the displayable publishing content and one or more of the available ad spaces; and
determining if the analyzed publishing content is ready for matching to the stored ads;
wherein if the processor determines that the analyzed publishing content is ready for matching to the stored ads, the processor performs the steps of:
matching the automated ad request to at least a portion of analyzed publishing content for the publisher page to be displayed;
statistically matching the user to one of the stored plurality of anonymous profiles, using known information associated with the user, wherein the known information comprises any of location, gender, age, interests, purchases, usage patterns, or other prior actions by the user;
predicting a response to the ads by the user, wherein the prediction is at least partially based on the matched stored profile and any of the analyzed publishing content and the analyzed advertising ads received from the advertising entities, and wherein said prediction comprises a predicted impression revenue;
determining one or more of the best stored ads based on the predicted impression revenue and an observed effective impression revenue of the stored ads, wherein the processor is programmed to track a past number of impressions and resulting actions to estimate the observed effective impression revenue of the stored ads; and wherein the processor is programmed to apply a blending function B to the predicted impression revenue p, and to the number of impressions i and number of resulting actions a:

$$B(p,i,a)$$

wherein for each impression i and the resulting action a, the observed effective impression revenue of the stored ads is tested for statistical significance against the predicted effective impression revenue p, wherein when the statistical significance exceeds a predetermined threshold, the processor is programmed to use the observed effective impression revenue of the stored ads as the determined effective impression revenue of the stored ads; wherein when the statistical significance equals or is below said predetermined threshold, then the processor is programmed to use the predicted effective impression revenue of the stored ads; and
sending one or more of the determined stored ads to the user terminal or integration with the publisher page to be displayed; and wherein the processor performs the step of transmitting an ad of a determined general relevance to the user terminal for integration with the publisher page to be displayed if the analyzed publishing content is not ready, wherein the processor performs the step of determining general relevance based upon any of publisher selection or system analysis.

23. The process of claim 22, wherein the bid price is based on any of cost per click (CPC), cost per impression (CPM), ad-based cost per action (CPA) bids, and commission-based CPA bids.

24. The process of claim 22, further comprising the step of:
automatically translating the bid prices associated with the objectives to bid prices that are based on estimations of the probability that the objectives will occur given a display of the associated ads to the user.

25. The process of claim 22, wherein the user terminal comprises a network enabled device comprising any of a desktop computer, a portable computer, a mobile phone, a personal digital assistant, a television and a media player.

26. The process of claim 22, further comprising the step of:
tracking completion by the user of one or more of the action objectives.

27. The process of claim 22, further comprising the step of:
selecting bids from the advertising entity associated with the selected action objectives.

28. The process of claim 27, wherein the determination is at least partially based on a comparison of the bids associated with the selected action objectives from a plurality of advertising entities.

29. The process of claim 22, wherein the step of analyzing the ads comprises contextually analyzing assets associated with at least one of the advertising sites, wherein the assets comprise any of ads and one or more web pages associated with corresponding advertising sites.

30. The process of claim 22, wherein the step of analyzing the displayable publishing content comprises contextually analyzing at least a portion of publishing content for at least one publishing site, wherein the analyzed portion of the publishing sites comprises a publisher page having at least one available ad space.

31. The process of claim 22, wherein the step of analyzing the displayable publishing content comprises contextually analyzing publishing content for at least one publishing page other than the publisher page having the available ad space.

32. The process of claim 22, wherein the step of analyzing the displayable publishing content further comprises analyzing secondary data.

33. The process of claim 32, wherein the secondary data comprises information regarding any of a target audience and a locality.

34. The process of claim 22, further comprising the step of:
upon selection by the user of an integrated ad displayed to the user at the user terminal, transferring the user from the displayed publisher page to a corresponding display of an advertiser site.

35. The process of claim 34, further comprising the step of:
tracking actions at the displayed advertiser site corresponding to one or more of the action objectives selected by the advertising entity.

36. The process of claim 34, wherein a ranking of at least one ad associated with the displayed advertiser site is at least partially influenced by one or more tracked actions at the displayed advertiser site.

37. The process of claim 36, wherein the tracking is provided by any of a beacon and a cookie located at the advertiser site.

38. The process of claim 22, wherein the selectable action objectives comprise any of acquisitions, purchases, downloads, registrations, donations, clicks, and branding impressions.

39. The process of claim 22, wherein the predicted response is based on relevance features of any of the analyzed publishing context, the analyzed advertising context and information associated with the user.

40. The process of claim 39, wherein the relevance features are represented as feature vectors, and wherein one or more of the feature vectors are mapped to a predicted probability of action.

41. The process of claim 39, wherein the relevance features comprise any of term matching, category matching, concept matching, context identification, brand power, time, action history and user behavior.

42. The process of claim 22, further comprising the steps of:
receiving a catalog the from at least one of the advertising entities, the catalog file comprising a plurality of asset records, wherein each of the asset records comprises a plurality of fields correspondingly associated with an asset;
automatically analyzing each of the asset records in the catalog file; and
automatically producing ads corresponding to each of the analyzed asset records.

43. A process implemented across a network having one or more publishing sites correspondingly associated with at least one publishing entity, each of the publishing sites comprising at least one publisher page having publishing content that is displayable to any user of the publishing site, and at least one available ad space, the process comprising:
providing at least one processor that is programmed to perform the steps of:
storing a plurality of anonymous profiles that are associated with a plurality of users;
analyzing the displayable publishing content;
storing the analysis of the publishing content;
receiving one or more selectable objectives associated with an advertiser campaign from an advertiser entity, the advertiser campaign comprising a plurality of assets, one of the assets comprising a network site and one or more ads;
receiving a bid price correspondingly associated with each of the selectable objectives assigned by the advertiser entity;
receiving and storing one or more of the ads associated with the advertiser campaign from the advertiser entity;
analyzing at least a portion of the ads that were received from the advertiser entity;
receiving from a user terminal across the network an automated ad request for one or more ads associated with a display to a user of one of the publisher pages at the user terminal, the publisher page to be displayed comprising the displayable publishing content and one or more of the available ad spaces; and
determining if the analyzed publishing content is ready for matching to the stored ads;
wherein if the processor determines that the analyzed publishing content is ready for matching to the stored ads, the processor performs the steps of:
matching the automated ad request to at least a portion of the contextually analyzed publishing content for the publisher page to be displayed;
statistically matching the user to one of the stored plurality of anonymous profiles, using known information associated with the user, wherein the known information comprises any of location, gender, age, interests, purchases, usage patterns, or other prior actions by the user;
predicting a response to the ads by the user, wherein the prediction is at least partially based on the matched stored profile and any of the analyzed publishing content and the analyzed advertising content of the associated ads and the analyzed ads received from the advertising entities, and wherein said prediction comprises a predicted impression revenue;
ranking one or more of the stored ads based on the predicted impression revenue and an observed effective impression revenue of the stored ads, wherein the processor is programmed to track a past number of impressions and resulting actions to estimate the observed effective impression revenue of the stored ads; and wherein the processor is programmed to apply a blending function B to the predicted impression revenue p, and to the number of impressions i and number of resulting actions a:

$$B(p,i,a)$$

wherein for each impression i and the resulting action a, the observed effective impression revenue of the stored ads is are tested for statistical significance against the predicted effective impression revenue p, wherein when the statistical significance exceeds a predetermined threshold, the processor is programmed to use the observed effective impression revenue of the stored ads as the determined effective impression revenue of the stored ads; if wherein when the statistical significance equals or is below a said predetermined threshold, then the processor is programmed to use the predicted effective impression revenue of the stored ads as the determined effective impression revenue of the stored ads; and
sending one or more of the ranked ads to the user terminal for integration with the publisher page to be displayed; and
wherein the processor performs the step of sending an ad having a determined general relevance to the user terminal for integration with the publisher page to be displayed if the analyzed publishing content is not ready, wherein the processor performs the step of determining general relevance based upon any of selection by a publisher associated with the publishing site, or by system analysis.

44. A process implemented across a network having one or more publishing sites correspondingly associated with at least one publishing entity, each of the publishing sites comprising at least one publisher page having publishing content that is displayable to any user of the publishing site, and at least one available ad space, the process comprising:
providing at least one processor that is programmed to perform the steps of:
storing a plurality of anonymous profiles that are associated with a plurality of users;
receiving a catalog file from an advertiser entity across the network, the catalog file comprising a plurality of asset records, wherein each of the asset records comprises a plurality of fields correspondingly associated with an asset;
receiving from the advertiser entity one or more action objectives associated with the assets;

assigning bids for the received action objectives associated with the assets, wherein the assigned bids correspond to a price corresponding to an accomplishment of a corresponding action objective;

analyzing one or more of the fields that correspond to each of the asset records;

storing the analyzed asset records;

automatically producing ads corresponding to the analyzed asset records, wherein the produced ads include the analyzed fields;

statistically matching a user at a user terminal with one of the stored plurality of anonymous profiles, wherein the matching is at least partially based upon known information about the user, wherein the known information comprises any of location, gender, age, interests, purchases, usage patterns, or other prior actions by the user;

predicting a response to the ads by the user, wherein the prediction is at least partially based on the matched stored profile and at least one of the analyzed fields associated with the automatically produced ads and any of the analyzed publishing content and the analyzed ads received from the advertising entities, and wherein said prediction comprises a predicted impression revenue;

determining one or more of the best stored ads based on the predicted impression revenue and an observed effective impression revenue of the stored ads, wherein the processor is programmed to track a past number of impressions and resulting actions and to estimate the observed effective impression revenue of the stored ads; and wherein the processor is programmed to apply a blending function B to the predicted impression revenue p, and to the number of impressions i and number of resulting actions a:

$$B(p,i,a)$$

wherein for each impression i and the resulting action a, the observed effective impression revenue of the stored ads is are tested for statistical significance against the predicted effective impression revenue p, wherein when the statistical significance exceeds a predetermined threshold, the processor is programmed to use the observed effective impression revenue of the stored ads as the determined effective impression revenue of the stored ads; otherwise, the processor is programmed to use the predicted effective impression revenue of the stored ads; and sending one or more of the automatically produced ads for presentation to the user, based upon the prediction.

45. The process of claim 44, wherein the assets comprise any of products and services.

46. The process of claim 44, wherein the fields comprise any of associated SKUs, product names, product descriptions, list prices, sale prices, stock indicators, landing URLs, categories, and URLs of thumbnail images.

47. The process of claim 44, wherein the bids are assigned based on a price value of at least one of the fields.

48. The process of claim 44, wherein the bids correspond to any of cost per click (CPC), cost per impression (CPM), ad-based cost per action (CPA) bids, and commission-based CPA bids.

49. The process of claim 44, wherein the analysis comprises a contextual analysis of one or more advertiser assets.

50. The process of claim 49, wherein the analyzed advertiser assets comprise elements of a network site associated with the advertiser entity.

51. The process of claim 50, wherein the analyzed network site elements comprise one or more pages.

52. The process of claim 51, wherein at least one of the analyzed network site pages comprises a landing page.

53. The process of claim 44, further comprising the step of: determining an ad format for one or more of the ads.

54. The process of claim 53, wherein the step of determining ad formats includes input from any of the advertiser entity, a secondary source, and an internal ad template source.

55. The process of claim 44, further comprising the step of: storing the produced ads for use on the network.

56. The process of claim 55, wherein the processor is further programmed for:

receiving from the user terminal across the network an automated ad request for one or more ads associated with a display of one of the publisher pages at the user terminal;

wherein the step of sending one or more of the automatically produced ads is responsive to the automated ad request.

57. The process of claim 44, wherein the at least one of the analyzed fields comprises a product description.

* * * * *